US010366346B2

(12) United States Patent
Achin et al.

(10) Patent No.: US 10,366,346 B2
(45) Date of Patent: Jul. 30, 2019

(54) SYSTEMS AND TECHNIQUES FOR DETERMINING THE PREDICTIVE VALUE OF A FEATURE

(71) Applicant: DataRobot, Inc., Boston, MA (US)

(72) Inventors: Jeremy Achin, Boston, MA (US); Thomas DeGodoy, Medford, MA (US); Xavier Conort, Singapore (SG); Sergey Yurgenson, Marlborough, MA (US); Mark L. Steadman, Watertown, MA (US); Glen Koundry, Waltham, MA (US)

(73) Assignee: DataRobot, Inc., Boston, MA (US)

( * ) Notice: Subject to any disclaimer, the term of this patent is extended or adjusted under 35 U.S.C. 154(b) by 0 days.

(21) Appl. No.: 15/331,797

(22) Filed: Oct. 21, 2016

(65) Prior Publication Data

US 2018/0060738 A1 Mar. 1, 2018

Related U.S. Application Data

(63) Continuation-in-part of application No. 15/217,626, filed on Jul. 22, 2016, now Pat. No. 9,652,714, which
(Continued)

(51) Int. Cl.
*G06F 15/18* (2006.01)
*G06N 20/00* (2019.01)
(Continued)

(52) U.S. Cl.
CPC ............ *G06N 20/00* (2019.01); *G06Q 10/04* (2013.01); *G06Q 10/06* (2013.01); *G06Q 10/067* (2013.01); *G06Q 30/0201* (2013.01)

(58) Field of Classification Search
CPC .......... G06N 5/04; G06N 99/005; G06N 5/02; G06N 5/003; G06Q 30/02
See application file for complete search history.

(56) References Cited

U.S. PATENT DOCUMENTS 5,761,442 A 6/1998 Barr et al.
7,072,863 B1 7/2006 Phillips et al.
(Continued)

FOREIGN PATENT DOCUMENTS

JP 2005-135287 A 5/2005
WO WO-2010044683 A1 4/2010

OTHER PUBLICATIONS

Barresse, Microsoft Excel 2013—Flash Fill. Microsoft Excel and Access Experts Blog. Jul. 28, 2012. retrieved from https://excelandaccess.wordpress.com/2012/07/28/excel-2013-flash-fill/ [Mar. 3, 2016 1:45:25PM]; 5 pgs.
(Continued)

*Primary Examiner* — Luis A Sitiriche
(74) *Attorney, Agent, or Firm* — Goodwin Procter LLP

(57) ABSTRACT

A method for determining the predictive value of a feature may include: (a) performing predictive modeling procedures associated with respective predictive models, wherein performing each modeling procedure includes fitting the associated model to an initial dataset representing an initial prediction problem; (b) determining a first accuracy score of each of the fitted models, representing an accuracy with which the fitted model predicts an outcome of the initial prediction problem; (c) shuffling values of a feature across observations included in the initial dataset, thereby generating a modified dataset representing a modified prediction problem; (d) determining a second accuracy score of each of the fitted models, representing an accuracy with which the fitted model predicts an outcome of the modified prediction problem; and (e) determining a model-specific predictive value of the feature for each of the fitted models based on the first and second accuracy scores of the fitted model.

30 Claims, 9 Drawing Sheets

Related U.S. Application Data is a continuation of application No. 14/720,079, filed on May 22, 2015, now Pat. No. 9,489,630.

(60) Provisional application No. 62/002,469, filed on May 23, 2014, provisional application No. 62/411,526, filed on Oct. 21, 2016.

(51) Int. Cl.
*G06Q 10/04* (2012.01)
*G06Q 10/06* (2012.01)
*G06Q 30/02* (2012.01)

(56) References Cited

U.S. PATENT DOCUMENTS

| | | | |
|---|---|---|---|
| 7,117,185 B1 | 10/2006 | Aliferis et al. | |
| 7,580,852 B2 | 8/2009 | Ouimet et al. | |
| 8,024,216 B2 | 9/2011 | Aronowich et al. | |
| 8,180,664 B2 | 5/2012 | Shan | |
| 8,370,280 B1* | 2/2013 | Lin | G06N 99/005 706/12 |
| 8,645,421 B2 | 2/2014 | Meric et al. | |
| 8,682,709 B2 | 3/2014 | Coldren et al. | |
| 8,782,037 B1 | 7/2014 | Barad et al. | |
| 8,843,427 B1* | 9/2014 | Lin | G06N 99/005 705/16 |
| 9,489,630 B2 | 11/2016 | Achin et al. | |
| 9,495,641 B2 | 11/2016 | Schmidt | |
| 9,524,473 B2 | 12/2016 | Schmidt | |
| 9,652,714 B2 | 5/2017 | Achin et al. | |
| 9,659,254 B2 | 5/2017 | Achin et al. | |
| 10,102,483 B2 | 10/2018 | Schmidt | |
| 2002/0144178 A1 | 10/2002 | Castelli et al. | |
| 2004/0030777 A1* | 2/2004 | Reedy | G06F 9/542 709/224 |
| 2004/0054997 A1* | 3/2004 | Katragadda | G06F 9/5044 718/102 |
| 2005/0183073 A1 | 8/2005 | Reynolds | |
| 2005/0234762 A1* | 10/2005 | Pinto | G06Q 30/02 700/44 |
| 2006/0101014 A1* | 5/2006 | Forman | G06F 17/277 |
| 2006/0190285 A1 | 8/2006 | Harris et al. | |
| 2007/0133848 A1 | 6/2007 | McNutt et al. | |
| 2008/0059284 A1 | 3/2008 | Solotorevsky et al. | |
| 2008/0097802 A1 | 4/2008 | Ladde et al. | |
| 2008/0307399 A1 | 12/2008 | Zhou et al. | |
| 2010/0131314 A1* | 5/2010 | Lo Yuk Ting | G06Q 10/063 705/7.11 |
| 2010/0312718 A1 | 12/2010 | Rosenthal et al. | |
| 2011/0119100 A1 | 5/2011 | Ruhl et al. | |
| 2012/0078678 A1 | 3/2012 | Pradhan et al. | |
| 2012/0144325 A1 | 6/2012 | Mital et al. | |
| 2012/0192051 A1 | 7/2012 | Rothschiller et al. | |
| 2012/0202240 A1* | 8/2012 | Deigner | G01N 33/6893 435/29 |
| 2013/0073061 A1* | 3/2013 | Mu | G05B 13/041 700/29 |
| 2013/0096892 A1 | 4/2013 | Essa et al. | |
| 2013/0290226 A1 | 10/2013 | Dokken | |
| 2014/0074829 A1 | 3/2014 | Schmidt | |
| 2014/0136452 A1* | 5/2014 | Wellman | G06N 5/04 706/12 |
| 2014/0172773 A1 | 6/2014 | Schmidt | |
| 2014/0258189 A1 | 9/2014 | Schmidt | |
| 2014/0372172 A1 | 12/2014 | Frías Martínez et al. | |
| 2015/0088606 A1 | 3/2015 | Tyagi | |
| 2015/0317589 A1 | 11/2015 | Anderson et al. | |
| 2015/0339572 A1* | 11/2015 | Achin | G06N 5/02 706/46 |
| 2015/0356576 A1 | 12/2015 | Malaviya et al. | |
| 2016/0005055 A1 | 1/2016 | Sarferaz | |
| 2016/0048766 A1 | 2/2016 | McMahon et al. | |
| 2016/0335550 A1 | 11/2016 | Achin et al. | |
| 2016/0364647 A1 | 12/2016 | Achin et al. | |
| 2016/0379244 A1 | 12/2016 | Kalish et al. | |
| 2017/0193398 A1 | 7/2017 | Schmidt | |
| 2017/0243140 A1 | 8/2017 | Achin et al. | |
| 2018/0046926 A1 | 2/2018 | Achin et al. | |
| 2018/0060738 A1 | 3/2018 | Achin et al. | |
| 2018/0060744 A1 | 3/2018 | Achin et al. | |
| 2018/0300737 A1 | 10/2018 | Bledsoe et al. | |

OTHER PUBLICATIONS

Ekart et al. 2000. A Metric for Genetic Programs and Fitness Sharing. Genetic Programming. Springer Berlin Heidelberg. EuroGP 2000, LNCS 1802. 2000. 259-70.

Mitra et al., 2006. Multi-objective evolutionary biclustering of gene expression data. Pattern Recognition. 2006;39(12):2464-77.

Schmidt, Michael D. et al. "Automated refinement and inference of analytical models for metabolic networks," Aug. 10, 2011, Physical Biology, vol. 8, No. 5. 36 pages.

Schmidt, Michael et al., "Distilling Free-Form Natural Laws from Experimental Data," Apr. 3, 2009, Science, vol. 324, No. 5923, pp. 81-85.

International Search Report and Written Opinion in PCT/US2017/057753 dated Feb. 12, 2018, 14 pages.

Google Cloud Platform—Smart Autofill Spreadsheets Add on—Predication API. Apr. 23, 2015. retrieved from https://cloud.google.com/prediction/docs/smart_autofill_add_on. [Aug. 23, 2015], 9 pages.

Vladislavleva et al., Order of Nonlinearity as a Complexity Measure for Models Generated by Symbolic Regression via Pareto Genetic Programming. IEEE Transactions on Evolutionary Computation. 2008; 13(2): 333-49.

T. Kraska et al. MLbase: A distributed machine-learning system. In Proceedings of 6th Biennial Conference on Innovative Data Systems Research (CIDR'13), Jan. 6, 2013 (7 pages). Available at <http://cidrdb.org/cidr2013/Papers/CIDR13_Paper118.pdf>.

Ensemble Learning; https://en.wikipedia.org/wiki/Ensemble_learing; Creative Commons Attribution—ShareAlike License, Aug. 2, 2017; pp. 1-8.

Information Criterion; https://en.wikipedia.org/w/index.php?title=Informationcriterion&oldid=793390961; Creative Commons Attribution—ShareAlike License; Aug. 1, 2017; 1 pg.

A. Lorbert et al., Descent Methods for Tuning Parameter Refinement, Proceedings of the 13th International Conference on Artificial Intelligence and Statistics (AISTATS), 2010, pp. 469-476.

A. Rudi et al., Adaptive Optimization for Cross Validation, Proceedings of the European Symposium on Artificial Neural Networks, Computational Intelligence, and Machine Learning, 2012, pp. 435-440.

B. Boukhatem et al., Predicting concrete properties using neural networks (NN) with principal component analysis (PCA) technique, Computers and Concrete, vol. 10, No. 6, 2012, pp. 1-17.

B. Flyvbjerg et al., What Causes Cost Overruns in Transport Infrastructure Projects?, Transport Reviews, vol. 24, 2004, pp. 1-40.

B.K. Behera et al., Aabric Quality Evaluation by Objective Measurement, Indian Journal of Fibre and Textile Research, vol. 19, 1994, pp. 168-171.

C. Bordat et al., An Analysis of Cost Overruns and Time Delays of INDOT Projects, Final Report, FHWA/IN/JTRP-2004/7, Joint Transportation Research Program, Purdue University, 2004, 191 pages.

F. Xiao et al., Prediction of Fatigue Life of Rubberized Asphalt Concrete Mixtures Containing Reclaimed Asphalt Pavement Using Artificial Neural Networks, Journal of Materials in Civil Engineering, 2007, 41 pages.

G Biau et al., COBRA: A Nonlinear Aggregation Strategy, Cornell University Library, Nov. 2013, 40 pages.

G. Bortolin et al., On modeling of curl in multi-ply paperboard, Journal of Process Control, vol. 16, 2006, pp. 419-429.

G. Bortolin, On Modeling and Estimation of Curl and Twist in Multi-ply Paperboard, Licentiate Thesis, Optimization and Systems Theory, Department of Mathematics, Royal Institute of Technology, Stockholm, Sweden, 2002, 106 pages.

(56) References Cited

OTHER PUBLICATIONS

I.M. Alsmadi et al., Evaluation of Cost Estimation Metrics: Towards a Unified Terminology, Journal of Computing and Information Technology, vol. 21, Mar. 2013, pp. 23-34.
International Preliminary Report on Patentability for International Application No. PCT/US2015/032203 dated Nov. 29, 2016. (9 pages).
International Search Report and Written Opinion in PCT/US2015/032203 dated Jul. 22, 2015, 11 pages.
K. Valkili et al., Finding Regression Outliers with FastRCS, Cornell University Library, Feb. 2014, 23 pages.
M. Claesen et al., Hyperparameter tuning in Python using Optunity, International Workshop on Technical Computing for Machine Learning and Mathematical Engineering (TCMM), Sep. 2014, 2 pages.
N. Deshpande et al., Modelling Compressive Strength of Recycled Aggregate Concrete by Artificial Neural Network, Model Tree and Non-linear Regression, International Journal of Sustainable Built Environment, Dec. 2014, pp. 187-198.
N. Deshpande et al., Modelling Compressive Strength of Recycled Aggregate Concrete Using Neural Networks and Regression, Concrete Research Letters, vol. 4(2), Jun. 2013, pp. 580-590.
N. Sharma et al., Incorporating Data Mining Techniques on Software Cost Estimation: Validation and Improvement, International Journal of Emerging Technology and Advanced Engineering, vol. 2, Mar. 2012, pp. 301-309.
P. Ramesh, Prediction of Cost Overruns Using Ensemble Methods in Data Mining and Text Mining Algorithms, Master's Thesis, Graduate Program in Civil and Environmental Engineering, Rutgers University, Jan. 2014, 50 pages.
P.J. Edwards et al., The application of neural networks to the paper-making industry, Proceedings of the European Symposium on Artificial Neural Networks, Apr. 1999, 6 pages.
R. Strapasson et al., Tensile and impact behavior of polypropylene/low density polyethylene blends, Polymer Testing 24, 2005, pp. 468-473.
S. Zheng, Boosting Based Conditional Quantile Estimation for Regression and Binary Classification, Proceedings of the 9th Mexican international conference on Artificial intelligence, 2010, pp. 67-79.
S.C. Lhee et al., Development of a two-step neural network-based model to predict construction cost contingency, Journal of Information Technology in Construction, vol. 19, Sep. 2014, pp. 399-411.
S.T. Yousif et al., Artificial Neural Network Model for Predicting Compressive Strength of Concrete, Tikrit Journal of Engineering Sciences, vol. 16, 2009, pp. 55-63.
V. Chandwani et al., Applications of Soft Computing in Civil Engineering: A Review, International Journal of Computer Applications, vol. 81, Nov. 2013, pp. 13-20.
V. Chandwani et al., Modeling Slump of Ready Mix Concrete Using Genetically Evolved Artificial Neural Networks, Advances in Artificial Neural Systems, Nov. 2014, 9 pages.
X. He et al., Practical Lessons from Predicting Clicks on Ads at Facebook, Proceedings of ADKDD'14, Aug. 2014, 9 pages.
Y. Shan et al., Machine Learning of Poorly Predictable Ecological Data, Ecological Modeling, vol. 195, 2006, pp. 129-138.
Y.X. Zhao et al., Concrete cracking process induced by steel corrosion—A review, Proceedings of the Thirteenth East Asia-Pacific Conference on Structural Engineering and Construction, Sep. 2013, pp. 1-10.
Z.A. Khalifelu et al., Comparison and evaluation of data mining techniques with algorithmic models in software cost estimation, Procedia Technology, vol. 1, 2012, pp. 65-71.

\* cited by examiner

SYSTEMS AND TECHNIQUES FOR DETERMINING THE PREDICTIVE VALUE OF A FEATURE

CROSS-REFERENCE TO RELATED APPLICATIONS

This application is a continuation-in-part of and claims priority to U.S. patent application Ser. No. 15/217,626, titled "Systems and Methods for Predictive Data Analytics" and filed on Jul. 22, 2016, which is a continuation of and claims priority to U.S. patent application Ser. No. 14/720,079, titled "Systems and Methods for Predictive Data Analytics" and filed on May 22, 2015, which claims priority to and benefit of U.S. Provisional Patent Application No. 62/002,469, titled "Systems and Methods for Predictive Data Analytics" and filed on May 23, 2014; this application also claims priority to and benefit of U.S. Provisional Patent Application No. 62/411,526, titled "Systems and Methods for Predictive Data Analytics" and filed on Oct. 21, 2016; each of the foregoing applications is hereby incorporated by reference herein in its entirety.

FIELD OF INVENTION

The present disclosure relates generally to systems and techniques for data analysis. Some embodiments relate specifically to systems and techniques for using statistical learning methods to develop, select, and/or understand predictive models for prediction problems.

BACKGROUND

Many organizations and individuals use electronic data to improve their operations or aid their decision-making. For example, many business enterprises use data management technologies to enhance the efficiency of various business processes, such as executing transactions, tracking inputs and outputs, or marketing products. As another example, many businesses use operational data to evaluate performance of business processes, to measure the effectiveness of efforts to improve processes, or to decide how to adjust processes.

In some cases, electronic data can be used to anticipate problems or opportunities. Some organizations combine operations data describing what happened in the past with evaluation data describing subsequent values of performance metrics to build predictive models. Based on the outcomes predicted by the predictive models, organizations can make decisions, adjust processes, or take other actions. For example, an insurance company might seek to build a predictive model that more accurately forecasts future claims, or a predictive model that predicts when policyholders are considering switching to competing insurers. An automobile manufacturer might seek to build a predictive model that more accurately forecasts demand for new car models. A fire department might seek to build a predictive model that forecasts days with high fire danger, or predicts which structures are endangered by a fire.

Machine-learning techniques (e.g., supervised statistical-learning techniques) may be used to generate a predictive model from a dataset that includes previously recorded observations of at least two variables. The variable(s) to be predicted may be referred to as "target(s)", "response(s)", or "dependent variable(s)". The remaining variable(s), which can be used to make the predictions, may be referred to as "feature(s)", "predictor(s)", or "independent variable(s)". The observations are generally partitioned into at least one "training" dataset and at least one "test" dataset. A data analyst then selects a statistical-learning procedure and executes that procedure on the training dataset to generate a predictive model. The analyst then tests the generated model on the test dataset to determine how well the model predicts the value(s) of the target(s), relative to actual observations of the target(s).

SUMMARY

Motivation for Some Embodiments of the Invention

Data analysts can use analytic techniques and computational infrastructures to build predictive models from electronic data, including operations and evaluation data. Data analysts generally use one of two approaches to build predictive models. With the first approach, an organization dealing with a prediction problem simply uses a packaged predictive modeling solution already developed for the same prediction problem or a similar prediction problem. This "cookie cutter" approach, though inexpensive, is generally viable only for a small number of prediction problems (e.g., fraud detection, churn management, marketing response, etc.) that are common to a relatively large number of organizations. With the second approach, a team of data analysts builds a customized predictive modeling solution for a prediction problem. This "artisanal" approach is generally expensive and time-consuming, and therefore tends to be used for a small number of high-value prediction problems.

The space of potential predictive modeling solutions for a prediction problem is generally large and complex. Statistical learning techniques are influenced by many academic traditions (e.g., mathematics, statistics, physics, engineering, economics, sociology, biology, medicine, artificial intelligence, data mining, etc.) and by applications in many areas of commerce (e.g., finance, insurance, retail, manufacturing, healthcare, etc.). Consequently, there are many different predictive modeling algorithms, which may have many variants and/or tuning parameters, as well as different pre-processing and post-processing steps with their own variants and/or parameters. The volume of potential predictive modeling solutions (e.g., combinations of pre-processing steps, modeling algorithms, and post-processing steps) is already quite large and is increasing rapidly as researchers develop new techniques.

Given this vast space of predictive modeling techniques, the artisanal approach to generating predictive models tends to be time-consuming and to leave large portions of the modeling search space unexplored. Analysts tend to explore the modeling space in an ad hoc fashion, based on their intuition or previous experience and on extensive trial-and-error testing. They may not pursue some potentially useful avenues of exploration or adjust their searches properly in response to the results of their initial efforts. Furthermore, the scope of the trial-and-error testing tends to be limited by constraints on the analysts' time, such that the artisanal approach generally explores only a small portion of the modeling search space.

The artisanal approach can also be very expensive. Developing a predictive model via the artisanal approach often entails a substantial investment in computing resources and in well-paid data analysts. In view of these substantial costs, organizations often forego the artisanal approach in favor of the cookie cutter approach, which can be less expensive, but tends to explore only a small portion of this vast predictive modeling space (e.g., a portion of the modeling space that is expected, a priori, to contain acceptable solutions to a specified prediction problem). The cookie cutter approach can generate predictive models that perform poorly relative to unexplored options.

There is a need for a tool that systematically and cost-effectively evaluates the space of potential predictive modeling techniques for prediction problems. In many ways, the conventional approaches to generating predictive models are analogous to prospecting for valuable resources (e.g., oil, gold, minerals, jewels, etc.). While prospecting may lead to some valuable discoveries, it is much less efficient than a geologic survey combined with carefully planned exploratory digging or drilling based on an extensive library of previous results. The inventors have recognized and appreciated that statistical learning techniques can be used to systematically and cost-effectively evaluate the space of potential predictive modeling solutions for prediction problems.

In addition, even when accurate predictive models for a prediction problem are available, it can be difficult to understand (1) the prediction problem itself, and (2) how specific predictive models produce accurate prediction results. Metrics of "feature importance" can facilitate such understanding. In general, feature importance metrics indicate the predictive value of a feature of a dataset for purposes of forecasting outcomes of a prediction problem represented by the dataset. Conventional techniques for measuring feature importance are generally applicable only to particular types of predictive model, and are generally not well-suited for use with other types of predictive models. Thus, there is a need for a tool that can measure feature importance for an arbitrary predictive model or for a diverse set of predictive models. In addition, there is a need for a tool that can use feature importance metrics to guide the allocation of resources to the evaluation of predictive modeling procedures, to feature engineering tasks, and to the blending of predictive models, thereby facilitating the cost-effective evaluation of the space of potential predictive modeling techniques for prediction problems.

SUMMARY

According to an aspect of the present disclosure, a method is provided, including: (a) performing a plurality of predictive modeling procedures, wherein each of the predictive modeling procedures is associated with a predictive model, and wherein performing each modeling procedure includes fitting the associated predictive model to an initial dataset representing an initial prediction problem; (b) determining a first respective accuracy score of each of the fitted predictive models, wherein the first accuracy score of each fitted model represents an accuracy with which the fitted model predicts one or more outcomes of the initial prediction problem; (c) shuffling values of a feature across respective observations included in the initial dataset, thereby generating a modified dataset representing a modified prediction problem; (d) determining a second respective accuracy score of each of the fitted predictive models, wherein the second accuracy score of each fitted model represents an accuracy with which the fitted model predicts one or more outcomes of the modified prediction problem; and (e) determining a respective model-specific predictive value of the feature for each of the fitted models, wherein the model-specific predictive value of the feature for each fitted model is based on the first and second accuracy scores of the fitted model.

In some embodiments, the method further includes: prior to performing the plurality of predictive modeling procedures, selecting the plurality of predictive modeling procedures for the prediction problem based on characteristics of the initial dataset, characteristics of the initial prediction problem, and/or characteristics of the feature. In some embodiments, the plurality of predictive modeling procedures includes two or more modeling procedures selected from the group consisting of a random forest modeling procedure, a generalized additive modeling procedure, and a support vector machine modeling procedure. In some embodiments, the plurality of predictive modeling procedures includes a first modeling procedure selected from a first family of modeling procedures and a second modeling procedure selected from a second family of modeling procedures.

In some embodiments, the method further includes: prior to determining the second accuracy scores of the predictive models, refitting the predictive models to the modified dataset representing the modified prediction problem. In some embodiments, the determined model-specific predictive value of the feature for a particular fitted model increases as the difference between the first accuracy score and the second accuracy score of the particular fitted model increases. In some embodiments, the determined model-specific predictive value of the feature for a particular fitted model includes a percentage difference between the first accuracy score and the second accuracy score of the particular fitted model, relative to the first accuracy score of the particular fitted model.

In some embodiments the method further includes determining a model-independent predictive value of the feature based on the model-specific predictive values of the feature. In some embodiments, determining the model-independent predictive value of the feature includes calculating a statistical measure of a center and/or a spread of the model-specific predictive values of the feature. In some embodiments, determining the model-independent predictive value of the feature includes calculating the statistical measure of the center of model-specific predictive values, and wherein the statistical measure of the center is selected from the group consisting of a mean, a median, and a mode of the model-specific predictive values. In some embodiments, determining the model-independent predictive value of the feature includes calculating the statistical measure of the spread of model-specific predictive values, and the statistical measure of the spread is selected from the group consisting of a range, a variance, and a standard deviation of the model-specific predictive values. In some embodiments, determining the model-independent predictive value of the feature includes calculating a combination of the model-specific predictive values of the feature. In some embodiments, calculating a combination of the model-specific predictive values includes calculating a weighted combination of the model-specific predictive values. In some embodiments, calculating the weighted combination of the model-specific predictive values includes assigning respective weights to the model-specific predictive values, wherein the weight assigned to a particular model-specific predictive value corresponding to a particular fitted predictive model increases as the first accuracy score of the fitted predictive model increases.

In some embodiments, the feature is a first feature, and the method further includes: (c1) shuffling values of a second feature across the respective observations included in the initial dataset, thereby generating a second modified dataset representing a second modified prediction problem; (d1)

determining a third respective accuracy score of each of the fitted predictive models, wherein the third accuracy score of each fitted model represents an accuracy with which the fitted model predicts one or more outcomes of the second modified prediction problem; and (e1) determining a respective model-specific predictive value of the second feature for each of the fitted models, wherein the model-specific predictive value of the second feature for each fitted model is based on the first and third accuracy scores of the fitted model.

In some embodiments, the feature is a first feature, the initial dataset includes the first feature and a plurality of second features, and the method further includes determining model-specific predictive values of the second features of the initial dataset by performing steps (c), (d), and (e) for each of the second features.

In some embodiments, the method further includes displaying, via a graphical user interface, graphical content identifying the first and second features of the initial dataset and the model-specific predictive values of the first and second features. In some embodiments, the modeling procedures are first modeling procedures including a particular modeling procedure associated with a particular predictive model, wherein the model-specific predictive values of the first and second features include particular model-specific predictive values of the first and second features that are specific to the particular predictive model, and wherein the method further includes (a1) performing a plurality of second predictive modeling procedures including the particular modeling procedure associated with the particular predictive model. In some embodiments, performing the particular predictive modeling procedures includes performing feature engineering on the initial dataset based on the particular model-specific predictive values of the first feature and the second features.

In some embodiments, performing feature engineering includes removing a particular feature from the initial dataset based on the particular feature having a low model-specific predictive value. In some embodiments, the method further includes determining that the model-specific predictive value of the particular feature is low based on the model-specific predictive value of the particular feature being lower than a threshold value and/or based on the model-specific predictive value of the particular feature being in a specified percentile of the particular model-specific predictive values for the first and second features of the initial dataset.

In some embodiments, performing feature engineering includes: generating a derived feature based on two or more particular features of the initial dataset having high model-specific predictive values; and adding the derived feature to the initial dataset, thereby generating a second initial dataset. In some embodiments, the method further includes determining that the model-specific predictive values of the particular features are high based on the model-specific predictive values of the particular features being higher than a threshold value and/or based on the model-specific predictive values of the particular features being in a specified percentile of the particular model-specific predictive values for the first and second features of the initial dataset.

In some embodiments, performing the particular predictive modeling procedure further includes fitting the particular predictive model to the second initial dataset, and the method further includes: determining a first accuracy score of the fitted particular predictive model, wherein the first accuracy score of the fitted particular model represents an accuracy with which the fitted particular model predicts one or more outcomes of the initial prediction problem; shuffling values of the first feature across respective observations included in the second initial dataset, thereby generating a second modified dataset representing a second modified prediction problem; determining a second accuracy score of the fitted particular predictive model, wherein the second accuracy score of the fitted particular model represents an accuracy with which the fitted model predicts one or more outcomes of the second modified prediction problem; and determining a second model-specific predictive value of the first feature for the fitted particular model, wherein the second model-specific predictive value of the first feature for the fitted particular model is based on the first and second accuracy scores of the fitted particular model.

In some embodiments, the method further includes, prior to performing the plurality of second modeling procedures: selecting the second modeling procedures based on suitabilities of the selected modeling procedures for the initial prediction problem, wherein a suitability of the particular predictive modeling procedure for the initial prediction problem is determined based, at least in part, on characteristics of one or more particular features of the initial dataset having high model-specific predictive values for the particular predictive modeling procedure.

In some embodiments, the method further includes: transmitting instructions to a plurality of processing nodes, the instructions including a resource allocation schedule allocating resources of the processing nodes for execution of the second modeling procedures, the resource allocation schedule being based, at least in part, on the suitabilities of the second modeling procedures for the initial prediction problem; receiving results of the execution of the second modeling procedures by the plurality of processing nodes in accordance with the resource allocation schedule, wherein the results include predictive models generated by the second modeling procedures, and/or scores of the generated models for data associated with the initial prediction problem; and selecting, from the generated models, a predictive model for the initial prediction problem based, at least in part, on the score of the selected predictive model. In some embodiments, the method further includes: generating a blended predictive model by combining two or more of the generated predictive models; and evaluating the blended predictive model.

In some embodiments, a model-independent predictive value of the feature for the modified prediction problem is less than a threshold predictive value.

According to another aspect of the present disclosure, a predictive modeling apparatus is provided, including a memory configured to store processor-executable instructions; and a processor configured to execute the processor-executable instructions, wherein executing the processor-executable instructions causes the apparatus to perform steps including: (a) performing a plurality of predictive modeling procedures, wherein each of the predictive modeling procedures is associated with a predictive model, and wherein performing each modeling procedure includes fitting the associated predictive model to an initial dataset representing an initial prediction problem; (b) determining a first respective accuracy score of each of the fitted predictive models, wherein the first accuracy score of each fitted model represents an accuracy with which the fitted model predicts one or more outcomes of the initial prediction problem; (c) shuffling values of a feature across respective observations included in the initial dataset, thereby generating a modified dataset representing a modified prediction problem; (d) determining a second respective accuracy score of each of the fitted predictive models, wherein the second accuracy score of each fitted model represents an accuracy with which the fitted model predicts one or more outcomes of the modified prediction problem; and (e) determining a respective model-specific predictive value of the feature for each of the fitted models, wherein the model-specific predictive value of the feature for each fitted model is based on the first and second accuracy scores of the fitted model.

According to another aspect of the present disclosure, an article of manufacture is provided, the article of manufacture having computer-readable instructions stored thereon that, when executed by a processor, cause the processor to perform operations including: (a) performing a plurality of predictive modeling procedures, wherein each of the predictive modeling procedures is associated with a predictive model, and wherein performing each modeling procedure includes fitting the associated predictive model to an initial dataset representing an initial prediction problem; (b) determining a first respective accuracy score of each of the fitted predictive models, wherein the first accuracy score of each fitted model represents an accuracy with which the fitted model predicts one or more outcomes of the initial prediction problem; (c) shuffling values of a feature across respective observations included in the initial dataset, thereby generating a modified dataset representing a modified prediction problem; (d) determining a second respective accuracy score of each of the fitted predictive models, wherein the second accuracy score of each fitted model represents an accuracy with which the fitted model predicts one or more outcomes of the modified prediction problem; and (e) determining a respective model-specific predictive value of the feature for each of the fitted models, wherein the model-specific predictive value of the feature for each fitted model is based on the first and second accuracy scores of the fitted model.

Other aspects and advantages of the invention will become apparent from the following drawings, detailed description, and claims, all of which illustrate the principles of the invention, by way of example only.

The foregoing Summary, including the description of motivations for some embodiments and/or advantages of some embodiments, is intended to assist the reader in understanding the present disclosure, and does not in any way limit the scope of any of the claims.

BRIEF DESCRIPTION OF THE DRAWINGS

Advantages of the some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

Overview of Predictive Modeling System

Figure 1:
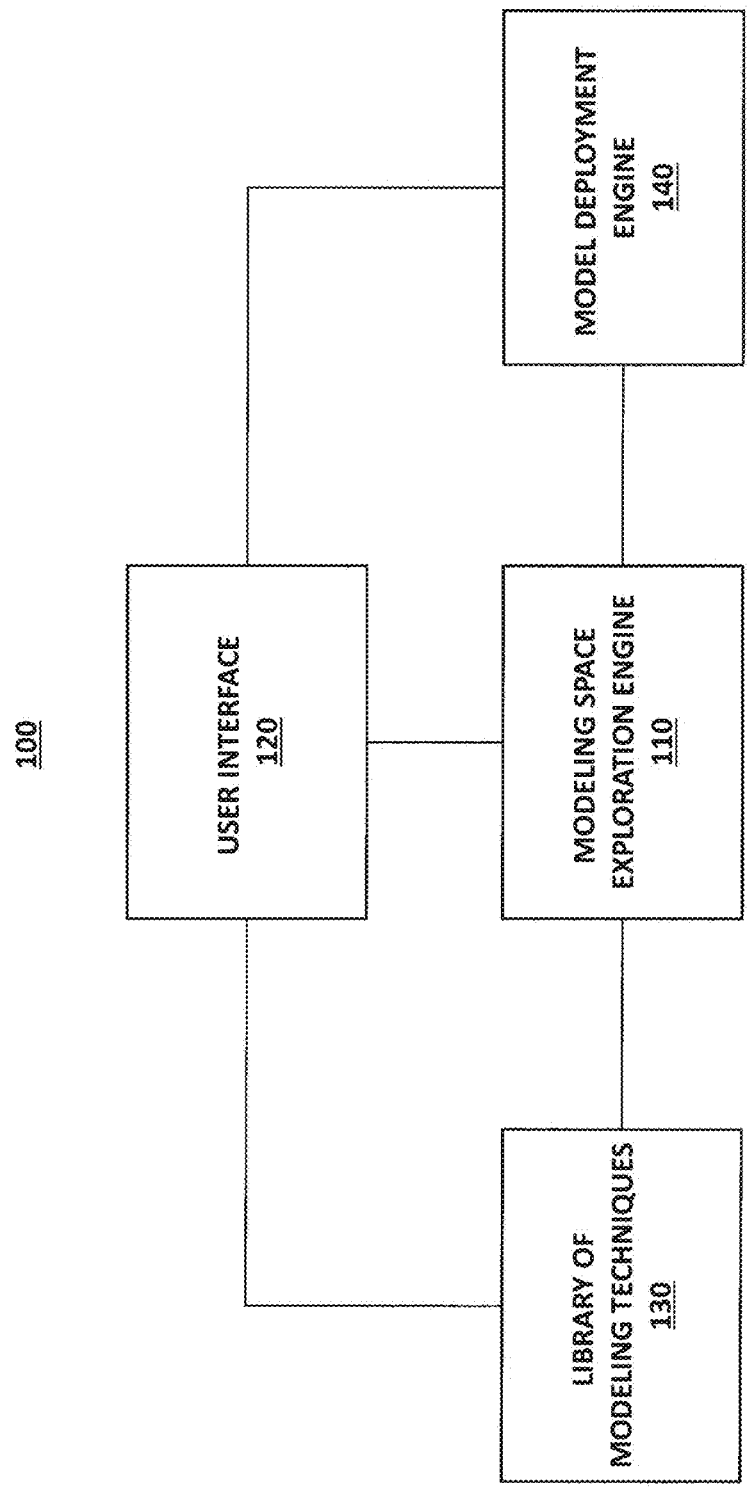
FIG. 1 is a block diagram of a predictive modeling system, in accordance with some embodiments.

Referring to FIG. 1, in some embodiments a predictive modeling system 100 includes a predictive modeling exploration engine 110, a user interface 120, a library 130 of predictive modeling techniques, and a predictive model deployment engine 140. The exploration engine 110 may implement a search technique (or "modeling methodology") for efficiently exploring the predictive modeling search space (e.g., potential combinations of pre-processing steps, modeling algorithms, and post-processing steps) to generate a predictive modeling solution suitable for a specified prediction problem. The search technique may include an initial evaluation of which predictive modeling techniques are likely to provide suitable solutions for the prediction problem. In some embodiments, the search technique includes an incremental evaluation of the search space (e.g., using increasing fractions of a dataset), and a consistent comparison of the suitability of different modeling solutions for the prediction problem (e.g., using consistent metrics). In some embodiments, the search technique adapts based on results of prior searches, which can improve the effectiveness of the search technique over time.

The exploration engine 110 may use the library 130 of modeling techniques to evaluate potential modeling solutions in the search space. In some embodiments, the modeling technique library 130 includes machine-executable templates encoding complete modeling techniques. A machine-executable template may include one or more predictive modeling algorithms. In some embodiments, the modeling algorithms included in a template may be related in some way. For example, the modeling algorithms may be variants of the same modeling algorithm or members of a family of modeling algorithms. In some embodiments, a machine-executable template further includes one or more pre-processing and/or post-processing steps suitable for use with the template's algorithm(s). The algorithm(s), pre-processing steps, and/or post-processing steps may be parameterized. A machine-executable template may be applied to a user dataset to generate potential predictive modeling solutions for the prediction problem represented by the dataset.

The exploration engine 110 may uses the computational resources of a distributed computing system to explore the search space or portions thereof. In some embodiments, the exploration engine 110 generates a search plan for efficiently executing the search using the resources of the distributed computing system, and the distributed computing system executes the search in accordance with the search plan. The distributed computing system may provide interfaces that facilitate the evaluation of predictive modeling solutions in accordance with the search plan, including, without limitation, interfaces for queuing and monitoring of predictive modeling techniques, for virtualization of the computing system's resources, for accessing databases, for partitioning the search plan and allocating the computing system's resources to evaluation of modeling techniques, for collecting and organizing execution results, for accepting user input, etc.

The user interface 120 provides tools for monitoring and/or guiding the search of the predictive modeling space. These tools may provide insight into a prediction problem's dataset (e.g., by highlighting problematic variables in the dataset, identifying relationships between variables in the dataset, etc.), and/or insight into the results of the search. In some embodiments, data analysts may use the interface to guide the search, e.g., by specifying the metrics to be used to evaluate and compare modeling solutions, by specifying the criteria for recognizing a suitable modeling solution, etc. Thus, the user interface may be used by analysts to improve their own productivity, and/or to improve the performance of the exploration engine 110. In some embodiments, user interface 120 presents the results of the search in real-time, and permits users to guide the search (e.g., to adjust the scope of the search or the allocation of resources among the evaluations of different modeling solutions) in real-time. In some embodiments, user interface 120 provides tools for coordinating the efforts of multiple data analysts working on the same prediction problem and/or related prediction problems.

In some embodiments, the user interface 120 provides tools for developing machine-executable templates for the library 130 of modeling techniques. System users may use these tools to modify existing templates, to create new templates, or to remove templates from the library 130. In this way, system users may update the library 130 to reflect advances in predictive modeling research, and/or to include proprietary predictive modeling techniques.

The model deployment engine 140 provides tools for deploying predictive models in operational environments (e.g., predictive models generated by exploration engine 110). In some embodiments, the model deployment engine also provides tools for monitoring and/or updating predictive models. System users may use the deployment engine 140 to deploy predictive models generated by exploration engine 110, to monitor the performance of such predictive models, and to update such models (e.g., based on new data or advancements in predictive modeling techniques). In some embodiments, exploration engine 110 may use data collected and/or generated by deployment engine 140 (e.g., based on results of monitoring the performance of deployed predictive models) to guide the exploration of a search space for a prediction problem (e.g., to re-fit or tune a predictive model in response to changes in the underlying dataset for the prediction problem).

These and other aspects of predictive modeling system 100 are described in further detail below.

Library of Modeling Techniques

Library 130 of predictive modeling techniques includes machine-executable templates encoding complete predictive modeling techniques. In some embodiments, a machine-executable template includes one or more predictive modeling algorithms, zero or more pre-processing steps suitable for use with the algorithm(s), and zero or more post-processing steps suitable for use with the algorithm(s). The algorithm(s), pre-processing steps, and/or post-processing steps may be parameterized. A machine-executable template may be applied to a dataset to generate potential predictive modeling solutions for the prediction problem represented by the dataset.

A template may encode, for machine execution, pre-processing steps, model-fitting steps, and/or post-processing steps suitable for use with the template's predictive modeling algorithm(s). Examples of pre-processing steps include, without limitation, imputing missing values, feature engineering (e.g., one-hot encoding, splines, text mining, etc.), feature selection (e.g., dropping uninformative features, dropping highly correlated features, replacing original features by top principal components, etc.). Examples of model-fitting steps include, without limitation, algorithm selection, parameter estimation, hyper-parameter tuning, scoring, diagnostics, etc. Examples of post-processing steps include, without limitation, calibration of predictions, censoring, blending, etc.

In some embodiments, a machine-executable template includes metadata describing attributes of the predictive modeling technique encoded by the template. The metadata may indicate one or more data processing techniques that the template can perform as part of a predictive modeling solution (e.g., in a pre-processing step, in a post-processing step, or in a step of predictive modeling algorithm). These data processing techniques may include, without limitation, text mining, feature normalization, dimension reduction, or other suitable data processing techniques. Alternatively or in addition, the metadata may indicate one or more data processing constraints imposed by the predictive modeling technique encoded by the template, including, without limitation, constraints on dimensionality of the dataset, characteristics of the prediction problem's target(s), and/or characteristics of the prediction problem's feature(s).

In some embodiments, a template's metadata includes information relevant to estimating how well the corresponding modeling technique will work for a given dataset. For example, a template's metadata may indicate how well the corresponding modeling technique is expected to perform on datasets having particular characteristics, including, without limitation, wide datasets, tall datasets, sparse datasets, dense datasets, datasets that do or do not include text, datasets that include variables of various data types (e.g., numerical, ordinal, categorical, interpreted (e.g., date, time, text), etc.), datasets that include variables with various statistical properties (e.g., statistical properties relating to the variable's missing values, cardinality, distribution, etc.), etc. As another example, a template's metadata may indicate how well the corresponding modeling technique is expected to perform for a prediction problem involving target variables of a particular type. In some embodiments, a template's metadata indicates the corresponding modeling technique's expected performance in terms of one or more performance metrics (e.g., objective functions).

In some embodiments, a template's metadata includes characterizations of the processing steps implemented by the corresponding modeling technique, including, without limitation, the processing steps' allowed data type(s), structure, and/or dimensionality.

In some embodiments, a template's metadata includes data indicative of the results (actual or expected) of applying the predictive modeling technique represented by the template to one or more prediction problems and/or datasets. The results of applying a predictive modeling technique to a prediction problem or dataset may include, without limitation, the accuracy with which predictive models generated by the predictive modeling technique predict the target(s) of the prediction problem or dataset, the rank of accuracy of the predictive models generated by the predictive modeling technique (relative to other predictive modeling techniques) for the prediction problem or dataset, a score representing the utility of using the predictive modeling technique to generate a predictive model for the prediction problem or dataset (e.g., the value produced by the predictive model for an objective function), etc.

The data indicative of the results of applying a predictive modeling technique to a prediction problem or dataset may be provided by exploration engine 110 (e.g., based on the results of previous attempts to use the predictive modeling technique for the prediction problem or the dataset), provided by a user (e.g., based on the user's expertise), and/or obtained from any other suitable source. In some embodiments, exploration engine 110 updates such data based, at least in part, on the relationship between actual outcomes of instances of a prediction problem and the outcomes predicted by a predictive model generated via the predictive modeling technique.

In some embodiments, a template's metadata describes characteristics of the corresponding modeling technique relevant to estimating how efficiently the modeling technique will execute on a distributed computing infrastructure. For example, a template's metadata may indicate the processing resources needed to train and/or test the modeling technique on a dataset of a given size, the effect on resource consumption of the number of cross-validation folds and number of points searched in the hyper-parameter space, the intrinsic parallelization of the processing steps performed by the modeling technique, etc.

In some embodiments, the library 130 of modeling techniques includes tools for assessing the similarities (or differences) between predictive modeling techniques. Such tools may express the similarity between two predictive modeling techniques as a score (e.g., on a predetermined scale), a classification (e.g., "highly similar", "somewhat similar", "somewhat dissimilar", "highly dissimilar"), a binary determination (e.g., "similar" or "not similar"), etc. Such tools may determine the similarity between two predictive modeling techniques based on the processing steps that are common to the modeling techniques, based on the data indicative of the results of applying the two predictive modeling techniques to the same or similar prediction problems, etc. For example, given two predictive modeling techniques that have a large number (or high percentage) of their processing steps in common and/or yield similar results when applied to similar prediction problems, the tools may assign the modeling techniques a high similarity score or classify the modeling techniques as "highly similar".

In some embodiments, the modeling techniques may be assigned to families of modeling techniques. The familial classifications of the modeling techniques may be assigned by a user (e.g., based on intuition and experience), assigned by a machine-learning classifier (e.g., based on processing steps common to the modeling techniques, data indicative of the results of applying different modeling techniques to the same or similar problems, etc.), or obtained from another suitable source. The tools for assessing the similarities between predictive modeling techniques may rely on the familial classifications to assess the similarity between two modeling techniques. In some embodiments, the tool may treat all modeling techniques in the same family as "similar" and treat any modeling techniques in different families as "not similar". In some embodiments, the familial classifications of the modeling techniques may be just one factor in the tool's assessment of the similarity between modeling techniques.

In some embodiments, predictive modeling system 100 includes a library of prediction problems (not shown in FIG. 1). The library of prediction problems may include data indicative of the characteristics of prediction problems. In some embodiments, the data indicative of the characteristics of prediction problems includes data indicative of characteristics of datasets representing the prediction problem. Characteristics of a dataset may include, without limitation, the dataset's width, height, sparseness, or density; the number of targets and/or features in the dataset, the data types of the data set's variables (e.g., numerical, ordinal, categorical, or interpreted (e.g., date, time, text, etc.); the ranges of the dataset's numerical variables; the number of classes for the dataset's ordinal and categorical variables; etc.

In some embodiments, characteristics of a dataset include statistical properties of the dataset's variables, including, without limitation, the number of total observations; the number of unique values for each variable across observations; the number of missing values of each variable across observations; the presence and extent of outliers and inliers; the properties of the distribution of each variable's values or class membership; cardinality of the variables; etc. In some embodiments, characteristics of a dataset include relationships (e.g., statistical relationships) between the dataset's variables, including, without limitation, the joint distributions of groups of variables; the variable importance of one or more features to one or more targets (e.g., the extent of correlation between feature and target variables); the statistical relationships between two or more features (e.g., the extent of multicollinearity between two features); etc.

In some embodiments, the data indicative of the characteristics of the prediction problems includes data indicative of the subject matter of the prediction problem (e.g., finance, insurance, defense, e-commerce, retail, internet-based advertising, internet-based recommendation engines, etc.); the provenance of the variables (e.g., whether each variable was acquired directly from automated instrumentation, from human recording of automated instrumentation, from human measurement, from written human response, from verbal human response, etc.); the existence and performance of known predictive modeling solutions for the prediction problem; etc.

In some embodiments, predictive modeling system 100 may support time-series prediction problems (e.g., uni-dimensional or multi-dimensional time-series prediction problems). For time-series prediction problems, the objective is generally to predict future values of the targets as a function of prior observations of all features, including the targets themselves. The data indicative of the characteristics of a prediction problem may accommodate time-series prediction problems by indicating whether the prediction problem is a time-series prediction problem, and by identifying the time measurement variable in datasets corresponding to time-series prediction problems.

In some embodiments, the library of prediction problems includes tools for assessing the similarities (or differences) between prediction problems. Such tools may express the similarity between two prediction problems as a score (e.g., on a predetermined scale), a classification (e.g., "highly similar", "somewhat similar", "somewhat dissimilar", "highly dissimilar"), a binary determination (e.g., "similar" or "not similar"), etc. Such tools may determine the similarity between two prediction problems based on the data indicative of the characteristics of the prediction problems, based on data indicative of the results of applying the same or similar predictive modeling techniques to the prediction problems, etc. For example, given two prediction problems represented by datasets that have a large number (or high percentage) of characteristics in common and/or are susceptible to the same or similar predictive modeling techniques, the tools may assign the prediction problems a high similarity score or classify the prediction problems as "highly similar".

Figure 2:
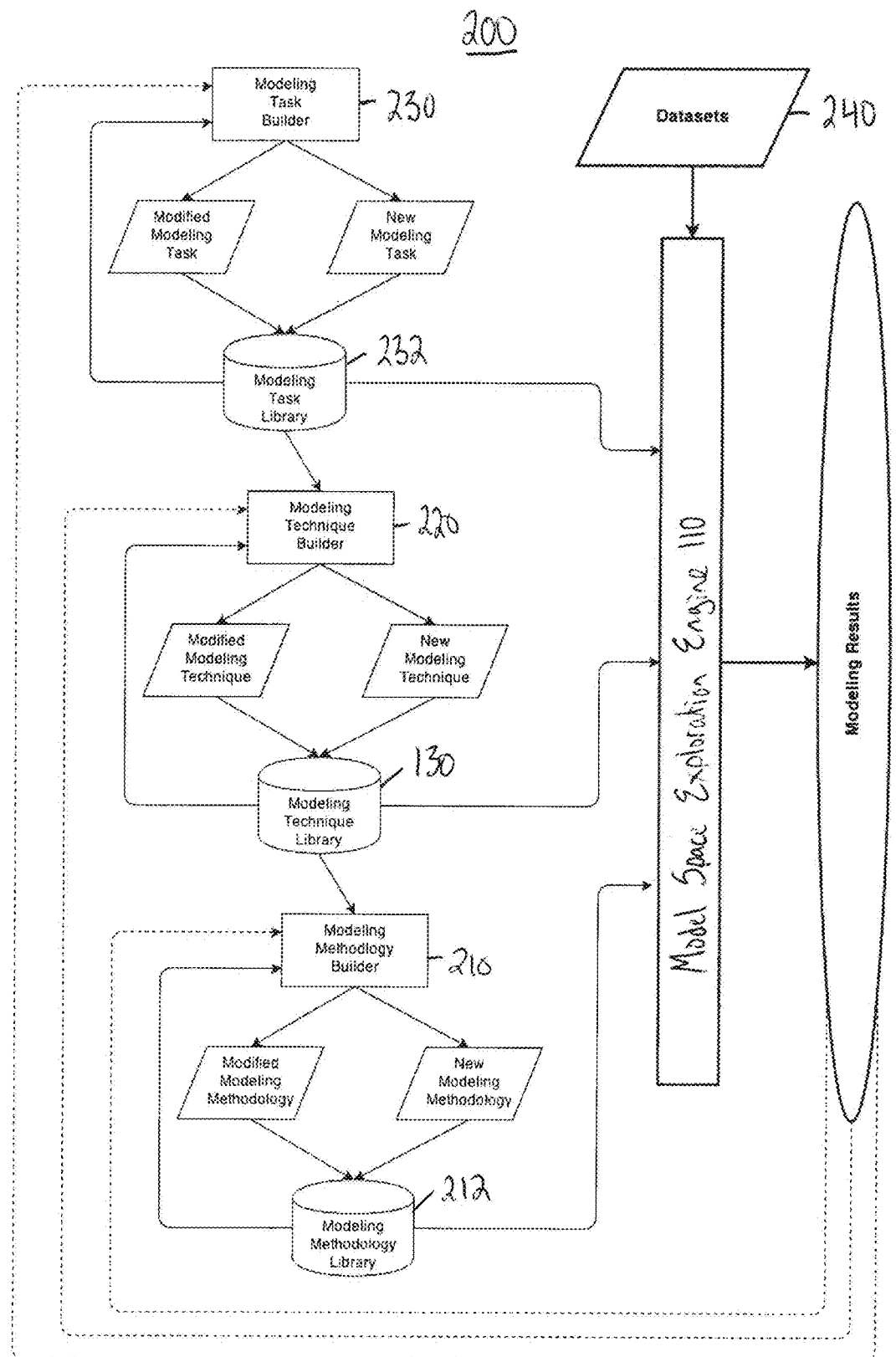
FIG. 2 is a block diagram of a modeling tool for building machine-executable templates encoding predictive modeling tasks, techniques, and methodologies, in accordance with some embodiments.

FIG. 2 illustrates a block diagram of a modeling tool 200 suitable for building machine-executable templates encoding predictive modeling techniques and for integrating such templates into predictive modeling methodologies, in accordance with some embodiments. User interface 120 may provide an interface to modeling tool 200.

In the example of FIG. 2, a modeling methodology builder 210 builds a library 212 of modeling methodologies on top of a library 130 of modeling techniques. A modeling technique builder 220 builds the library 130 of modeling techniques on top of a library 232 of modeling tasks. A modeling methodology may correspond to one or more analysts' intuition about and experience of what modeling techniques work well in which circumstances, and/or may leverage results of the application of modeling techniques to previous prediction problems to guide exploration of the modeling search space for a prediction problem. A modeling technique may correspond to a step-by-step recipe for applying a specific modeling algorithm. A modeling task may correspond to a processing step within a modeling technique.

In some embodiments, a modeling technique may include a hierarchy of tasks. For example, a top-level "text mining" task may include sub-tasks for (a) creating a document-term matrix and (b) ranking terms and dropping unimportant terms. In turn, the "term ranking and dropping" sub-task may include sub-tasks for (b.1) building a ranking model and (b.2) using term ranks to drop columns from a document-term matrix. Such hierarchies may have arbitrary depth.

In the example of FIG. 2, modeling tool 200 includes a modeling task builder 230, a modeling technique builder 220, and a modeling methodology builder 210. Each builder may include a tool or set of tools for encoding one of the modeling elements in a machine-executable format. Each builder may permit users to modify an existing modeling element or create a new modeling element. To construct a complete library of modeling elements across the modeling layers illustrated in FIG. 2, developers may employ a top-down, bottom-up, inside-out, outside-in, or combination strategy. However, from the perspective of logical dependency, leaf-level tasks are the smallest modeling elements, so FIG. 2 depicts task creation as the first step in the process of constructing machine-executable templates.

Each builder's user interface may be implemented using, without limitation, a collection of specialized routines in a standard programming language, a formal grammar designed specifically for the purpose of encoding that builder's elements, a rich user interface for abstractly specifying the desired execution flow, etc. However, the logical structure of the operations allowed at each layer is independent of any particular interface.

When creating modeling tasks at the leaf level in the hierarchy, modeling tool 200 may permit developers to incorporate software components from other sources. This capability leverages the installed base of software related to statistical learning and the accumulated knowledge of how to develop such software. This installed base covers scientific programming languages (e.g., Fortran), scientific routines written in general purpose programming languages (e.g., C), scientific computing extensions to general-purpose programming languages (e.g., scikit-learn for Python), commercial statistical environments (e.g., SAS/STAT), and open source statistical environments (e.g., R). When used to incorporate the capabilities of such a software component, the modeling task builder 230 may require a specification of the software component's inputs and outputs, and/or a characterization of what types of operations the software component can perform. In some embodiments, the modeling task builder 230 generates this metadata by inspecting a software component's source code signature, retrieving the software components' interface definition from a repository, probing the software component with a sequence of requests, or performing some other form of automated evaluation. In some embodiments, the developer manually supplies some or all of this metadata.

In some embodiments, the modeling task builder 230 uses this metadata to create a "wrapper" that allows it to execute the incorporated software. The modeling task builder 230 may implement such wrappers utilizing any mechanism for integrating software components, including, without limitation, compiling a component's source code into an internal executable, linking a component's object code into an internal executable, accessing a component through an emulator of the computing environment expected by the component's standalone executable, accessing a component's functions running as part of a software service on a local machine, accessing a components functions running as part of a software service on a remote machine, accessing a component's function through an intermediary software service running on a local or remote machine, etc. No matter which incorporation mechanism the modeling task builder 230 uses, after the wrapper has been generated, modeling tool 200 may make software calls to the component as it would any other routine.

In some embodiments, developers may use the modeling task builder 230 to assemble leaf-level modeling tasks recursively into higher-level tasks. As indicated previously, there are many different ways to implement the user interface for specifying the arrangement of the task hierarchy. But from a logical perspective, a task that is not at the leaf-level may include a directed graph of sub-tasks. At each of the top and intermediate levels of this hierarchy, there may be one starting sub-task whose input is from the parent task in the hierarchy (or the parent modeling technique at the top level of the hierarchy). There may also be one ending sub-task whose output is to the parent task in the hierarchy (or the parent modeling technique at the top level of the hierarchy). Every other sub-task at a given level may receive inputs from one or more previous sub-tasks and sends outputs to one or more subsequent sub-tasks.

Combined with the ability to incorporate arbitrary code in leaf-level tasks, propagating data according to the directed graph facilitates implementation of arbitrary control flows within an intermediate-level task. In some embodiments, modeling tool 200 may provide additional built-in operations. For example, while it would be straightforward to implement any particular conditional logic as a leaf-level task coded in an external programming language, the modeling task builder 230 may provide a built-in node or arc that performs conditional evaluations in a general fashion, directing some or all of the data from a node to different subsequent nodes based on the results of these evaluations. Similar alternatives exist for filtering the output from one node according to a rule or expression before propagating it as input to subsequent nodes, transforming the output from one node before propagating it as input to subsequent nodes, partitioning the output from one node according to a rule or expression before propagating each partition to a respective subsequent node, combining the output of multiple previous nodes according to a rule or formula before accepting it as input, iteratively applying a sub-graph of nodes' operations using one or more loop variables, etc.

In some embodiments, developers may use the modeling technique builder 220 to assemble tasks from the modeling task library 232 into modeling techniques. At least some of the modeling tasks in modeling task library 232 may correspond to the pre-processing steps, model-fitting steps, and/or post-processing steps of one or more modeling techniques. The development of tasks and techniques may follow a linear pattern, in which techniques are assembled after the task library 232 is populated, or a more dynamic, circular pattern, in which tasks and techniques are assembled concurrently. A developer may be inspired to combine existing tasks into a new technique, realize that this technique requires new tasks, and iteratively refine until the new technique is complete. Alternatively, a developer may start with the conception of a new technique, perhaps from an academic publication, begin building it from new tasks, but pull existing tasks from the modeling task library 232 when they provide suitable functionality. In all cases, the results from applying a modeling technique to reference datasets or in field tests will allow the developer or analyst to evaluate the performance of the technique. This evaluation may, in turn, result in changes anywhere in the hierarchy from leaf-level modeling task to modeling technique. By providing common modeling task and modeling technique libraries (232, 130) as well as high productivity builder interfaces (210, 220, and 230), modeling tool 200 may enable developers to make changes rapidly and accurately, as well as propagate such enhancements to other developers and users with access to the libraries (232, 130).

A modeling technique may provide a focal point for developers and analysts to conceptualize an entire predictive modeling procedure, with all the steps expected based on the best practices in the field. In some embodiments, modeling techniques encapsulate best practices from statistical learning disciplines. Moreover, the modeling tool 200 can provide guidance in the development of high-quality techniques by, for example, providing a checklist of steps for the developer to consider and comparing the task graphs for new techniques to those of existing techniques to, for example, detect missing tasks, detect additional steps, and/or detect anomalous flows among steps.

In some embodiments, exploration engine 110 is used to build a predictive model for a dataset 240 using the techniques in the modeling technique library 130. The exploration engine 110 may prioritize the evaluation of the modeling techniques in modeling technique library 130 based on a prioritization scheme encoded by a modeling methodology selected from the modeling methodology library 212. Examples of suitable prioritization schemes for exploration of the modeling space are described in the next section. In the example of FIG. 2, results of the exploration of the modeling space may be used to update the metadata associated with modeling tasks and techniques.

In some embodiments, unique identifiers (IDs) may be assigned to the modeling elements (e.g., techniques, tasks, and sub-tasks). The ID of a modeling element may be stored as metadata associated with the modeling element's template. In some embodiments, these modeling element IDs may be used to efficiently execute modeling techniques that share one or more modeling tasks or sub-tasks. Methods of efficiently executing modeling techniques are described in further detail below.

In the example of FIG. 2, the modeling results produced by exploration engine 110 are fed back to the modeling task builder 230, the modeling technique builder 220, and the modeling methodology builder 210. The modeling builders may be adapted automatically (e.g., using a statistical learning algorithm) or manually (e.g., by a user) based on the modeling results. For example, modeling methodology builder 210 may be adapted based on patterns observed in the modeling results and/or based on a data analyst's experience. Similarly, results from executing specific modeling techniques may inform automatic or manual adjustment of default tuning parameter values for those techniques or tasks within them. In some embodiments, the adaptation of the modeling builders may be semi-automated. For example, predictive modeling system 100 may flag potential improvements to methodologies, techniques, and/or tasks, and a user may decide whether to implement those potential improvements.

Modeling Space Exploration Engine

Figure 3:
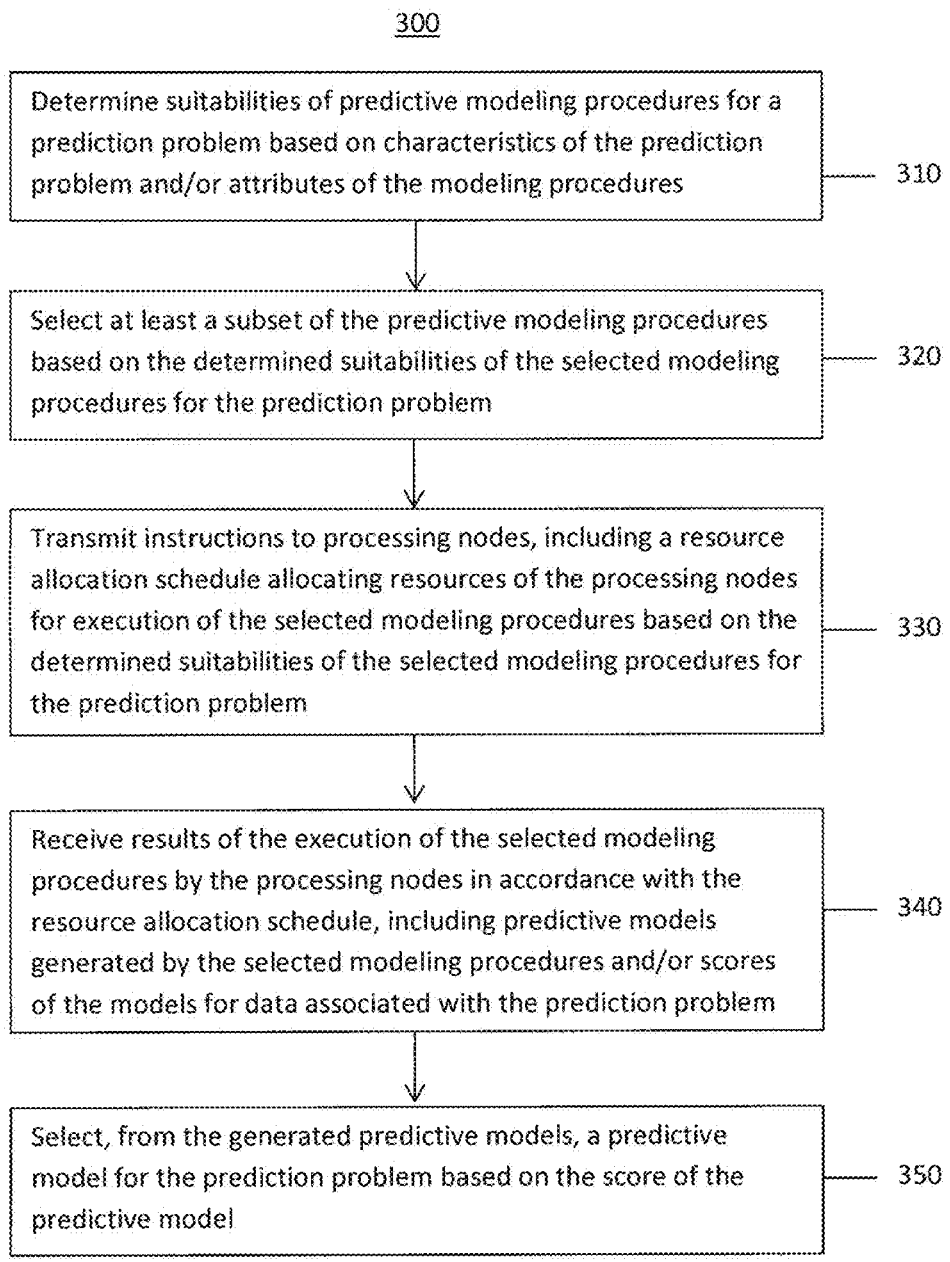
FIG. 3 is a flowchart of a method for selecting a predictive model for a prediction problem, in accordance with some embodiments.

FIG. 3 is a flowchart of a method 300 for selecting a predictive model for a prediction problem, in accordance with some embodiments. In some embodiments, method 300 may correspond to a modeling methodology in the modeling methodology library 212.

At step 310 of method 300, the suitabilities of a plurality of predictive modeling procedures (e.g., predictive modeling techniques) for a prediction problem are determined. A predictive modeling procedure's suitability for a prediction problem may be determined based on characteristics of the prediction problem, based on attributes of the modeling procedures, and/or based on other suitable information.

The "suitability" of a predictive modeling procedure for a prediction problem may include data indicative of the expected performance on the prediction problem of predictive models generated using the predictive modeling procedure. In some embodiments, a predictive model's expected performance on a prediction problem includes one or more expected scores (e.g., expected values of one or more objective functions) and/or one or more expected ranks (e.g., relative to other predictive models generated using other predictive modeling techniques).

Alternatively or in addition, the "suitability" of a predictive modeling procedure for a prediction problem may include data indicative of the extent to which the modeling procedure is expected to generate predictive models that provide adequate performance for a prediction problem. In some embodiments, a predictive modeling procedure's "suitability" data includes a classification of the modeling procedure's suitability. The classification scheme may have two classes (e.g., "suitable" or "not suitable") or more than two classes (e.g., "highly suitable", "moderately suitable", "moderately unsuitable", "highly unsuitable").

In some embodiments, exploration engine 110 determines the suitability of a predictive modeling procedure for a prediction problem based, at least in part, on one or more characteristics of the prediction problem, including (but not limited to) characteristics described herein. As just one example, the suitability of a predictive modeling procedure for a prediction problem may be determined based on characteristics of the dataset corresponding to the prediction problem, characteristics of the variables in the dataset corresponding to the prediction problem, relationships between the variables in the dataset, and/or the subject matter of the prediction problem. Exploration engine 110 may include tools (e.g., statistical analysis tools) for analyzing datasets associated with prediction problems to determine the characteristics of the prediction problems, the datasets, the dataset variables, etc.

In some embodiments, exploration engine 110 determines the suitability of a predictive modeling procedure for a prediction problem based, at least in part, on one or more attributes of the predictive modeling procedure, including (but not limited to) the attributes of predictive modeling procedures described herein. As just one example, the suitability of a predictive modeling procedure for a prediction problem may be determined based on the data processing techniques performed by the predictive modeling procedure and/or the data processing constraints imposed by the predictive modeling procedure.

In some embodiments, determining the suitabilities of the predictive modeling procedures for the prediction problem comprises eliminating at least one predictive modeling procedure from consideration for the prediction problem. The decision to eliminate a predictive modeling procedure from consideration may be referred to herein as "pruning" the eliminated modeling procedure and/or "pruning the search space". In some embodiments, the user can override the exploration engine's decision to prune a modeling procedure, such that the previously pruned modeling procedure remains eligible for further execution and/or evaluation during the exploration of the search space.

A predictive modeling procedure may be eliminated from consideration based on the results of applying one or more deductive rules to the attributes of the predictive modeling procedure and the characteristics of the prediction problem. The deductive rules may include, without limitation, the following: (1) if the prediction problem includes a categorical target variable, select only classification techniques for execution; (2) if numeric features of the dataset span vastly different magnitude ranges, select or prioritize techniques that provide normalization; (3) if a dataset has text features, select or prioritize techniques that provide text mining; (4) if the dataset has more features than observations, eliminate all techniques that require the number of observations to be greater than or equal to the number of features; (5) if the width of the dataset exceeds a threshold width, select or prioritize techniques that provide dimension reduction; (6) if the dataset is large and sparse (e.g., the size of the dataset exceeds a threshold size and the sparseness of the dataset exceeds a threshold sparseness), select or prioritize techniques that execute efficiently on sparse data structures; and/or any rule for selecting, prioritizing, or eliminating a modeling technique wherein the rule can be expressed in the form of an if-then statement. In some embodiments, deductive rules are chained so that the execution of several rules in sequence produces a conclusion. In some embodiments, the deductive rules may be updated, refined, or improved based on historical performance.

In some embodiments, exploration engine 110 determines the suitability of a predictive modeling procedure for a prediction problem based on the performance (expected or actual) of similar predictive modeling procedures on similar prediction problems. (As a special case, exploration engine 110 may determine the suitability of a predictive modeling procedure for a prediction problem based on the performance (expected or actual) of the same predictive modeling procedure on similar prediction problems.)

As described above, the library of modeling techniques 130 may include tools for assessing the similarities between predictive modeling techniques, and the library of prediction problems may include tools for assessing the similarities between prediction problems. Exploration engine 110 may use these tools to identify predictive modeling procedures and prediction problems similar to the predictive modeling procedure and prediction problem at issue. For purposes of determining the suitability of a predictive modeling procedure for a prediction problem, exploration engine 110 may select the M modeling procedures most similar to the modeling procedure at issue, select all modeling procedures exceeding a threshold similarity value with respect to the modeling procedure at issue, etc. Likewise, for purposes of determining the suitability of a predictive modeling procedure for a prediction problem, exploration engine 110 may select the N prediction problems most similar to the prediction problem at issue, select all prediction problems exceeding a threshold similarity value with respect to the prediction problem at issue, etc.

Given a set of predictive modeling procedures and a set of prediction problems similar to the modeling procedure and prediction problem at issue, exploration engine may combine the performances of the similar modeling procedures on the similar prediction problems to determine the expected suitability of the modeling procedure at issue for the prediction problem at issue. As described above, the templates of modeling procedures may include information relevant to estimating how well the corresponding modeling procedure will perform for a given dataset. Exploration engine 110 may use the model performance metadata to determine the performance values (expected or actual) of the similar modeling procedures on the similar prediction problems. These performance values can then be combined to generate an estimate of the suitability of the modeling procedure at issue for the prediction problem at issue. For example, exploration engine 110 may calculate the suitability of the modeling procedure at issue as a weighted sum of the performance values of the similar modeling procedures on the similar prediction problems.

In some embodiments, exploration engine 110 determines the suitability of a predictive modeling procedure for a prediction problem based, at least in part, on the output of a "meta" machine-learning model, which may be trained to determine the suitability of a modeling procedure for a prediction problem based on the results of various modeling procedures (e.g., modeling procedures similar to the modeling procedure at issue) for other prediction problems (e.g., prediction problems similar to the prediction problem at issue). The machine-learning model for estimating the suitability of a predictive modeling procedure for a prediction problem may be referred to as a "meta" machine-learning model because it applies machine learning recursively to predict which techniques are most likely to succeed for the prediction problem at issue. Exploration engine 110 may therefore produce meta-predictions of the suitability of a modeling technique for a prediction problem by using a meta-machine-learning algorithm trained on the results from solving other prediction problems.

In some embodiments, exploration engine 110 may determine the suitability of a predictive modeling procedure for a prediction problem based, at least in part, on user input (e.g., user input representing the intuition or experience of data analysts regarding the predictive modeling procedure's suitability).

Returning to FIG. 3, at step 320 of method 300, at least a subset of the predictive modeling procedures may be selected based on the suitabilities of the modeling procedures for the prediction problem. In embodiments where the modeling procedures have been assigned to suitability categories (e.g., "suitable" or "not suitable"; "highly suitable", "moderately suitable", "moderately unsuitable", or "highly unsuitable"; etc.), selecting a subset of the modeling procedures may comprise selecting the modeling procedures assigned to one or more suitability categories (e.g., all modeling procedures assigned to the "suitable category"; all modeling procedures not assigned to the "highly unsuitable" category; etc.).

In embodiments where the modeling procedures have been assigned suitability values, exploration engine 110 may select a subset of the modeling procedures based on the suitability values. In some embodiments, exploration engine 110 selects the modeling procedures with suitability scores above a threshold suitability score. The threshold suitability score may be provided by a user or determined by exploration engine 110. In some embodiments, exploration engine 110 may adjust the threshold suitability score to increase or decrease the number of modeling procedures selected for execution, depending on the amount of processing resources available for execution of the modeling procedures.

In some embodiments, exploration engine 110 selects the modeling procedures with suitability scores within a specified range of the highest suitability score assigned to any of the modeling procedures for the prediction problem at issue. The range may be absolute (e.g., scores within S points of the highest score) or relative (e.g., scores within P % of the highest score). The range may be provided by a user or determined by exploration engine 110. In some embodiments, exploration engine 110 may adjust the range to increase or decrease the number of modeling procedures selected for execution, depending on the amount of processing resources available for execution of the modeling procedures.

In some embodiments, exploration engine 110 selects a fraction of the modeling procedures having the highest suitability scores for the prediction problem at issue. Equivalently, the exploration engine 110 may select the fraction of the modeling procedures having the highest suitability ranks (e.g., in cases where the suitability scores for the modeling procedures are not available, but the ordering (ranking) of the modeling procedures' suitabilities is available). The fraction may be provided by a user or determined by exploration engine 110. In some embodiments, exploration engine 110 may adjust the fraction to increase or decrease the number of modeling procedures selected for execution, depending on the amount of processing resources available for execution of the modeling procedures.

In some embodiments, a user may select one or more modeling procedures to be executed. The user-selected procedures may be executed in addition to or in lieu of one or more modeling procedures selected by exploration engine 110. Allowing the users to select modeling procedures for execution may improve the performance of predictive modeling system 100, particularly in scenarios where a data analyst's intuition and experience indicate that the modeling system 100 has not accurately estimated a modeling procedure's suitability for a prediction problem.

In some embodiments, exploration engine 110 may control the granularity of the search space evaluation by selecting a modeling procedure P0 that is representative of (e.g., similar to) one or more other modeling procedures P1 . . . PN, rather than selecting modeling procedures P0 . . . PN, even if modeling procedures P0 . . . PN are all determined to be suitable for the prediction problem at issue. In addition, exploration engine 110 may treat the results of executing the selected modeling procedure P0 as being representative of the results of executing the modeling procedures P1 . . . PN. This coarse-grained approach to evaluating the search space may conserve processing resources, particularly if applied during the earlier stages of the evaluation of the search space. If exploration engine 110 later determines that modeling procedure P0 is among the most suitable modeling procedures for the prediction problem, a fine-grained evaluation of the relevant portion of the search space can then be performed by executing and evaluating the similar modeling procedures P1 . . . PN.

Returning to FIG. 3, at step 330 of method 300, a resource allocation schedule may be generated. The resource allocation schedule may allocate processing resources for the execution of the selected modeling procedures. In some embodiments, the resource allocation schedule allocates the processing resources to the modeling procedures based on the determined suitabilities of the modeling procedures for the prediction problem at issue. In some embodiments, exploration engine 110 transmits the resource allocation schedule to one or more processing nodes with instructions for executing the selected modeling procedures according to the resource allocation schedule.

The allocated processing resources may include temporal resources (e.g., execution cycles of one or more processing nodes, execution time on one or more processing nodes, etc.), physical resources (e.g., a number of processing nodes, an amount of machine-readable storage (e.g., memory and/or secondary storage), etc.), and/or other allocable processing resources. In some embodiments, the allocated processing resources may be processing resources of a distributed computing system and/or a cloud-based computing system. In some embodiments, costs may be incurred when processing resources are allocated and/or used (e.g., fees may be collected by an operator of a data center in exchange for using the data center's resources).

As indicated above, the resource allocation schedule may allocate processing resources to modeling procedures based on the suitabilities of the modeling procedures for the prediction problem at issue. For example, the resource allocation schedule may allocate more processing resources to modeling procedures with higher predicted suitabilities for the prediction problem, and allocate fewer processing resources to modeling procedures with lower predicted suitabilities for the prediction problem, so that the more promising modeling procedures benefit from a greater share of the limited processing resources. As another example, the resource allocation schedule may allocate processing resources sufficient for processing larger datasets to modeling procedures with higher predicted suitabilities, and allocate processing resources sufficient for processing smaller datasets to modeling procedures with lower predicted suitabilities.

As another example, the resource allocation schedule may schedule execution of the modeling procedures with higher predicted suitabilities prior to execution of the modeling procedures with lower predicted suitabilities, which may also have the effect of allocating more processing resources to the more promising modeling procedures. In some embodiments, the results of executing the modeling procedures may be presented to the user via user interface 120 as the results become available. In such embodiments, scheduling the modeling procedures with higher predicted suitabilities to execute before the modeling procedures with lower predicted suitabilities may provide the user with additional important information about the evaluation of the search space at an earlier phase of the evaluation, thereby facilitating rapid user-driven adjustments to the search plan. For example, based on the preliminary results, the user may determine that one or more modeling procedures that were expected to perform very well are actually performing very poorly. The user may investigate the cause of the poor performance and determine, for example, that the poor performance is caused by an error in the preparation of the dataset. The user can then fix the error and restart execution of the modeling procedures that were affected by the error.

In some embodiments, the resource allocation schedule may allocate processing resources to modeling procedures based, at least in part, on the resource utilization characteristics and/or parallelism characteristics of the modeling procedures. As described above, the template corresponding to a modeling procedure may include metadata relevant to estimating how efficiently the modeling procedure will execute on a distributed computing infrastructure. In some embodiments, this metadata includes an indication of the modeling procedure's resource utilization characteristics (e.g., the processing resources needed to train and/or test the modeling procedure on a dataset of a given size). In some embodiments, this metadata includes an indication of the modeling procedure's parallelism characteristics (e.g., the extent to which the modeling procedure can be executed in parallel on multiple processing nodes). Using the resource utilization characteristics and/or parallelism characteristics of the modeling procedures to determine the resource allocation schedule may facilitate efficient allocation of processing resources to the modeling procedures.

In some embodiments, the resource allocation schedule may allocate a specified amount of processing resources for the execution of the modeling procedures. The allocable amount of processing resources may be specified in a processing resource budget, which may be provided by a user or obtained from another suitable source. The processing resource budget may impose limits on the processing resources to be used for executing the modeling procedures (e.g., the amount of time to be used, the number of processing nodes to be used, the cost incurred for using a data center or cloud-based processing resources, etc.). In some embodiments, the processing resource budget may impose limits on the total processing resources to be used for the process of generating a predictive model for a specified prediction problem.

Returning to FIG. 3, at step 340 of method 300, the results of executing the selected modeling procedures in accordance with the resource allocation schedule may be received. These results may include one or more predictive models generated by the executed modeling procedures. In some embodiments, the predictive models received at step 340 are fitted to dataset(s) associated with the prediction problem, because the execution of the modeling procedures may include fitting of the predictive models to one or more datasets associated with the prediction problem. Fitting the predictive models to the prediction problem's dataset(s) may include tuning one or more hyper-parameters of the predictive modeling procedure that generates the predictive model, tuning one or more parameters of the generated predictive model, and/or other suitable model-fitting steps.

In some embodiments, the results received at step 340 include evaluations (e.g., scores) of the models' performances on the prediction problem. These evaluations may be obtained by testing the predictive models on test dataset(s) associated with the prediction problem. In some embodiments, testing a predictive model includes cross-validating the model using different folds of training datasets associated with the prediction problem. In some embodiments, the execution of the modeling procedures includes the testing of the generated models. In some embodiments, the testing of the generated models is performed separately from the execution of the modeling procedures.

The models may be tested in accordance with suitable testing techniques and scored according to a suitable scoring metric (e.g., an objective function). Different scoring metrics may place different weights on different aspects of a predictive model's performance, including, without limitation, the model's accuracy (e.g., the rate at which the model correctly predicts the outcome of the prediction problem), false positive rate (e.g., the rate at which the model incorrectly predicts a "positive" outcome), false negative rate (e.g., the rate at which the model incorrectly predicts a "negative" outcome), positive prediction value, negative prediction value, sensitivity, specificity, etc. The user may select a standard scoring metric (e.g., goodness-of-fit, R-square, etc.) from a set of options presented via user interface 120, or specific a custom scoring metric (e.g., a custom objective function) via user interface 120. Exploration engine 110 may use the user-selected or user-specified scoring metric to score the performance of the predictive models.

Returning to FIG. 3, at step 350 of method 300, a predictive model may be selected for the prediction problem based on the evaluations (e.g., scores) of the generated predictive models. Space search engine 110 may use any suitable criteria to select the predictive model for the prediction problem. In some embodiments, space search engine 110 may select the model with the highest score, or any model having a score that exceeds a threshold score, or any model having a score within a specified range of the highest score. In some embodiments, the predictive models' scores may be just one factor considered by space exploration engine 110 in selecting a predictive model for the prediction problem. Other factors considered by space exploration engine may include, without limitation, the predictive model's complexity, the computational demands of the predictive model, etc.

In some embodiments, selecting the predictive model for the prediction problem may comprise iteratively selecting a subset of the predictive models and training the selected predictive models on larger or different portions of the dataset. This iterative process may continue until a predictive model is selected for the prediction problem or until the processing resources budgeted for generating the predictive model are exhausted.

Selecting a subset of predictive models may comprise selecting a fraction of the predictive models with the highest scores, selecting all models having scores that exceed a threshold score, selecting all models having scores within a specified range of the score of the highest-scoring model, or selecting any other suitable group of models. In some embodiments, selecting the subset of predictive models may be analogous to selecting a subset of predictive modeling procedures, as described above with reference to step 320 of method 300. Accordingly, the details of selecting a subset of predictive models are not belabored here.

Training the selected predictive models may comprise generating a resource allocation schedule that allocates processing resources of the processing nodes for the training of the selected models. The allocation of processing resources may be determined based, at least in part, on the suitabilities of the modeling techniques used to generate the selected models, and/or on the selected models' scores for other samples of the dataset. Training the selected predictive models may further comprise transmitting instructions to processing nodes to fit the selected predictive models to a specified portion of the dataset, and receiving results of the training process, including fitted models and/or scores of the fitted models. In some embodiments, training the selected predictive models may be analogous to executing the selected predictive modeling procedures, as described above with reference to steps 320-330 of method 300. Accordingly, the details of training the selected predictive models are not belabored here.

In some embodiments, steps 330 and 340 may be performed iteratively until a predictive model is selected for the prediction problem or until the processing resources budgeted for generating the predictive model are exhausted. At the end of each iteration, the suitabilities of the predictive modeling procedures for the prediction problem may be re-determined based, at least in part, on the results of executing the modeling procedures, and a new set of predictive modeling procedures may be selected for execution during the next iteration.

In some embodiments, the number of modeling procedures executed in an iteration of steps 330 and 340 may tend to decrease as the number of iterations increases, and the amount of data used for training and/or testing the generated models may tend to increase as the number of iterations increases. Thus, the earlier iterations may "cast a wide net" by executing a relatively large number of modeling procedures on relatively small datasets, and the later iterations may perform more rigorous testing of the most promising modeling procedures identified during the earlier iterations. Alternatively or in addition, the earlier iterations may implement a more coarse-grained evaluation of the search space, and the later iterations may implement more fine-grained evaluations of the portions of the search space determined to be most promising.

In some embodiments, method 300 includes one or more steps not illustrated in FIG. 3. Additional steps of method 300 may include, without limitation, processing a dataset associated with the prediction problem, blending two or more predictive models to form a blended predictive model, and/or tuning the predictive model selected for the prediction problem. Some embodiments of these steps are described in further detail below.

Method 300 may include a step in which the dataset associated with a prediction problem is processed. In some embodiments, processing a prediction problem's dataset includes characterizing the dataset. Characterizing the dataset may include identifying potential problems with the dataset, including but not limited to identifying data leaks (e.g., scenarios in which the dataset includes a feature that is strongly correlated with the target, but the value of the feature would not be available as input to the predictive model under the conditions imposed by the prediction problem), detecting missing observations, detecting missing variable values, identifying outlying variable values, and/or identifying variables that are likely to have significant predictive value ("important variables").

In some embodiments, processing a prediction problem's dataset includes applying feature engineering to the dataset. Applying feature engineering to the dataset may include combining two or more features and replacing the constituent features with the combined feature, extracting different aspects of date/time variables (e.g., temporal and seasonal information) into separate variables, normalizing variable values, infilling missing variable values, etc.

Method 300 may include a step in which two or more predictive models are blended to form a blended predictive model. The blending step may be performed iteratively in connection with executing the predictive modeling techniques and evaluating the generated predictive models. In some embodiments, the blending step may be performed in only some of the execution/evaluation iterations (e.g., in the later iterations, when multiple promising predictive models have been generated).

Two or more models may be blended by combining the outputs of the constituent models. In some embodiments, the blended model may comprise a weighted, linear combination of the outputs of the constituent models. A blended predictive model may perform better than the constituent predictive models, particularly in cases where different constituent models are complementary. For example, a blended model may be expected to perform well when the constituent models tend to perform well on different portions of the prediction problem's dataset, when blends of the models have performed well on other (e.g., similar) prediction problems, when the modeling techniques used to generate the models are dissimilar (e.g., one model is a linear model and the other model is a tree model), etc. In some embodiments, the constituent models to be blended together are identified by a user (e.g., based on the user's intuition and experience).

Method 300 may include a step in which the predictive model selected for the prediction problem is tuned. In some cases, deployment engine 140 provides the source code that implements the predictive model to the user, thereby enabling the user to tune the predictive model. However, disclosing a predictive model's source code may be undesirable in some cases (e.g., in cases where the predictive modeling technique or predictive model contains proprietary capabilities or information). To permit a user to tune a predictive model without exposing the model's source code, deployment engine 140 may construct human-readable rules for tuning the model's parameters based on a representation (e.g., a mathematical representation) of the predictive model, and provide the human-readable rules to the user. The user can then use the human-readable rules to tune the model's parameters without accessing the model's source code. Thus, predictive modeling system 100 may support evaluation and tuning of proprietary predictive modeling techniques without exposing the source code for the proprietary modeling techniques to end users.

In some embodiments, the machine-executable templates corresponding to predictive modeling procedures may include efficiency-enhancing features to reduce redundant computation. These efficiency-enhancing features can be particularly valuable in cases where relatively small amounts of processing resources are budgeted for exploring the search space and generating the predictive model. As described above, the machine-executable templates may store unique IDs for the corresponding modeling elements (e.g., techniques, tasks, or sub-tasks). In addition, predictive modeling system 100 may assign unique IDs to dataset samples S. In some embodiments, when a machine-executable template T is executed on a dataset sample S, the template stores its modeling element ID, the dataset/sample ID, and the results of executing the template on the data sample in a storage structure (e.g., a table, a cache, a hash, etc.) accessible to the other templates. When a template T is invoked on a dataset sample S, the template checks the storage structure to determine whether the results of executing that template on that dataset sample are already stored. If so, rather than reprocessing the dataset sample to obtain the same results, the template simply retrieves the corresponding results from the storage structure, returns those results, and terminates. The storage structure may persist within individual iterations of the loop in which modeling procedures are executed, across multiple iterations of the procedure-execution loop, or across multiple search space explorations. The computational savings achieved through this efficiency-enhancing feature can be appreciable, since many tasks and sub-tasks are shared by different modeling techniques, and method 300 often involves executing different modeling techniques on the same datasets.

Figure 4:
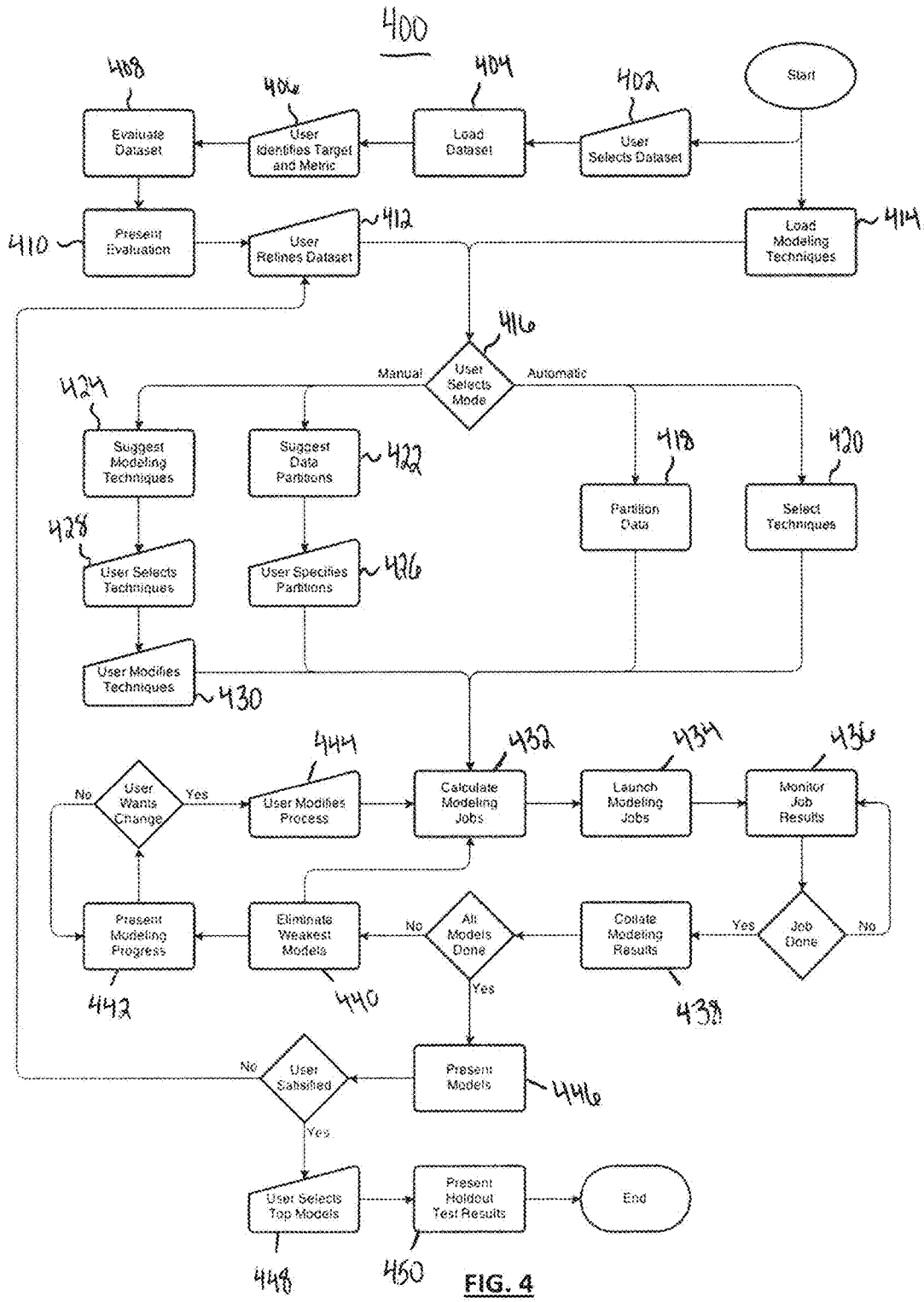
FIG. 4 shows another flowchart of a method for selecting a predictive model for a prediction problem, in accordance with some embodiments.

FIG. 4 shows a flowchart of a method 400 for selecting a predictive model for a prediction problem, in accordance with some embodiments. Method 300 may be embodied by the example of method 400.

In the example of FIG. 4, space search engine 110 uses the modeling methodology library 212, the modeling technique library 130, and the modeling task library 232 to search the space of available modeling techniques for a solution to a predictive modeling problem. Initially, the user may select a modeling methodology from library 212, or space search engine 110 may automatically select a default modeling methodology. The available modeling methodologies may include, without limitation, selection of modeling techniques based on application of deductive rules, selection of modeling techniques based on the performance of similar modeling techniques on similar prediction problems, selection of modeling techniques based on the output of a meta machine-learning model, any combination of the foregoing modeling techniques, or other suitable modeling techniques.

At step 402 of method 400, the exploration engine 110 prompts the user to select the dataset for the predictive modeling problem to be solved. The user can chose from previously loaded datasets or create a new dataset, either from a file or instructions for retrieving data from other information systems. In the case of files, the exploration engine 110 may support one or more formats including, without limitation, comma separated values, tab-delimited, eXtensible Markup Language (XML), JavaScript Object Notation, native database files, etc. In the case of instructions, the user may specify the types of information systems, their network addresses, access credentials, references to the subsets of data within each system, and the rules for mapping the target data schemas into the desired dataset schema. Such information systems may include, without limitation, databases, data warehouses, data integration services, distributed applications, Web services, etc.

At step 404 of method 400, exploration engine 110 loads the data (e.g., by reading the specified file or accessing the specified information systems). Internally, the exploration engine 110 may construct a two-dimensional matrix with the features on one axis and the observations on the other. Conceptually, each column of the matrix may correspond to a variable, and each row of the matrix may correspond to an observation. The exploration engine 110 may attach relevant metadata to the variables, including metadata obtained from the original source (e.g., explicitly specified data types) and/or metadata generated during the loading process (e.g., the variable's apparent data types; whether the variables appear to be numerical, ordinal, cardinal, or interpreted types; etc.).

At step 406 of method 400, exploration engine 110 prompts the user to identify which of the variables are targets and/or which are features. In some embodiments, exploration engine 110 also prompts the user to identify the metric of model performance to be used for scoring the models (e.g., the metric of model performance to be optimized, in the sense of statistical optimization techniques, by the statistical learning algorithm implemented by exploration engine 110).

At step 408 of method 400, exploration engine 110 evaluates the dataset. This evaluation may include calculating the characteristics of the dataset. In some embodiments, this evaluation includes performing an analysis of the dataset, which may help the user better understand the prediction problem. Such an analysis may include applying one or more algorithms to identify problematic variables (e.g., those with outliers or inliers), determining variable importance, determining variable effects, and identifying effect hotspots.

The analysis of the dataset may be performed using any suitable techniques. Variable importance, which measures the degree of significance each feature has in predicting the target, may be analyzed using "gradient boosted trees", Breiman and Cutler's "Random Forest", "alternating conditional expectations", and/or other suitable techniques. Variable effects, which measure the directions and sizes of the effects features have on a target, may be analyzed using "regularized regression", "logistic regression", and/or other suitable techniques. Effect hotspots, which identify the ranges over which features provide the most information in predicting the target, may be analyzed using the "RuleFit" algorithm and/or other suitable techniques.

In some embodiments, in addition to assessing the importance of features contained in the original dataset, the evaluation performed at step 408 of method 400 includes feature generation. Feature generation techniques may include generating additional features by interpreting the logical type of the dataset's variable and applying various transformations to the variable. Examples of transformations include, without limitation, polynomial and logarithmic transformations for numeric features. For interpreted variables (e.g., date, time, currency, measurement units, percentages, and location coordinates), examples of transformations include, without limitation, parsing a date string into a continuous time variable, day of week, month, and season to test each aspect of the date for predictive power.

The systematic transformation of numeric and/or interpreted variables, followed by their systematic testing with potential predictive modeling techniques may enable predictive modeling system 100 to search more of the potential model space and achieve more precise predictions. For example, in the case of "date/time", separating temporal and seasonal information into separate features can be very beneficial because these separate features often exhibit very different relationships with the target variable.

Creating derived features by interpreting and transforming the original features can increase the dimensionality of the original dataset. The predictive modeling system 100 may apply dimension reduction techniques, which may counter the increase in the dataset's dimensionality. However, some modeling techniques are more sensitive to dimensionality than others. Also, different dimension reduction techniques tend to work better with some modeling techniques than others. In some embodiments, predictive modeling system 100 maintains metadata describing these interactions. The system 100 may systematically evaluate various combinations of dimension reduction techniques and modeling techniques, prioritizing the combinations that the metadata indicate are most likely to succeed. The system 100 may further update this metadata based on the empirical performance of the combinations over time and incorporate new dimension reduction techniques as they are discovered.

At step 410 of method 400, predictive modeling system 100 presents the results of the dataset evaluation (e.g., the results of the dataset analysis, the characteristics of the dataset, and/or the results of the dataset transformations) to the user. In some embodiments, the results of the dataset evaluation are presented via user interface 120 (e.g., using graphs and/or tables).

At step 412 of method 400, the user may refine the dataset (e.g., based on the results of the dataset evaluation). Such refinement may include selecting methods for handling missing values or outliers for one or more features, changing an interpreted variable's type, altering the transformations under consideration, eliminating features from consideration, directly editing particular values, transforming features using a function, combining the values of features using a formula, adding entirely new features to the dataset, etc.

Steps 402-412 of method 400 may represent one embodiment of the step of processing a prediction problem's dataset, as described above in connection with some embodiments of method 300.

At step 414 of method 400, the search space engine 100 may load the available modeling techniques from the modeling technique library 130. The determination of which modeling techniques are available may depend on the selected modeling methodology. In some embodiments, the loading of the modeling techniques may occur in parallel with one or more of steps 402-412 of method 400.

At step 416 of method 400, the user instructs the exploration engine 110 to begin the search for modeling solutions in either manual mode or automatic mode. In automatic mode, the exploration engine 110 partitions the dataset (step 418) using a default sampling algorithm and prioritizes the modeling techniques (step 420) using a default prioritization algorithm. Prioritizing the modeling techniques may include determining the suitabilities of the modeling techniques for the prediction problem, and selecting at least a subset of the modeling techniques for execution based on their determined suitabilities.

In manual mode, the exploration engine 110 suggests data partitions (step 422) and suggests a prioritization of the modeling techniques (step 424). The user may accept the suggested data partition or specify custom partitions (step 426). Likewise, the user may accept the suggested prioritization of modeling techniques or specify a custom prioritization of the modeling techniques (step 428). In some embodiments, the user can modify one or more modeling techniques (e.g., using the modeling technique builder 220 and/or the modeling task builder 230) (step 430) before the exploration engine 110 begins executing the modeling techniques.

To facilitate cross-validation, predictive modeling system 100 may partition the dataset (or suggest a partitioning of the dataset) into K "folds". Cross-validation comprises fitting a predictive model to the partitioned dataset K times, such that during each fitting, a different fold serves as the test set and the remaining folds serve as the training set. Cross-validation can generate useful information about how the accuracy of a predictive model varies with different training data. In steps 418 and 422, predictive modeling system may partition the dataset into K folds, where the number of folds K is a default parameter. In step 426, the user may change the number of folds K or cancel the use of cross-validation altogether.

To facilitate rigorous testing of the predictive models, predictive modeling system 100 may partition the dataset (or suggest a partitioning of the dataset) into a training set and a "holdout" test set. In some embodiments, the training set is further partitioned into K folds for cross-validation. The training set may then be used to train and evaluate the predictive models, but the holdout test set may be reserved strictly for testing the predictive models. In some embodiments, predictive modeling system 100 can strongly enforce the use of the holdout test set for testing (and not for training) by making the holdout test set inaccessible until a user with the designated authority and/or credentials releases it. In steps 418 and 422, predictive modeling system 100 may partition the dataset such that a default percentage of the dataset is reserved for the holdout set. In step 426, the user may change the percentage of the dataset reserved for the holdout set, or cancel the use of a holdout set altogether.

In some embodiments, predictive modeling system 100 partitions the dataset to facilitate efficient use of computing resources during the evaluation of the modeling search space. For example, predictive modeling system 100 may partition the cross-validation folds of the dataset into smaller samples. Reducing the size of the data samples to which the predictive models are fitted may reduce the amount of computing resources needed to evaluate the relative performance of different modeling techniques. In some embodiments, the smaller samples may be generated by taking random samples of a fold's data. Likewise, reducing the size of the data samples to which the predictive models are fitted may reduce the amount of computing resources needed to tune the parameters of a predictive model or the hyper-parameters of a modeling technique. Hyper-parameters include variable settings for a modeling technique that can affect the speed, efficiency, and/or accuracy of model fitting process. Examples of hyper-parameters include, without limitation, the penalty parameters of an elastic-net model, the number of trees in a gradient boosted trees model, the number of neighbors in a nearest neighbors model, etc.

In steps 432-458 of method 400, the selected modeling techniques may be executed using the partitioned data to evaluate the search space. These steps are described in further detail below. For convenience, some aspects of the evaluation of the search space relating to data partitioning are described in the following paragraphs.

Tuning hyper-parameters using sample data that includes the test set of a cross-validation fold can lead to model over-fitting, thereby making comparisons of different models' performance unreliable. Using a "specified approach" can help avoid this problem, and can provide several other important advantages. Some embodiments of exploration engine 110 therefore implement "nested cross-validation", a technique whereby two loops of k-fold cross validation are applied. The outer loop provides a test set for both comparing a given model to other models and calibrating each model's predictions on future samples. The inner loop provides both a test set for tuning the hyper-parameters of the given model and a training set for derived features.

Moreover, the cross-validation predictions produced in the inner loop may facilitate blending techniques that combine multiple different models. In some embodiments, the inputs into a blender are predictions from an out-of-sample model. Using predictions from an in-sample model could result in over-fitting if used with some blending algorithms. Without a well-defined process for consistently applying nested cross-validation, even the most experienced users can omit steps or implement them incorrectly. Thus, the application of a double loop of k-fold cross validation may allow predictive modeling system 100 to simultaneously achieve five important goals: (1) tuning complex models with many hyper-parameters, (2) developing informative derived features, (3) tuning a blend of two or more models, (4) calibrating the predictions of single and/or blended models, and (5) maintaining a pure untouched test set that allows an accurate comparison of different models.

At step 432 of method 400, the exploration engine 110 generates a resource allocation schedule for the execution of an initial set of the selected modeling techniques. The allocation of resources represented by the resource allocation schedule may be determined based on the prioritization of modeling techniques, the partitioned data samples, and the available computation resources. In some embodiments, exploration engine 110 allocates resources to the selected modeling techniques greedily (e.g., assigning computational resources in turn to the highest-priority modeling technique that has not yet executed).

At step 434 of method 400, the exploration engine 110 initiates execution of the modeling techniques in accordance with the resource allocation schedule. In some embodiments, execution of a set of modeling techniques may comprise training one or more models on a same data sample extracted from the dataset.

At step 436 of method 400, the exploration engine 110 monitors the status of execution of the modeling techniques. When a modeling technique is finished executing, the exploration engine 110 collects the results (step 438), which may include the fitted model and/or metrics of model fit for the corresponding data sample. Such metrics may include any metric that can be extracted from the underlying software components that perform the fitting, including, without limitation, Gini coefficient, r-squared, residual mean squared error, any variations thereof, etc.

At step 440 of method 400, the exploration engine 110 eliminates the worst-performing modeling techniques from consideration (e.g., based on the performance of the models they produced according to model fit metrics). Exploration engine 110 may determine which modeling techniques to eliminate using a suitable technique, including, without limitation, eliminating those that do not produce models that meet a minimum threshold value of a model fit metric, eliminating all modeling techniques except those that have produced models currently in the top fraction of all models produced, or eliminating any modeling techniques that have not produced models that are within a certain range of the top models. In some embodiments, different procedures may be used to eliminate modeling techniques at different stages of the evaluation. In some embodiments, users may be permitted to specify different elimination-techniques for different modeling problems. In some embodiments, users may be permitted to build and use custom elimination techniques. In some embodiments, meta-statistical-learning techniques may be used to choose among elimination-techniques and/or to adjust the parameters of those techniques.

As the exploration engine 110 calculates model performance and eliminates modeling techniques from consideration, predictive modeling system 100 may present the progress of the search space evaluation to the user through the user interface 120 (step 442). In some embodiments, at step 444, exploration engine 110 permits the user to modify the process of evaluating the search space based on the progress of the search space evaluation, the user's expert knowledge, and/or other suitable information. If the user specifies a modification to the search space evaluation process, the space evaluation engine 110 reallocates processing resources accordingly (e.g., determines which jobs are affected and either moves them within the scheduling queue or deletes them from the queue). Other jobs continue processing as before.

The user may modify the search space evaluation process in many different ways. For example, the user may reduce the priority of some modeling techniques or eliminate some modeling techniques from consideration altogether even though the performance of the models they produced on the selected metric was good. As another example, the user may increase the priority of some modeling techniques or select some modeling techniques for consideration even though the performance of the models they produced was poor. As another example, the user may prioritize evaluation of specified models or execution of specified modeling techniques against additional data samples. As another example, a user may modify one or more modeling techniques and select the modified techniques for consideration. As another example, a user may change the features used to train the modeling techniques or fit the models (e.g., by adding features, removing features, or selecting different features). Such a change may be beneficial if the results indicate that the feature magnitudes require normalizations or that some of the features are "data leaks".

In some embodiments, steps 432-444 may be performed iteratively. Modeling techniques that are not eliminated (e.g., by the system at step 440 or by the user at step 444) survive another iteration. Based on the performance of a model generated in the previous iteration (or iterations), the exploration engine 110 adjusts the corresponding modeling technique's priority and allocates processing resources to the modeling technique accordingly. As computational resources become available, the engine uses the available resources to launch model-technique-execution jobs based on the updated priorities.

In some embodiments, at step 432, exploration engine 110 may "blend" multiple models using different mathematical combinations to create new models (e.g., using stepwise selection of models to include in the blender). In some embodiments, predictive modeling system 100 provides a modular framework that allows users to plug in their own automatic blending techniques. In some embodiments, predictive modeling system 100 allows users to manually specify different model blends.

In some embodiments, predictive modeling system 100 may offer one or more advantages in developing blended prediction models. First, blending may work better when a large variety of candidate models are available to blend. Moreover, blending may work better when the differences between candidate models correspond not simply to minor variations in algorithms but rather to major differences in approach, such as those among linear models, tree-based models, support vector machines, and nearest neighbor classification. Predictive modeling system 100 may deliver a substantial head start by automatically producing a wide variety of models and maintaining metadata describing how the candidate models differ. Predictive modeling system 100 may also provide a framework that allows any model to be incorporated into a blended model by, for example, automatically normalizing the scale of variables across the candidate models. This framework may allow users to easily add their own customized or independently generated models to the automatically generated models to further increase variety.

In addition to increasing the variety of candidate models available for blending, the predictive modeling system 100 also provides a number of user interface features and analytic features that may result in superior blending. First, user interface 120 may provide an interactive model comparison, including several different alternative measures of candidate model fit and graphics such as dual lift charts, so that users can easily identify accurate and complementary models to blend. Second, modeling system 100 gives the user the option of choosing specific candidate models and blending techniques or automatically fitting some or all of the blending techniques in the modeling technique library using some or all of the candidate models. The nested cross-validation framework then enforces the condition that the data used to rank each blended model is not used in tuning the blender itself or in tuning its component models' hyper-parameters.

This discipline may provide the user a more accurate comparison of alternative blender performance. In some embodiments, modeling system 100 implements a blended model's processing in parallel, such that the computation time for the blended model approaches the computation time of its slowest component model.

Returning to FIG. 4, at step 446 of method 400, the user interface 120 presents the final results to the user. Based on this presentation, the user may refine the dataset (e.g., by returning to step 412), adjust the allocation of resources to executing modeling techniques (e.g., by returning to step 444), modify one or more of the modeling techniques to improve accuracy (e.g., by returning to step 430), alter the dataset (e.g., by returning to step 402), etc.

At step 448 of method 400, rather than restarting the search space evaluation or a portion thereof, the user may select one or more top predictive model candidates. At step 450, predictive modeling system 100 may present the results of the holdout test for the selected predictive model candidate(s). The holdout test results may provide a final gauge of how these candidates compare. In some embodiments, only users with adequate privileges may release the holdout test results. Preventing the release of the holdout test results until the candidate predictive models are selected may facilitate an unbiased evaluation of performance. However, the exploration engine 110 may actually calculate the holdout test results during the modeling job execution process (e.g., steps 432-444), as long as the results remain hidden until after the candidate predictive models are selected.

User Interface

Returning to FIG. 1, the user interface 120 may provide tools for monitoring and/or guiding the search of the predictive modeling space. These tools may provide insight into a prediction problem's dataset (e.g., by highlighting problematic variables in the dataset, identifying relationships between variables in the dataset, etc.), and/or insights into the results of the search. In some embodiments, data analysts may use the interface to guide the search, e.g., by specifying the metrics to be used to evaluate and compare modeling solutions, by specifying the criteria for recognizing a suitable modeling solution, etc. Thus, the user interface may be used by analysts to improve their own productivity, and/or to improve the performance of the exploration engine 110. In some embodiments, user interface 120 presents the results of the search in real-time, and permits users to guide the search (e.g., to adjust the scope of the search or the allocation of resources among the evaluations of different modeling solutions) in real-time. In some embodiments, user interface 120 provides tools for coordinating the efforts of multiple data analysts working on the same prediction problem and/or related prediction problems.

In some embodiments, the user interface 120 provides tools for developing machine-executable templates for the library 130 of modeling techniques. System users may use these tools to modify existing templates, to create new templates, or to remove templates from the library 130. In this way, system users may update the library 130 to reflect advances in predictive modeling research, and/or to include proprietary predictive modeling techniques.

User interface 120 may include a variety of interface components that allow users to manage multiple modeling projects within an organization, create and modify elements of the modeling methodology hierarchy, conduct comprehensive searches for accurate predictive models, gain insights into the dataset and model results, and/or deploy completed models to produce predictions on new data.

In some embodiments, the user interface 120 distinguishes between four types of users: administrators, technique developers, model builders, and observers. Administrators may control the allocation of human and computing resources to projects. Technique developers may create and modify modeling techniques and their component tasks. Model builders primarily focus on searching for good models, though they may also make minor adjustments to techniques and tasks. Observers may view certain aspects of project progress and modelling results, but may be prohibited from making any changes to data or initiating any model-building. An individual may fulfill more than one role on a specific project or across multiple projects.

Users acting as administrators may access the project management components of user interface 120 to set project parameters, assign project responsibilities to users, and allocate computing resources to projects. In some embodiments, administrators may use the project management components to organize multiple projects into groups or hierarchies. All projects within a group may inherit the group's settings. In a hierarchy, all children of a project may inherit the project's settings. In some embodiments, users with sufficient permissions may override inherited settings. In some embodiments, users with sufficient permissions may further divide settings into different sections so that only users with the corresponding permissions may alter them. In some cases, administrators may permit access to certain resources orthogonally to the organization of projects. For example, certain techniques and tasks may be made available to every project unless explicitly prohibited. Others may be prohibited to every project unless explicitly allowed. Moreover, some resources may be allocated on a user basis, so that a project can only access the resources if a user who possesses those rights is assigned to that particular project.

In managing users, administrators may control the group of all users admitted to the system, their permitted roles, and system-level permissions. In some embodiments, administrators may add users to the system by adding them to a corresponding group and issuing them some form of access credentials. In some embodiments, user interface 120 may support different kinds of credentials including, without limitation, username plus password, unified authorization frameworks (e.g., OAuth), hardware tokens (e.g., smart cards), etc.

Once admitted, an administrator may specify that certain users have default roles that they assume for any project. For example, a particular user may be designated as an observer unless specifically authorized for another role by an administrator for a particular project. Another user may be provisioned as a technique developer for all projects unless specifically excluded by an administrator, while another may be provisioned as a technique developer for only a particular group of projects or branch of the project hierarchy. In addition to default roles, administrators may further assign users more specific permissions at the system level. For example, some Administrators may be able to grant access to certain types of computing resources, some technique developers and model builders may be able to access certain features within the builders; and some model builders may be authorized to start new projects, consume more than a given level of computation resources, or invite new users to projects that they do not own.

In some embodiments, administrators may assign access, permissions, and responsibilities at the project level. Access may include the ability to access any information within a particular project. Permissions may include the ability to perform specific operations for a project. Access and permissions may override system-level permissions or provide more granular control. As an example of the former, a user who normally has full builder permissions may be restricted to partial builder permissions for a particular project. As an example of the latter, certain users may be limited from loading new data to an existing project. Responsibilities may include action items that a user is expected to complete for the project.

Users acting as developers may access the builder areas of the interface to create and modify modeling methodologies, techniques, and tasks. As discussed previously, each builder may present one or more tools with different types of user interfaces that perform the corresponding logical operations. In some embodiments, the user interface 120 may permit developers to use a "Properties" sheet to edit the metadata attached to a technique. A technique may also have tuning parameters corresponding to variables for particular tasks. A developer may publish these tuning parameters to the technique-level Properties sheet, specifying default values and whether or not model builders may override these defaults.

In some embodiments, the user interface 120 may offer a graphical flow-diagram tool for specifying a hierarchical directed graph of tasks, along with any built-in operations for conditional logic, filtering output, transforming output, partitioning output, combining inputs, iterating over subgraphs, etc. In some embodiments, user interface 120 may provide facilities for creating the wrappers around pre-existing software to implement leaf-level tasks, including properties that can be set for each task.

In some embodiments, user interface 120 may provide advanced developers built-in access to interactive development environments (IDEs) for implementing leaf-level tasks. While developers may, alternatively, code a component in an external environment and wrap that code as a leaf-level task, it may be more convenient if these environments are directly accessible. In such an embodiment, the IDEs themselves may be wrapped in the interface and logically integrated into the task builder. From the user perspective, an IDE may run within the same interface framework and on the same computational infrastructure as the task builder. This capability may enable advanced developers to more quickly iterate in developing and modifying techniques. Some embodiments may further provide code collaboration features that facilitate coordination between multiple developers simultaneously programming the same leaf-level tasks.

Model builders may leverage the techniques produced by developers to build predictive models for their specific datasets. Different model builders may have different levels of experience and thus require different support from the user interface. For relatively new users, the user interface 120 may present as automatic a process as possible, but still give users the ability to explore options and thereby learn more about predictive modeling. For intermediate users, the user interface 120 may present information to facilitate rapidly assessing how easy a particular problem will be to solve, comparing how their existing predictive models stack up to what the predictive modeling system 100 can produce automatically, and getting an accelerated start on complicated projects that will eventually benefit from substantial hands-on tuning. For advanced users, the user interface 120 may facilitate extraction of a few extra decimal places of accuracy for an existing predictive model, rapid assessment of applicability of new techniques to the problems they've worked on, and development of techniques for a whole class of problems their organizations may face. By capturing the knowledge of advanced users, some embodiments facilitate the propagation of that knowledge throughout the rest of the organization.

To support this breadth of user requirements, some embodiments of user interface 120 provide a sequence of interface tools that reflect the model building process. Moreover, each tool may offer a spectrum of features from basic to advanced. The first step in the model building process may involve loading and preparing a dataset. As discussed previously, a user may upload a file or specify how to access data from an online system. In the context of modeling project groups or hierarchies, a user may also specify what parts of the parent dataset are to be used for the current project and what parts are to be added.

For basic users, predictive modeling system 100 may immediately proceed to building models after the dataset is specified, pausing only if the use interface 120 flags troubling issues, including, without limitation, unparseable data, too few observations to expect good results, too many observations to execute in a reasonable amount time, too many missing values, or variables whose distributions may lead to unusual results. For intermediate users, user interface 120 may facilitate understanding the data in more depth by presenting the table of data set characteristics and the graphs of variable importance, variable effects, and effect hotspots. User interface 120 may also facilitate understanding and visualization of relationships between the variables by providing visualization tools including, without limitation, correlation matrixes, partial dependence plots, and/or the results of unsupervised machine-learning algorithms such as k-means and hierarchical clustering. In some embodiments, user interface 120 permits advanced users to create entirely new dataset features by specifying formulas that transform an existing feature or combination of them.

Once the dataset is loaded, users may specify the model-fit metric to be optimized. For basic users, predictive modeling system 100 may choose the model-fit metric, and user interface 120 may present an explanation of the choice. For intermediate users, user interface 120 may present information to help the users understand the tradeoffs in choosing different metrics for a particular dataset. For advanced users, user interface 120 may permit the user to specify custom metrics by writing formulas (e.g., objective functions) based on the low-level performance data collected by the exploration engine 110 or even by uploading custom metric calculation code.

With the dataset loaded and model-fit metric selected, the user may launch the exploration engine. For basic users, the exploration engine 110 may use the default prioritization settings for modeling techniques, and user interface 120 may provide high-level information about model performance, how far into the dataset the execution has progressed, and the general consumption of computing resources. For intermediate users, user interface 120 may permit the user to specify a subset of techniques to consider and slightly adjust some of the initial priorities. In some embodiments, user interface 120 provides more granular performance and progress data so intermediate users can make in-flight adjustments as previously described. In some embodiments, user interface 120 provides intermediate users with more insight into and control of computing resource consumption. In some embodiments, user interface 120 may provide advanced users with significant (e.g., complete) control of the techniques considered and their priority, all the performance data available, and significant (e.g., complete) control of resource consumption. By either offering distinct interfaces to different levels of users or "collapsing" more advanced features for less advanced users by default, some embodiments of user interface 120 can support the users at their corresponding levels.

During and after the exploration of the search space, the user interface may present information about the performance of one or more modeling techniques. Some performance information may be displayed in a tabular format, while other performance information may be displayed in a graphical format. For example, information presented in tabular format may include, without limitation, comparisons of model performance by technique, fraction of data evaluated, technique properties, or the current consumption of computing resources. Information presented in graphical format may include, without limitation, the directed graph of tasks in a modeling procedure, comparisons of model performance across different partitions of the dataset, representations of model performance such as the receiver operating characteristics and lift chart, predicted vs. actual values, and the consumption of computing resources over time. The user interface 120 may include a modular user interface framework that allows for the easy inclusion of new performance information of either type. Moreover, some embodiments may allow the display of some types of information for each data partition and/or for each technique.

As discussed previously, some embodiments of user interface 120 support collaboration of multiple users on multiple projects. Across projects, user interface 120 may permit users to share data, modeling tasks, and modeling techniques. Within a project, user interface 120 may permit users to share data, models, and results. In some embodiments, user interface 120 may permit users to modify properties of the project and use resources allocated to the project. In some embodiments, user interface 120 may permit multiple users to modify project data and add models to the project, then compare these contributions. In some embodiments, user interface 120 may identify which user made a specific change to the project, when the change was made, and what project resources a user has used.

Model Deployment Engine

The model deployment engine 140 provides tools for deploying predictive models in operational environments. In some embodiments, the model deployment engine 140 monitors the performance of deployed predictive models, and updates the performance metadata associated with the modeling techniques that generated the deployed models, so that the performance data accurately reflects the performance of the deployed models.

Users may deploy a fitted prediction model when they believe the fitted model warrants field testing or is capable of adding value. In some embodiments, users and external systems may access a prediction module (e.g., in an interface services layer of predictive modeling system 100), specify one or more predictive models to be used, and supply new observations. The prediction module may then return the predictions provided by those models. In some embodiments, administrators may control which users and external systems have access to this prediction module, and/or set usage restrictions such as the number of predictions allowed per unit time.

For each model, exploration engine 110 may store a record of the modeling technique used to generate the model and the state of model the after fitting, including coefficient and hyper-parameter values. Because each technique is already machine-executable, these values may be sufficient for the execution engine to generate predictions on new observation data. In some embodiments, a model's prediction may be generated by applying the pre-processing and modeling steps described in the modeling technique to each instance of new input data. However, in some cases, it may be possible to increase the speed of future prediction calculations. For example, a fitted model may make several independent checks of a particular variable's value. Combining some or all of these checks and then simply referencing them when convenient may decrease the total amount of computation used to generate a prediction. Similarly, several component models of a blended model may perform the same data transformation. Some embodiments may therefore reduce computation time by identifying duplicative calculations, performing them only once, and referencing the results of the calculations in the component models that use them.

In some embodiments, deployment engine 140 improves the performance of a prediction model by identifying opportunities for parallel processing, thereby decreasing the response time in making each prediction when the underlying hardware can execute multiple instructions in parallel. Some modeling techniques may describe a series of steps sequentially, but in fact some of the steps may be logically independent. By examining the data flow among each step, the deployment engine 140 may identify situations of logical independence and then restructure the execution of predictive models so independent steps are executed in parallel. Blended models may present a special class of parallelization, because the constituent predictive models may be executed in parallel, once any common data transformations have completed.

In some embodiments, deployment engine 140 may cache the state of a predictive model in memory. With this approach, successive prediction requests of the same model may not incur the time to load the model state. Caching may work especially well in cases where there are many requests for predictions on a relatively small number of observations and therefore this loading time is potentially a large part of the total execution time.

In some embodiments, deployment engine 140 may offer at least two implementations of predictive models: service-based and code-based. For service-based prediction, calculations run within a distributed computing infrastructure as described below. Final prediction models may be stored in the data services layer of the distributed computing infrastructure. When a user or external system requests a prediction, it may indicate which model is to be used and provides at least one new observation. A prediction module may then load the model from the data services layer or from the module's in-memory cache, validate that the submitted observations matches the structure of the original dataset, and compute the predicted value for each observation. In some implementations, the predictive models may execute on a dedicated pool of cloud workers, thereby facilitating the generation of predictions with low-variance response times.

Service-based prediction may occur either interactively or via API. For interactive predictions, the user may enter the values of features for each new observation or upload a file containing the data for one or more observations. The user may then receive the predictions directly through the user interface 120, or download them as a file. For API predictions, an external system may access the prediction module via local or remote API, submit one or more observations, and receive the corresponding calculated predictions in return.

Some implementations of deployment engine 140 may allow an organization to create one or more miniaturized instances of the distributed computing infrastructure for the purpose of performing service-based prediction. In the distributed computing infrastructure's interface layer, each such instance may use the parts of the monitoring and prediction modules accessible by external systems, without accessing the user-related functions. The analytic services layer may not use the technique IDE module, and the rest of the modules in this layer may be stripped down and optimized for servicing prediction requests. The data services layer may not use the user or model-building data management. Such standalone prediction instances may be deployed on a parallel pool of cloud resources, distributed to other physical locations, or even downloaded to one or more dedicated machines that act as "prediction appliances".

To create a dedicated prediction instance, a user may specify the target computing infrastructure, for example, whether it's a set of cloud instances or a set of dedicated hardware. The corresponding modules may then be provisioned and either installed on the target computing infrastructure or packaged for installation. The user may either configure the instance with an initial set of predictive models or create a "blank" instance. After initial installation, users may manage the available predictive models by installing new ones or updating existing ones from the main installation.

For code-based predictions, the deployment engine 140 may generate source code for calculating predictions based on a particular model, and the user may incorporate the source code into other software. When models are based on techniques whose leaf-level tasks are all implemented in the same programming language as that requested by the user, deployment engine 140 may produce the source code for the predictive model by collating the code for leaf-level tasks. When the model incorporates code from different languages or the language is different from that desired by the user, deployment engine 140 may use more sophisticated approaches.

One approach is to use a source-to-source compiler to translate the source code of the leaf-level tasks into a target language. Another approach is to generate a function stub in the target language that then calls linked-in object code in the original language or accesses an emulator running such object code. The former approach may involve the use of a cross-compiler to generate object code specifically for the user's target computing platform. The latter approach may involve the use of an emulator that will run on the user's target platform.

Another approach is to generate an abstract description of a particular model and then compile that description into the target language. To generate an abstract description, some embodiments of deployment engine 140 may use meta-models for describing a large number of potential pre-processing, model-fitting, and post-processing steps. The deployment engine may then extract the particular operations for a complete model and encode them using the meta-model. In such embodiments, a compiler for the target programming language may be used to translate the meta-models into the target language. So if a user wants prediction code in a supported language, the compiler may produce it. For example, in a decision-tree model, the decisions in the tree may be abstracted into logical if/then/else statements that are directly implementable in a wide variety of programming languages. Similarly, a set of mathematical operations that are supported in common programming languages may be used to implement a linear regression model.

However, disclosing a predictive model's source code in any language may be undesirable in some cases (e.g., in cases where the predictive modeling technique or predictive model contains proprietary capabilities or information).

Therefore, the deployment engine 140 may convert a predictive model into a set of rules that preserves the predictive capabilities of the predictive model without disclosing its procedural details. One approach is to apply an algorithm that produces such rules from a set of hypothetical predictions that a predictive model would generate in response to hypothetical observations. Some such algorithms may produce a set of if-then rules for making predictions (e.g., RuleFit). For these algorithms, the deployment engine 140 may then convert the resulting if-then rules into a target language instead of converting the original predictive model. An additional advantage of converting a predictive model to a set of if-then rules is that it is generally easier to convert a set of if-then rules into a target programming language than a predictive model with arbitrary control and data flows because the basic model of conditional logic is more similar across programming languages.

Once a model starts making predictions on new observations, the deployment engine 140 may track these predictions, measure their accuracy, and use these results to improve predictive modeling system 100. In the case of service-based predictions, because predictions occur within the same distributed computing environment as the rest of the system, each observation and prediction may be saved via the data services layer. By providing an identifier for each prediction, some embodiments may allow a user or external software system to submit the actual values, if and when they are recorded. In the case of code-based predictions, some embodiments may include code that saves observations and predictions in a local system or back to an instance of the data services layer. Again, providing an identifier for each prediction may facilitate the collection of model performance data against the actual target values when they become available.

Information collected directly by the deployment engine 140 about the accuracy of predictions, and/or observations obtained through other channels, may be used to improve the model for a prediction problem (e.g., to "refresh" an existing model, or to generate a model by re-exploring the modeling search space in part or in full). New data can be added to improve a model in the same ways data was originally added to create the model, or by submitting target values for data previously used in prediction.

Some models may be refreshed (e.g., refitted) by applying the corresponding modeling techniques to the new data and combining the resulting new model with the existing model, while others may be refreshed by applying the corresponding modeling techniques to a combination of original and new data. In some embodiments, when refreshing a model, only some of the model parameters may be recalculated (e.g., to refresh the model more quickly, or because the new data provides information that is particularly relevant to particular parameters).

Alternatively or in addition, new models may be generated exploring the modeling search space, in part or in full, with the new data included in the dataset. The re-exploration of the search space may be limited to a portion of the search space (e.g., limited to modeling techniques that performed well in the original search), or may cover the entire search space. In either case, the initial suitability scores for the modeling technique(s) that generated the deployed model(s) may be recalculated to reflect the performance of the deployed model(s) on the prediction problem. Users may choose to exclude some of the previous data to perform the recalculation. Some embodiments of deployment engine 140 may track different versions of the same logical model, including which subsets of data were used to train which versions.

In some embodiments, this prediction data may be used to perform post-request analysis of trends in input parameters or predictions themselves over time, and to alert the user of potential issues with inputs or the quality of the model predictions. For example, if an aggregate measure of model performance starts to degrade over time, the system may alert the user to consider refreshing the model or investigating whether the inputs themselves are shifting. Such shifts may be caused by temporal change in a particular variable or drifts in the entire population. In some embodiments, most of this analysis is performed after prediction requests are completed, to avoid slowing down the prediction responses. However, the system may perform some validation at prediction time to avoid particularly bad predictions (e.g., in cases where an input value is outside a range of values that it has computed as valid given characteristics of the original training data, modeling technique, and final model fitting state).

After-the-fact analysis may be important in cases where a user has deployed a model to make extrapolations well beyond the population used in training. For example, a model may have been trained on data from one geographic region, but used to make predictions for a population in a completely different geographic region. Sometimes, such extrapolation to new populations may result in model performance that is substantially worse than expected. In these cases, the deployment engine 140 may alert the user and/or automatically refresh the model by re-fitting one or more modeling techniques using the new values to extend the original training data.

Advantages of Some Embodiments

The predictive modeling system 100 may significantly improve the productivity of analysts at any skill level and/or significantly increase the accuracy of predictive models achievable with a given amount of resources. Automating procedures can reduce workload and systematizing processes can enforce consistency, enabling analysts to spend more time generating unique insights. Three common scenarios illustrate these advantages: forecasting outcomes, predicting properties, and inferring measurements.

Forecasting Outcomes

If an organization can accurately forecast outcomes, then it can both plan more effectively and enhance its behavior. Therefore, a common application of machine learning is to develop algorithms that produce forecasts. For example, many industries face the problem of predicting costs in large-scale, time-consuming projects.

In some embodiments, the techniques described herein can be used for forecasting cost overruns (e.g., software cost overruns or construction cost overruns). For example, the techniques described herein may be applied to the problem of forecasting cost overruns as follows:

1. Select a model fitting metric appropriate to the response variable type (e.g., numerical or binary, approximately Gaussian or strongly non-Gaussian): Predictive modeling system 100 may recommend a metric based on data characteristics, requiring less skill and effort by the user, but allows the user to make the final selection.

2. Pre-treat the data to address outliers and missing data values: Predictive modeling system 100 may provide detailed summary of data characteristics, enabling users to develop better situational awareness of the modeling problem and assess potential modeling challenges more effectively. Predictive modeling system 100 may include automated procedures for outlier detection and replacement, missing value imputation, and the detection and treatment of other data anomalies, requiring less skill and effort by the user. The predictive modeling system's procedures for addressing these challenges may be systematic, leading to more consistent modeling results across methods, datasets, and time than ad hoc data editing procedures.

3. Partition the data for modeling and evaluation: The predictive modeling system 100 may automatically partition data into training, validation, and holdout sets. This partitioning may be more flexible than the train and test partitioning used by some data analysts, and consistent with widely accepted recommendations from the machine learning community. The use of a consistent partitioning approach across methods, datasets, and time can make results more comparable, enabling more effective allocation of deployment resources in commercial contexts.

4. Select model structures, generate derived features, select model tuning parameters, fit models, and evaluate: In some embodiments, the predictive modeling system 100 can fit many different model types, including, without limitation, decision trees, neural networks, support vector machine models, regression models, boosted trees, random forests, deep learning neural networks, etc. The predictive modeling system 100 may provide the option of automatically constructing ensembles from those component models that exhibit the best individual performance. Exploring a larger space of potential models can improve accuracy. The predictive modeling system may automatically generate a variety of derived features appropriate to different data types (e.g., Box-Cox transformations, text pre-processing, principal components, etc.). Exploring a larger space of potential transformation can improve accuracy. The predictive modeling system 100 may use cross validation to select the best values for these tuning parameters as part of the model building process, thereby improving the choice of tuning parameters and creating an audit trail of how the selection of parameters affects the results. The predictive modeling system 100 may fit and evaluate the different model structures considered as part of this automated process, ranking the results in terms of validation set performance.

5. Select the final model: The choice of the final model can be made by the predictive modeling system 100 or by the user. In the latter case, the predictive modeling system may provide support to help the user make this decision, including, for example, the ranked validation set performance assessments for the models, the option of comparing and ranking performance by other quality measures than the one used in the fitting process, and/or the opportunity to build ensemble models from those component models that exhibit the best individual performance.

One important practical aspect of the predictive modeling system's model development process is that, once the initial dataset has been assembled, all subsequent computations may occur within the same software environment. This aspect represents an important difference from the conventional model-building efforts, which often involves a combination of different software environments. An important practical disadvantage of such multi-platform analysis approaches is the need to convert results into common data formats that can be shared between the different software environments. Often this conversion is done either manually or with custom "one-off" reformatting scripts. Errors in this process can lead to extremely serious data distortions. Predictive modeling system 100 may avoid such reformatting and data transfer errors by performing all computations in one software environment. More generally, because it is highly automated, fitting and optimizing many different model structures, the predictive modeling system 100 can provide a substantially faster and more systematic, thus more readily explainable and more repeatable, route to the final model. Moreover, as a consequence of the predictive modeling system 100 exploring more different modeling methods and including more possible predictors, the resulting models may be more accurate than those obtained by traditional methods.

Predicting Properties

In many fields, organizations face uncertainty in the outcome of a production process and want to predict how a given set of conditions will affect the final properties of the output. Therefore, a common application of machine learning is to develop algorithms that predict these properties. For example, concrete is a common building material whose final structural properties can vary dramatically from one situation to another. Due to the significant variations in concrete properties with time and their dependence on its highly variable composition, neither models developed from first principles nor traditional regression models offer adequate predictive accuracy.

In some embodiments, the techniques described herein can be used for predicting properties of the outcome of a production process (e.g., properties of concrete). For example, the techniques described herein may be applied to the problem of predicting properties of concrete as follows:

1. Partition the dataset into training, validation, and test subsets.

2. Clean the modeling dataset: The predictive modeling system 100 may automatically check for missing data, outliers, and other important data anomalies, recommending treatment strategies and offering the user the option to accept or decline them. This approach may require less skill and effort by the user, and/or may provide more consistent results across methods, datasets, and time.

3. Select the response variable and choose a primary fitting metric: The user may select the response variable to be predicted from those available in the modeling dataset. Once the response variable has been chosen, the predictive modeling system 100 may recommend a compatible fitting metric, which the user may accept or override. This approach may require less skill and effort by the user. Based on the response variable type and the fitting metric selected, the predictive modeling system may offer a set of predictive models, including traditional regression models, neural networks, and other machine learning models (e.g., random forests, boosted trees, support vector machines). By automatically searching among the space of possible modeling approaches, the predictive modeling system 100 may increase the expected accuracy of the final model. The default set of model choices may be overridden to exclude certain model types from consideration, to add other model types supported by the predictive modeling system but not part of the default list, or to add the user's own custom model types (e.g., implemented in R or Python).

4. Generate input features, fit models, optimize model-specific tuning parameters, and evaluate performance: In some embodiments, feature generating may include scaling for numerical covariates, Box-Cox transformations, principal components, etc. Tuning parameters for the models may be optimized via cross-validation. Validation set performance measures may be computed and presented for each model, along with other summary characteristics (e.g., model parameters for regression models, variable importance measures for boosted trees or random forests).

5. Select the final model: The choice of the final model can be made by the predictive modeling system 100 or by the user. In the latter case, the predictive modeling system may provide support to help the user make this decision, including, for example, the ranked validation set performance assessments for the models, the option of comparing and ranking performance by other quality measures than the one used in the fitting process, and/or the opportunity to build ensemble models from those component models that exhibit the best individual performance.

Inferring Measurements

Some measurements are much more costly to make than others, so organizations may want to substitute cheaper metrics for more expensive ones. Therefore, a common application of machine learning is to infer the likely output of an expensive measurement from the known output of cheaper ones. For example, "curl" is a property that captures how paper products tend to depart from a flat shape, but it can typically be judged only after products are completed. Being able to infer the curl of paper from mechanical properties easily measured during manufacturing can thus result in an enormous cost savings in achieving a given level of quality. For typical end-use properties, the relationship between these properties and manufacturing process conditions is not well understood.

In some embodiments, the techniques described herein can be used for inferring measurements. For example, the techniques described herein may be applied to the problem of inferring measurements as follows:

1. Characterize the modeling datasets: The predictive modeling system 100 may provide key summary characteristics and offer recommendations for treatment of important data anomalies, which the user is free to accept, decline, or request more information about. For example, key characteristics of variables may be computed and displayed, the prevalence of missing data may be displayed and a treatment strategy may be recommended, outliers in numerical variables may be detected and, if found, a treatment strategy may be recommended, and/or other data anomalies may be detected automatically (e.g., inliers, non-informative variables whose values never change) and recommended treatments may be made available to the user.

2. Partition the dataset into training/validation/holdout subsets.

3. Feature generation/model structure selection/model fitting: The predictive modeling system 100 may combine and automate these steps, allowing extensive internal iteration. Multiple features may be automatically generated and evaluated, using both classical techniques like principal components and newer methods like boosted trees. Many different model types may be fitted and compared, including regression models, neural networks, support vector machines, random forests, boosted trees, and others. In addition, the user may have the option of including other model structures that are not part of this default collection. Model substructure selection (e.g., selection of the number of hidden units in neural networks, the specification of other model-specific tuning parameters, etc.) may be automatically performed by extensive cross-validation as part of this model fitting and evaluation process.

4. Select the final model: The choice of the final model can be made by the predictive modeling system 100 or by the user. In the latter case, the predictive modeling system may provide support to help the user make this decision, including, for example, the ranked validation set performance assessments for the models, the option of comparing and ranking performance by other quality measures than the one used in the fitting process, and/or the opportunity to build ensemble models from those component models that exhibit the best individual performance.

In some embodiments, because the predictive modeling system 100 automates and efficiently implements data pretreatment (e.g., anomaly detection), data partitioning, multiple feature generation, model fitting and model evaluation, the time required to develop models may be much shorter than it is in the traditional development cycle. Further, in some embodiments, because the predictive modeling system automatically includes data pretreatment procedures to handle both well-known data anomalies like missing data and outliers, and less widely appreciated anomalies like inliers (repeated observations that are consistent with the data distribution, but erroneous) and postdictors (i.e., extremely predictive covariates that arise from information leakage), the resulting models may be more accurate and more useful. In some embodiments, the predictive modeling system 100 is able to explore a vastly wider range of model types, and many more specific models of each type, than is traditionally feasible. This model variety may greatly reduce the likelihood of unsatisfactory results, even when applied to a dataset of compromised quality.

An Implementation of a Predictive Modeling System

Figure 5:
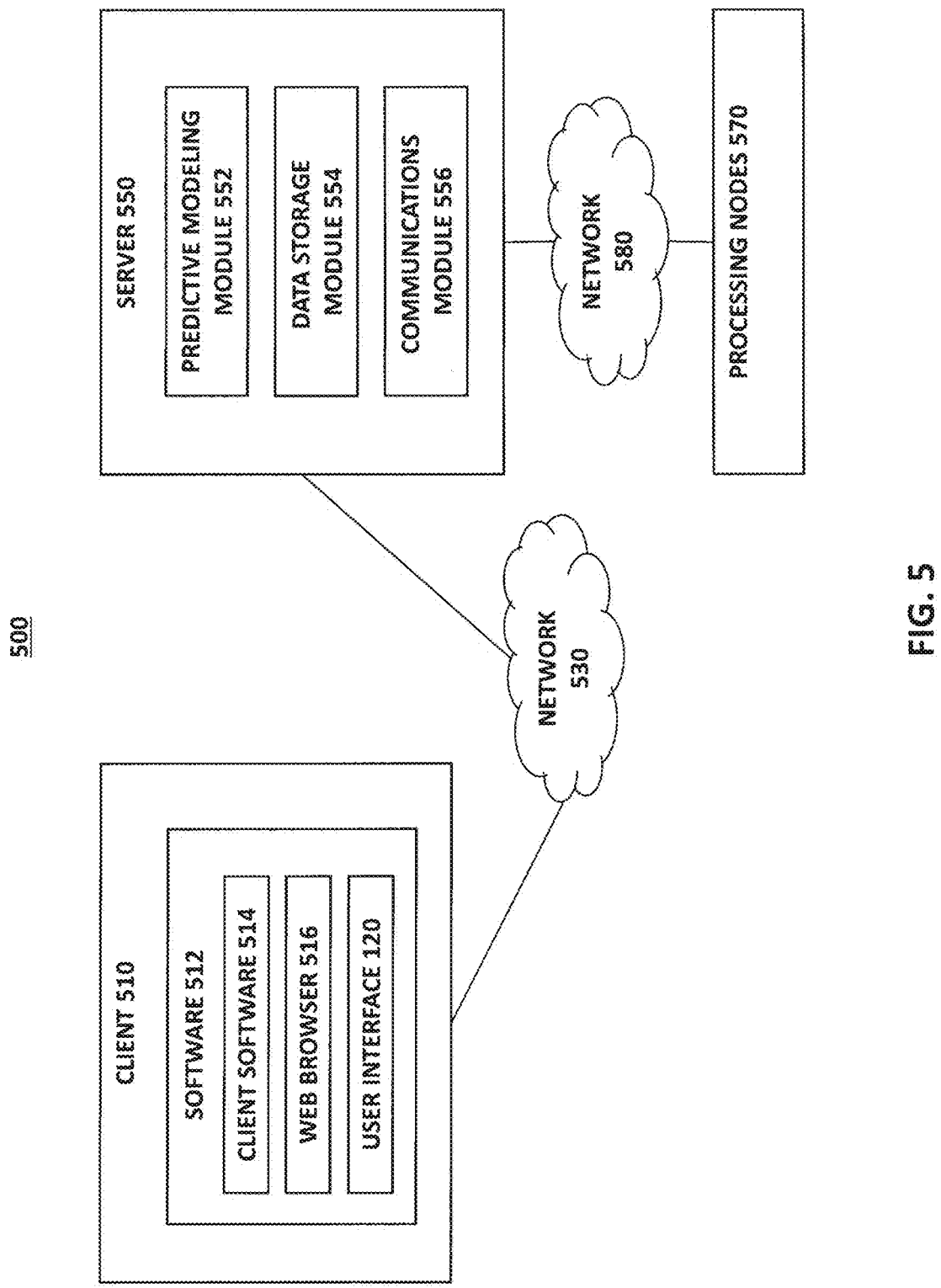
FIG. 5 is a schematic of a predictive modeling system, in accordance with some embodiments.

Referring to FIG. 5, in some embodiments, a predictive modeling system 500 (e.g., an embodiment of predictive modeling system 100) includes at least one client computer 510, at least one server 550, and one or more processing nodes 570. The illustrative configuration is only for exemplary purposes, and it is intended that there can be any number of clients 510 and/or servers 550.

In some embodiments, predictive modeling system 500 may perform one or more (e.g., all) steps of method 300. In some embodiments, client 510 may implement user interface 120, and the predictive modeling module 552 of server 550 may implement other components of predictive modeling system 100 (e.g., modeling space exploration engine 110, library of modeling techniques 130, a library of prediction problems, and/or modeling deployment engine 140). In some embodiments, the computational resources allocated by exploration engine 110 for the exploration of the modeling search space may be resources of the one or more processing nodes 570, and the one or more processing nodes 570 may execute the modeling techniques according to the resource allocation schedule. However, embodiments are not limited by the manner in which the components of predictive modeling system 100 or predictive modeling method 300 are distributed between client 510, server 550, and one or more processing nodes 570. Furthermore, in some embodiments, all components of predictive modeling system 100 may be implemented on a single computer (instead of being distributed between client 510, server 550, and processing node(s) 570), or implemented on two computers (e.g., client 510 and server 550).

One or more communications networks 530 connect the client 510 with the server 550, and one or more communications networks 580 connect the serer 550 with the processing node(s) 570. The communication may take place via any media such as standard telephone lines, LAN or WAN links (e.g., T1, T3, 56 kb, X.25), broadband connections (ISDN, Frame Relay, ATM), and/or wireless links (IEEE 802.11, Bluetooth). Preferably, the networks 530/580 can carry TCP/IP protocol communications, and data (e.g., HTTP/HTTPS requests, etc.) transmitted by client 510, server 550, and processing node(s) 570 can be communicated over such TCP/IP networks. The type of network is not a limitation, however, and any suitable network may be used. Non-limiting examples of networks that can serve as or be part of the communications networks 530/580 include a wireless or wired Ethernet-based intranet, a local or wide-area network (LAN or WAN), and/or the global communications network known as the Internet, which may accommodate many different communications media and protocols.

The client 510 is preferably implemented with software 512 running on hardware. In some embodiments, the hardware may include a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and/or various varieties of Unix, such as SUN SOLARIS from SUN MICROSYSTEMS, and GNU/Linux from RED HAT, INC. of Durham, N.C. The client 510 may also be implemented on such hardware as a smart or dumb terminal, network computer, wireless device, wireless telephone, information appliance, workstation, minicomputer, mainframe computer, personal data assistant, tablet, smart phone, or other computing device that is operated as a general purpose computer, or a special purpose hardware device used solely for serving as a client 510.

Generally, in some embodiments, clients 510 can be operated and used for various activities including sending and receiving electronic mail and/or instant messages, requesting and viewing content available over the World Wide Web, participating in chat rooms, or performing other tasks commonly done using a computer, handheld device, or cellular telephone. Clients 510 can also be operated by users on behalf of others, such as employers, who provide the clients 510 to the users as part of their employment.

In various embodiments, the software 512 of client computer 510 includes client software 514 and/or a web browser 516. The web browser 514 allows the client 510 to request a web page or other downloadable program, applet, or document (e.g., from the server 550) with a web-page request. One example of a web page is a data file that includes computer executable or interpretable information, graphics, sound, text, and/or video, that can be displayed, executed, played, processed, streamed, and/or stored and that can contain links, or pointers, to other web pages. Examples of commercially available web browser software 516 are INTERNET EXPLORER, offered by Microsoft Corporation, NETSCAPE NAVIGATOR, offered by AOL/Time Warner, FIREFOX offered the Mozilla Foundation, or CHROME offered by Google.

In some embodiments, the software 512 includes client software 514. The client software 514 provides, for example, functionality to the client 510 that allows a user to send and receive electronic mail, instant messages, telephone calls, video messages, streaming audio or video, or other content. Examples of client software 514 include, but are not limited to OUTLOOK and OUTLOOK EXPRESS, offered by Microsoft Corporation, THUNDERBIRD, offered by the Mozilla Foundation, and INSTANT MESSENGER, offered by AOL/Time Warner. Not shown are standard components associated with client computers, including a central processing unit, volatile and non-volatile storage, input/output devices, and a display.

In some embodiments, web browser software 516 and/or client software 514 may allow the client to access a user interface 120 for a predictive modeling system 100.

The server 550 interacts with the client 510. The server 550 is preferably implemented on one or more server-class computers that have sufficient memory, data storage, and processing power and that run a server-class operating system (e.g., SUN Solaris, GNU/Linux, and the MICROSOFT WINDOWS family of operating systems). System hardware and software other than that specifically described herein may also be used, depending on the capacity of the device and the size of the user base. For example, the server 550 may be or may be part of a logical group of one or more servers such as a server farm or server network. As another example, there may be multiple servers 550 associated with or connected to each other, or multiple servers may operate independently, but with shared data. In a further embodiment and as is typical in large-scale systems, application software can be implemented in components, with different components running on different server computers, on the same server, or some combination.

In some embodiments, server 550 includes a predictive modeling module 552, a communications module 556, and/or a data storage module 554. In some embodiments, the predictive modeling module 552 may implement modeling space exploration engine 110, library of modeling techniques 130, a library of prediction problems, and/or modeling deployment engine 140. In some embodiments, server 550 may use communications module 556 to communicate the outputs of the predictive modeling module 552 to the client 510, and/or to oversee execution of modeling techniques on processing node(s) 570. The modules described throughout the specification can be implemented in whole or in part as a software program using any suitable programming language or languages (C++, C#, java, LISP, BASIC, PERL, etc.) and/or as a hardware device (e.g., ASIC, FPGA, processor, memory, storage and the like).

A data storage module 554 may store, for example, predictive modeling library 130 and/or a library of prediction problems. The data storage module 554 may be implemented using, for example, the MySQL Database Server by MySQL AB of Uppsala, Sweden, the PostgreSQL Database Server by the PostgreSQL Global Development Group of Berkeley, Calif., or the ORACLE Database Server offered by ORACLE Corp. of Redwood Shores, Calif.

Figure 6:
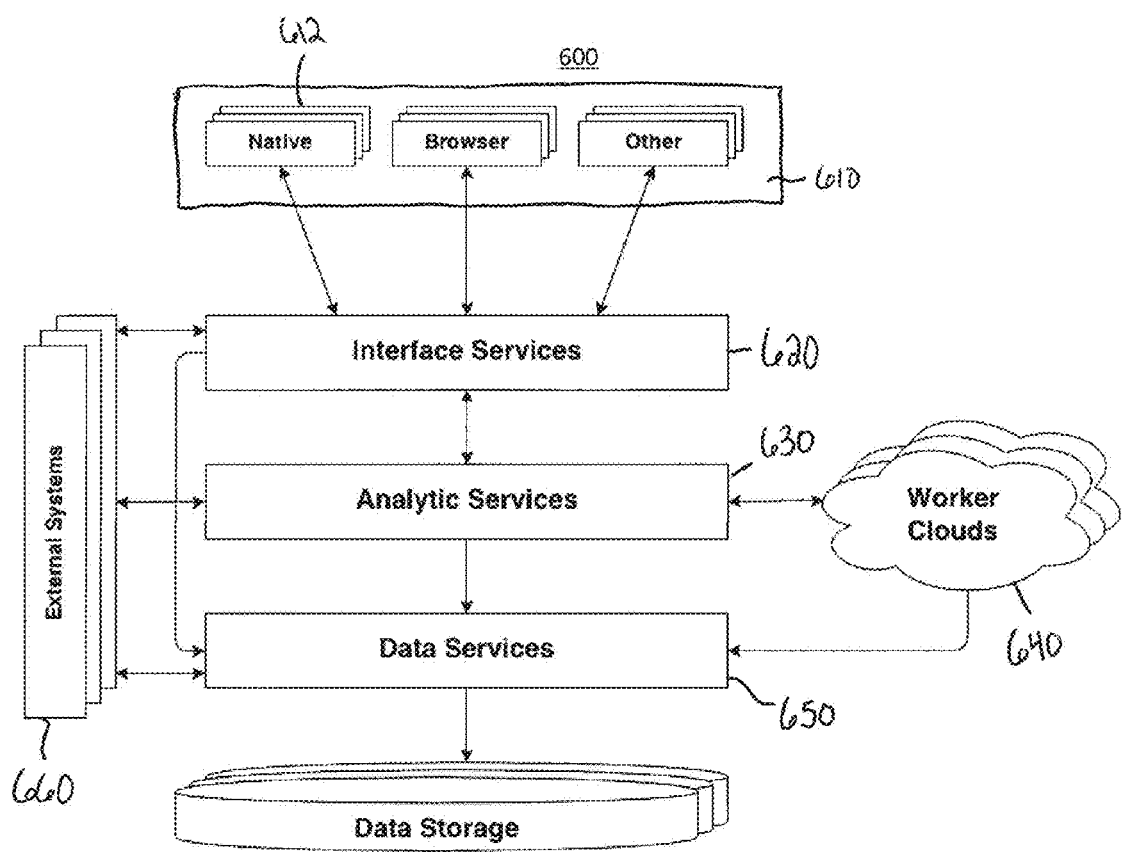
FIG. 6 is another block diagram of a predictive modeling system, in accordance with some embodiments.
Figure 7:
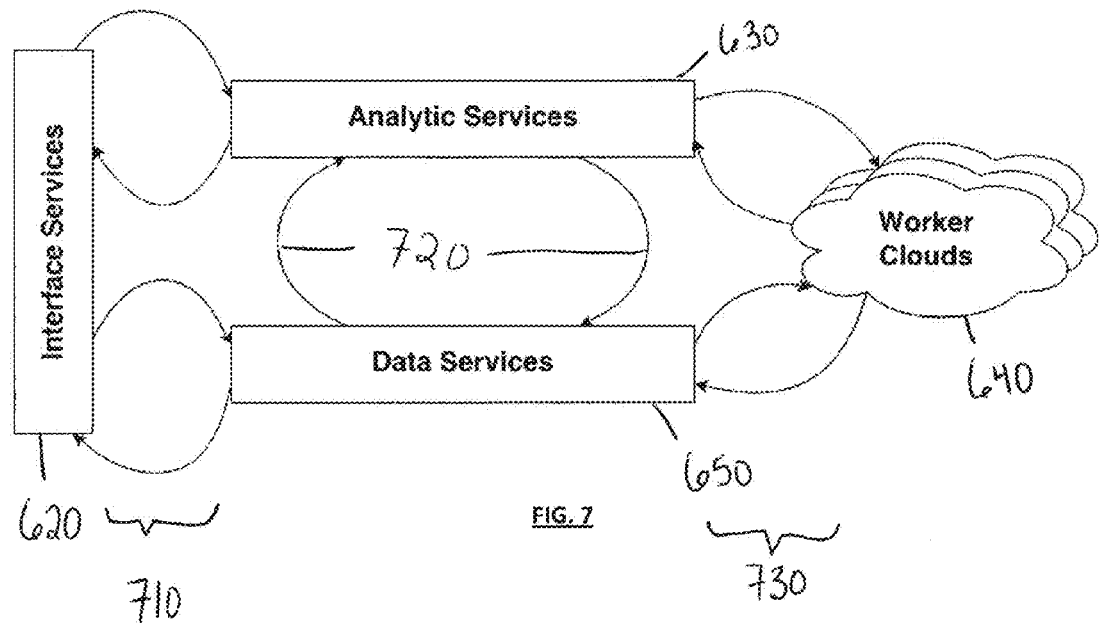
FIG. 7 illustrates communication among components of a predictive modeling system, in accordance with some embodiments.
Figure 8:
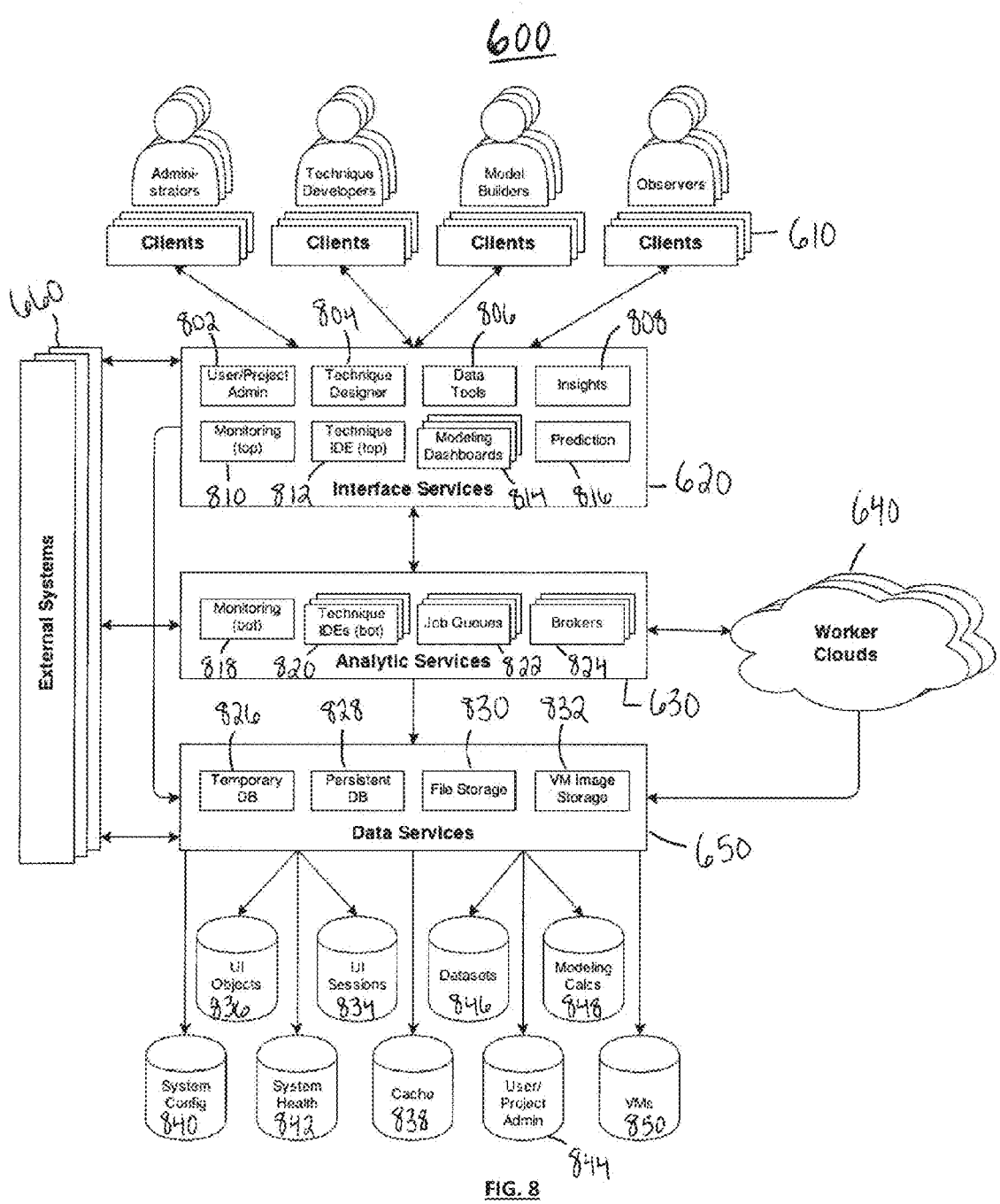
FIG. 8 is another schematic of a predictive modeling system, in accordance with some embodiments.

FIGS. 6-8 illustrate one possible implementation of predictive modeling system 100. The discussion of FIGS. 6-8 is given by way of example of some embodiments, and is in no way limiting.

To execute the previously described procedures, predictive modeling system 100 may use a distributed software architecture 600 running on a variety of client and server computers. The goal of the software architecture 600 is to simultaneously deliver a rich user experience and computationally intensive processing. The software architecture 600 may implement a variation of the basic 4-tier Internet architecture. As illustrated in FIG. 6, it extends this foundation to leverage cloud-based computation, coordinated via the application and data tiers.

The similarities and differences between architecture 600 and the basic 4-tier Internet architecture may include:

(1) Clients 610. The architecture 600 makes essentially the same assumptions about clients 610 as any other Internet application. The primary use-case includes frequent access for long periods of time to perform complex tasks. So target platforms include rich Web clients running on a laptop or desktop. However, users may access the architecture via mobile devices. Therefore, the architecture is designed to accommodate native clients 612 directly accessing the Interface Services APIs using relatively thin client-side libraries. Of course, any cross-platform GUI layers such as Java and Flash, could similarly access these APIs.

(2) Interface Services 620. This layer of the architecture is an extended version of the basic Internet presentation layer. Due to the sophisticated user interaction that may be used to direct machine learning, alternative implementations may support a wide variety of content via this layer, including static HTML, dynamic HTML, SVG visualizations, executable Javascript code, and even self-contained IDEs. Moreover, as new Internet technologies evolve, implementations may need to accommodate new forms of content or alter the division of labor between client, presentation, and application layers for executing user interaction logic. Therefore, their Interface Services layers 620 may provide a flexible framework for integrating multiple content delivery mechanisms of varying richness, plus common supporting facilities such as authentication, access control, and input validation.

(3) Analytic Services 630. The architecture may be used to produce predictive analytics solutions, so its application tier focuses on delivering Analytic Services. The computational intensity of machine learning drives the primary enhancement to the standard application tier—the dynamic allocation of machine-learning tasks to large numbers of virtual "workers" running in cloud environments. For every type of logical computation request generated by the execution engine, the Analytic Services layer 630 coordinates with the other layers to accept requests, break requests into jobs, assign jobs to workers, provide the data necessary for job execution, and collate the execution results. There is also an associated difference from a standard application tier. The predictive modeling system 100 may allow users to develop their own machine-learning techniques and thus some implementations may provide one or more full IDEs, with their capabilities partitioned across the Client, Interface Services, and Analytic Services layers. The execution engine then incorporates new and improved techniques created via these IDEs into future machine-learning computations.

(4) Worker Clouds 640. To efficiently perform modeling computations, the predictive modeling system 100 may break them into smaller jobs and allocates them to virtual worker instances running in cloud environments. The architecture 600 allows for different types of workers and different types of clouds. Each worker type corresponds to a specific virtual machine configuration. For example, the default worker type provides general machine-learning capabilities for trusted modeling code. But another type enforces additional security "sandboxing" for user-developed code. Alternative types might offer configurations optimized for specific machine-learning techniques. As long as the Analytic Services layer 630 understands the purpose of each worker type, it can allocate jobs appropriately. Similarly, the Analytic Services layer 630 can manage workers in different types of clouds. An organization might maintain a pool of instances in its private cloud as well as have the option to run instances in a public cloud. It might even have different pools of instances running on different kinds of commercial cloud services or even a proprietary internal one. As long as the Analytic Services layer 630 understands the tradeoffs in capabilities and costs, it can allocate jobs appropriately.

(5) Data Services 650. The architecture 600 assumes that the various services running in the various layers may benefit from a corresponding variety of storage options. Therefore, it provides a framework for delivering a rich array of Data Services 650, e.g., file storage for any type of permanent data, temporary databases for purposes such as caching, and permanent databases for long-term record management. Such services may even be specialized for particular types of content such as the virtual machine image files used for cloud workers and IDE servers. In some cases, implementations of the Data Services layer 650 may enforce particular access idioms on specific types of data so that the other layers can smoothly coordinate. For instance, standardizing the format for datasets and model results means the Analytic Services layer 630 may simply pass a reference to a user's dataset when it assigns a job to a worker. Then, the worker can access this dataset from the Data Services layer 650 and return references to the model results which it has, in turn, stored via Data Services 650.

(6) External Systems 660. Like any other Internet application, the use of APIs may enable external systems to integrate with the predictive modeling system 100 at any layer of the architecture 600. For example, a business dashboard application could access graphic visualizations and modeling results through the Interface Services layer 620. An external data warehouse or even live business application could provide modeling datasets to the Analytic Services layer 630 through a data integration platform. A reporting application could access all the modeling results from a particular time period through the Data Services layer 650. However, under most circumstances, external systems would not have direct access to Worker Clouds 640; they would utilize them via the Analytic Services layer 630.

As with all multi-tiered architectures, the layers of architecture 600 are logical. Physically, services from different layers could run on the same machine, different modules in the same layer could run on separate machines, and multiple instances of the same module could run across several machines. Similarly, the services in one layer could run across multiple network segments and services from different layers may or may not run on different network segments. But the logical structure helps coordinate developers' and operators' expectations of how different modules will interact, as well as gives operators the flexibility necessary to balance service-level requirements such as scalability, reliability, and security.

While the high-level layers appear reasonably similar to those of a typical Internet application, the addition of cloud-based computation may substantially alter how information flows through the system.

Internet applications usually offer two distinct types of user interaction: synchronous and asynchronous. With conceptually synchronous operations, such as finding an airline flight and booking a reservation, the user makes a request and waits for the response before making the next request. With conceptually asynchronous operations, such as setting an alert for online deals that meet certain criteria, the user makes a request and expects the system to notify him at some later time with results. (Typically, the system provides the user an initial request "ticket" and offers notification through a designated communications channel.)

In contrast, building and refining machine-learning models may involve an interaction pattern somewhere in the middle. Setting up a modeling problem may involve an initial series of conceptually synchronous steps. But when the user instructs the system to begin computing alternative solutions, a user who understands the scale of the corresponding computations is unlikely to expect an immediate response. Superficially, this expectation of delayed results makes this phase of interaction appear asynchronous.

However, predictive modeling system 100 doesn't force the user to "fire-and-forget", i.e., stop his own engagement with the problem until receiving a notification. In fact, it may encourage him to continue exploring the dataset and review preliminary results as soon as they arrive. Such additional exploration or initial insight might inspire him to change the model-building parameters "in-flight". The system may then process the requested changes and reallocate processing tasks. The predictive modeling system 100 may allow this request-and-revise dynamic continuously throughout the user's session.

Thus, the Analytic Services and Data Services layers may mediate between the request-response loop from users on the one hand and the request-response loop to the Worker Clouds on the other. FIG. 7 illustrates this perspective:

FIG. 7 underscores that the predictive modeling system 100 doesn't necessarily fit cleanly into the layered model, which assumes that each layer mostly only relies on the layer directly below it. Rather, Analytic Services 630 and Data Services 650 cooperatively coordinate users and computation. Given this perspective, there are three "columns" of information flow:

(1) Interface<–> Analytic+Data. The left-most column of flow 710 first transforms the user's raw dataset and modeling requirements into a refined dataset and list of computation jobs, then coalesces and delivers the results to the user in a format he can easily comprehend. So the goals and constraints flow from Interface Services 620 to Analytic Services 630, while progress and exceptions flow back. In parallel, raw datasets and user annotations flow from Interfaces Services 620 to Data Services 650, while trained models and their performance metrics flow back. At any point, the user can initiate changes and force adjustments by the Analytic Services 630 and Data Services 650 layers. Note that in addition to this dynamic circular flow, there are also more traditional linear interactions (e.g., when Interface Services 620 retrieves system status from Analytic Services 640 or static content from Data Services 650).

(2) Analytic+Data<–> Worker. The right-most column of flow 730 provisions workers, assigns computation jobs, and provides the data for those jobs. So job assignments, their parameters, and data references flow from Analytic Services 630 to Worker Clouds 640, while progress and exceptions flow back. Refined data sets flow from Data Services 650 to Worker Clouds 640, while modeling results flow back. Updated directions from the user can force the Analytic Services layer 630 to interrupt workers in-flight and assign updated modeling jobs, as well as force a refresh of the dataset from the Data Services layer 650. In turn, updated assignments and datasets change the flow of results back from workers.

(3) Analytic<–> Data. The two layers in the middle coordinate between themselves to mediate between the left and right columns. Most of this traffic 720 concerns tracking the execution progress and intermediate calculations of cloud workers. But the flow can become particularly complex when responding to the aforementioned in-flight changes to model-building instructions; Analytic and Data Services assess the current state of computation, determine which intermediate calculations are still valid, and correctly construct new computation jobs. Of course, there are also more traditional linear interactions here as well (e.g., when Analytic Services retrieves rules and configurations for the cloud workers from Data Services).

This conceptual model of information flow provides context for the arrangement of functional modules within the layers. They are not simply stateless blocks that provide an application programming interface (API) to higher level blocks and consume APIs from lower level blocks. Rather, they are dynamic participants in the collaboration between users and computation. FIG. 8 presents the arrangement of these functional modules. From a user's perspective, the Interface Services layer provides several distinct areas of functionality.

(1) User/Project Admin 802. Each machine-learning project has at least one assigned administrator, who can use the project management components of the interface to manage project-level parameters, responsibilities, and resources. This functional component also supports system-level administration functions.

(2) Monitoring 810. This module provides diagnostics on the computing infrastructure. It co-operates with a corresponding module 818 in the Analytic Services layer to track computing resource usage, both in real time for each worker instance and totals for each computation job.

(3) Technique Designer 804. This module supports graphical interfaces for using the previously described methodology, technique, and task Builders. An example of how this graphical interface could be implemented is Javascript running in the client 610 and communicating with the technique designer 804 via AJAX requests, graphically rendering the graph for the user and pushing changes back to the server.

(4) Technique IDE 812. As described previously, some implementations of the predictive modeling system 100 may provide technique developers built-in access to IDEs for implementing leaf-level tasks. Such IDEs could support general purpose programming languages used for machine-learning such as Python or specialized scientific computing environments such as R. This functionality may execute across the client 610, Interface Services 620, and Analytic Services 630 layers. The client component 610 can download and execute a Javascript container for the IDE environment, which first registers a session with the Interface Services component via AJAX. After authenticating and validating the registration request, the Interface Services component downloads the user's project data to the client 610 and hands off the session to a dedicated IDE server instance running in the Analytic Services layer. This server instance then communicates directly with the client 610 via a Web socket.

(5) Data Tools 806. This module enables a model builder to specify a dataset, understand it, and prepare it for model-building.

(6) Modeling Dashboard 814. Each project has its own modeling dashboard. An instance of this module provides the model builder with the controls and gauges to launch the modeling process for the project, measure results as they arrive, and make in-flight adjustments. It calculates which modeling techniques to run against which datasets, and passes these requirements to the Analytics Services layer. Once the execution engine begins building models, this module provides execution status and controls.

(7) Insights 808. Once the machine-learning process has begun generating substantial results, this module offers the model builder deeper insights. Examples include text mining summaries, predictor importance, and the one-way relationships between each predictor and the target. Most of these insights are easy to understand and don't require a deep knowledge of statistics.

(8) Prediction 816. Once the execution engine has built at least one model, this module provides the interface for making predictions based on new data.

Activity in the Interface Services layer triggers activity in the Analytic Services layer. As discussed above, the technique IDE and monitoring modules are partitioned so that they execute partially in the Analytic Services layer (see monitoring module 818 and technique IDEs module 820). The other modules in this layer include:

(1) Job Queue 822. Each project may have its own job queue instance, which services model computation requests from the corresponding modeling dashboard instance. A job includes a reference to a partition of the project's dataset, a modeling technique, and a priority within the project. This module then constructs and maintains the prioritized list of jobs. When computation resources are available, a broker 824 requests the next job from the job queue. Users with sufficient permissions can add, remove, or reprioritize modeling jobs in the queue at any time. The queue is persisted via the temporary DB module 826, whose backend storage provides extremely fast response times.

(2) Brokers 824. These modules instantiate workers, assign them jobs, and monitor their health. One broker may run for each worker cloud. Brokers dynamically provision and terminate worker instances to service the current level of demand from the open job queues, plus a safe buffer. Upon launch, each worker automatically registers with the broker for its cloud environment, providing information about its computational capabilities. Brokers and workers send each other heartbeat messages every few seconds. A worker will automatically restart and re-register if it crashes or loses contact with its broker. A broker will discard a worker from its pool of available resources and log a warning if it misses too many heartbeat messages. As new jobs arrive from job queues and workers complete existing jobs, the brokers continually recalculate the number of workers and the allocation of jobs to those workers.

(3) Worker Clouds 640. These modules include a pool of workers. Each worker is a running virtual machine instance or other unit of self-contained computing resources within that cloud environment and receives jobs from the corresponding broker. From the worker's perspective, a job includes references to a project, partition of the project's dataset, and modeling technique. For each task in the assigned modeling technique, a worker may first check to see if any other worker has completed it for that dataset partition of the project by querying the file storage module 830, which has a special directory subtree for modeling results. If it is the first worker to process the step, it performs the calculation and saves it to file storage 830 so other workers can reuse it. Because modeling techniques are assembled from tasks in a common modeling task library, there may be a substantial level of commonality of task execution across modeling techniques. Caching the results of task execution may allow an implementation to significantly reduce the amount of computing resources consumed.

The Data Services layer 650 provides a variety of different storage mechanisms to support the modules in other layers.

(1) Temporary DB 826. This module provides an interface to and manages storage mechanisms for data that benefits from extremely fast access and/or is transient. In some implementations, it uses an in-memory DBMS deployed in a master-slave configuration with automatic fail-over. This module provides an interface for storing objects as key-value pairs. Keys are linked to specific users and projects, but are still very small. Values can be strings, lists, or sets.

(2) Persistent DB 828. This module provides an interface to and manages storage mechanisms for data that is persistent. In some implementations, the primary type of data handled by this module may include JSON objects and use a highly scalable non-SQL database, deployed in a cluster with automatic failover for both high-availability and high-performance. Objects stored via this module typically range up to a few megabytes in size.

(3) File Storage 830. This module provides an interface to and manages storage mechanisms for files. Types of data stored via this module include uploaded datasets, derived data, model computations, and predictions. This module may layer a file directory and naming convention on top of cloud storage. Additionally, when cloud workers access this module, they may also temporarily cache the stored files in their local storage.

(4) VM Image Storage 832. This module provides an interface to and manages storage for the VM images used to run IDE and worker instances. It stores images in a self-sufficient VM container format. For IDE instances, it preserves the user's state across sessions, while it loads new worker instances as blank copies from that worker type's template.

Together, these services manage a wide variety of information, including:

(1) UI Sessions 834: Data to render the current state of an active user session and perform simple request authentication and access control.

(2) UI Objects 836: Content displayed by the UI.

(3) Cache 838: Cached application content.

(4) System Configuration 840: Configuration parameters to launch the computing infrastructure and run the model search services.

(5) System Health 842: Real time data collected from the modules of the system 600.

(6) User/Project Admin 844: Each project's settings and user privileges, as well as individual user settings.

(7) Datasets 846: Data files uploaded by users for the project.

(8) Modeling Calculations 848: Intermediate modeling results, final fitted models, and calculated predictions.

(9) VM Images 850: Images used to launch new IDE servers.

Again, the specific modules 802-850 described above are logical constructs. Each module may include executing code from many different source files and a given source file may provide functionality to many different modules.

Out of Time Predictions

In some embodiments, a predictive modeling system 100 includes a time series model that can predict the values of a target I at time t and optionally t+1, . . . , t+i, given observations of I at times before t and optionally observations of other predictor variables P at times before t. In some embodiments, the predictive modeling system 100 partitions past observations to train a supervised learning model, measure its performance, and improve accuracy. In some embodiments, the time series model provides useful time-related predictive features, for example, predicting previous values of the target at different lags. In some embodiments, the predictive modeling system 100 refreshes the time series model as time moves forward and new observations arrive, taking into account the amount of new information in such observations and the cost of refitting the model.

An example illustrating a beneficial use of the time series model is now described. In this example, a supermarket chain wants to predict the next 6 weeks of daily sales for each of the supermarket's locations. The available data include the 3 years of previous daily sales data from 10,000 locations, plus other variables (e.g., population and economic growth around each location, historical and planned dates of holidays and major social events, and historical and planned dates of the chain's promotions). In some embodiments, a time series model trained on the available data can accurately predict the next 6 weeks of daily sales for each of the supermarket's locations.

Some embodiments of techniques for generating and using time series models are now described. When a data scientist develops a predictive modeling technique with the modeling technique builder 220, the data scientist may indicate that the modeling technique is specific to time series prediction problems. The modeling technique builder 220 then encodes this characteristic in the modeling technique's metadata. Datasets themselves may also have time series specific metadata (e.g., the date range from which the data originated, temporal resolution of the observations, any down-sampling that has already occurred, etc.).

When the exploration engine 110 loads a dataset (e.g., at step 404 of the method 400 illustrated in FIG. 4), it may automatically detect whether the dataset appears to contain time series data and, if so, what the time index appears to be. For example, if the dates (e.g., all the dates) are encoded in a standard day format (e.g., mm/dd/yyyy), the engine 110 may use days as the index. As another example, if the dates (e.g., all the dates) include hours, minutes, and seconds, the engine 110 may use seconds as the index. Similarly, the engine 110 can use any suitable time metric (e.g., centuries, decades, years, quarters, months, milliseconds, microseconds, etc.) as a common index.

In cases where the dataset contains time series data with a mixture of time resolutions, the engine 110 may use the most common resolution as the time index, or use the "lowest common resolution" as the time index after converting all the time data to the common resolution. In some embodiments, the engine 110 uses an internal objective function that weights frequency and disparity of potential indexes to choose an index (e.g., the optimal index). For example, if 90% of the date variables are at day resolution and 10% are at a resolution of seconds, the objective function may determine that day resolution is the best choice. The reverse mixture (90% resolution of seconds, 10% day resolution) may yield a determination that a resolution of seconds is the best choice. At a 50% mix, the objective function may determine that compromising on a resolution between days and seconds (e.g., hours) is optimal. The choice of objective function may further be determined by meta-machine learning on the space of previously used objective functions and their accuracy for prediction problems with various characteristics.

In some embodiments, a user may override (e.g., at step 406 of the method 400) the exploration engine's determination that the dataset is or is a not a time series dataset, either blocking or forcing treatment of the dataset as a time series dataset. If the user choses to force treatment of a dataset as a time series dataset, the user may specify which variables are time-based, how to interpret their data format, and/or a time index. In some cases, the user may supply information on how to convert variables to use a given time index.

For automatically detected time series datasets, the user may accept the suggested time index, select from any automatically detected alternatives, or specify a custom time index, which may also require specifying how to convert variables to use the custom time index. Once a time index is accepted, selected, or specified, other time variables may be converted to offsets from each other and used as predictive features. For example, if a dataset is using mm/dd/yyyy as the time index and one of the variables is "birth date", the engine 110 could compute the offset from "birth date" (also known as "age") for other events (e.g., "marriage", "birth date of child", etc.).

After the user has confirmed or indicated a time series dataset and confirmed, selected, or specified the time index, the engine 110 evaluates the dataset (e.g., at step 408 of the method 400) and presents this evaluation to the user (e.g., at step 410 of the method 400). This presentation may include diagrams that show target and predictor variable values over time, either individually or in groups. In some embodiments, the presentation illustrates the dependencies of each time series variable's current value on past values at one or more time lags. In cases where a dataset is a panel dataset, containing a mixture of time-series and cross-sectional variables, the presentation may illustrate dependencies between cross-sectional variables either at the same time period or at different lags from each other.

The user may indicate a "skip range" in the data, which is a gap between the end of a training window (e.g., a time range of data used for training) and the start of a validation window (e.g., a time range of data used for validation) or a holdout window (e.g., a time range of data used for holdout testing). In some cases, there is an operational or logistical reason for a delay between the last historical observation and the first forecast. In the supermarket example, data for the previous week might all arrive at headquarters on Sunday and be perfectly clean. But operationally, even after the predictive model is finished, it may take several days to both communicate predictions to all the store locations and for the stores to make adjustments to their operations in response to the predictions. Similarly, there may be delays in receiving or cleaning the historical data. In any case, the practical goal may be to begin predicting after a certain gap from the last available historical observation. The skip range permits the engine 110 to evaluate candidate predictive model with this gap in place.

The user may indicate a desired forecast range (e.g., the number of future time periods he to be predicted by the model). In some cases, this range may only be one observation, for example, the next quarter's sales. In others, like the supermarket chain example, the range may include several future periods, which in that example is 42 days.

In some cases, the engine 110 may suggest a forecast range based on the frequency of the data and/or the total number of periods in the data. For example, with daily data and a relatively small number of time periods, the engine 110 may suggest a 7-day forecast, while with a relatively large number of time periods, it may suggest a 30-day forecast. With monthly data, the engine 110 may suggest 3-, 6-, or 12-month forecasts depending on the number of time periods. With quarterly data, the engine 110 may suggest a 4-, 8-, or 12-quarter forecast. For annual data, the engine 110 may suggest a 5-, 10-, or 20-year forecast.

In some cases, the engine 110 uses a validation range equal to the forecast range or a multiple (e.g., a logical multiple) of the forecast range (e.g., if the user has specified an unusually short forecast range).

For time series data, the engine 110 may implement cross validation and holdout (e.g., at steps 418 and 422 of the method 400) with a set of training ranges, a set of corresponding validation ranges offset by the skip range, and a holdout range. The engine 110 may have a default target number of training and validation ranges, which it may adjust depending on the amount of data available. Datasets with relatively few time periods may be partitioned into fewer training and validation ranges while those with relatively many time periods may be partitioned into more training and validation ranges.

Depending on the size of the data, the frequency of the data, the length of the skip range, and/or the forecast range, the engine 110 may select lengths for training ranges. For example, with daily observations and the skip and forecast ranges expressed in weeks, months, or years (or corresponding multiples of days such as 7, 30, and 365), the engine may select training ranges of a whole number of weeks, months, or years. The length of these training windows may depend on the total number of observations, total amount of data, total amount of variation in target and predictor variables over time, the amount of seasonal variation exhibited by the variables, the consistency of variation in these variables over different time windows, and/or the target length of the forecast period. The engine 110 may use an internal objective function that weights these factors to choose the length of the training windows (e.g., the optimal length). For example, the default may be 5 training and validation ranges divided up evenly over the total dataset. However, if the amount of variation over longer time periods is low, the engine 110 may shorten the time windows. Or, if there is annual seasonality in the data, the engine 110 use only 3 windows, thereby placing several years of data into each range. Or, if there are a few specific periods within the dataset that exhibit high variation, the engine 110 may divide the data such that each window includes one of these periods. The choice of objective function may be determined by meta-machine learning on the space of previously used objective functions and their accuracy for prediction problems with various characteristics.

With the desired number of training and validation ranges and the length of these ranges plus the skip range, the engine 110 can divide up the dataset into a consistent series of training and validation ranges. For panel data, each training and validation pair could be further partitioned into folds (e.g., by randomly assigning sectional observations to a fold). In the supermarket example, the training range may be 30 weeks, the skip range 1 week, and the validation range 6 weeks, yielding approximately 4 training sets over 3 years. However, because there are 10,000 stores, these stores could further be "down-sampled" as described below to improve performance. The engine may also reserve sub-windows within the training and validation windows to use for tuning model hyper-parameters and blended models.

In some embodiments, the holdout data is only in the last time window. However, if the dataset is panel data and has been down-sampled, the holdout data may be from the same time period as other data, but from a different, non-overlapping sample.

As with cross-sectional models (see, e.g., the description of step 350 of the method 300, above), the engine 110 may iterate through the dataset, training each model on a small fraction of the training window, evaluating its performance on that fraction, then deciding whether to continue testing the model on additional data based on its performance. In the case of time series data, each fraction may end on the last observation in the training window, the initial fraction may start such that its fractional training window is a logical multiple of the validation window, and bigger fractions may use bigger multiples. For example, validation windows measured in weeks may use a first fraction starting 4 weeks before the end of the training window, a second fraction starting 8 weeks before, the third 12 weeks, etc. Validation windows measured in months may use a first fraction starting 3 months before the end of the training window, a second fraction starting 6 months before, the third 9 months, the fourth 12 months, etc. Validation windows measured in years may use a first fraction starting 4 years before the end of the training window, a second fraction starting 8 years before, the third 12 years; alternatively, the fractional periods may be 5, 10, and 15 years before the end of the training window. Fractions may increase linearly (e.g., 3, 6, 9, 12 periods or 4, 8, 12, 16 periods) or geometrically (e.g., 3, 6, 12, 24 periods or 4, 8, 16, 32 periods). Exponential increases in fractions are also possible (e.g., 3, 6, 24, 192 periods or 4, 8, 32, 256 periods), as are idiosyncratic schedules based on the problem domain and/or analysis of the data.

To improve execution speed and reduce resource consumption, the engine 110 may suggest a default down-sampling. There are two types of down-sampling, chronological and cross-sectional. In chronological down-sampling, the total number of observations within each partition may be reduced by a fixed percentage or aggregated to longer time interval resolution. For example, a time window that contains 10 billion observations could be reduced to 10 million observations. Or, a window of data with observations every millisecond may have those observations aggregated to every minute. In this case, all of the values of observations within the down-sampling window may be collapsed into a single value for an aggregated observation. This aggregated value may be, for example, the beginning value, ending value, most extreme value, average value, or a value computed through a weighting function to account for several characteristics of variation. The engine 110 may use an objective function that weights the potential reduction in observations by the variability of the target and predictors within the corresponding time window. For example, a 1000× reduction in observations may justify a 5% reduction in variability. The choice of objective function could further be determined by meta-machine learning on the space of previously used objective functions and their accuracy for prediction problems with various characteristics.

Chronological down-sampling may be used, for example, for extremely high frequency data in which the variation in the data is lower that the frequency of the data. Cross-sectional down-sampling is generally more common as there may be a very large number of sections which do not vary much in their behavior over time. For the supermarket chain example, there are 10,000 sections, one for each store location. Most of the variation may be due to chronological factors, with relatively low cross sectional variation across stores. For example, similar stores may actually fall into a much smaller number of representative groups. Therefore, the engine 110 may simply construct random subsamples of the sections, in this case store locations, and train predictive models on one or more subsamples. For example, instead of using all 10,000 stores, the engine 110 could train on a random selection of 1,000 stores. Also, the engine 110 could apply this down-sampling in cases where cross validation is used along the cross-sectional dimensions. For example, in the case of 5-fold cross-validation, the engine may use 5 folds of 400 stores instead of 5 folds of 2,000 stores. The percentage of down-sampling may be determined by a function of the number of sections, determined by an objective function that balances multiple characteristics of the sample, or specified by the user. In some cases, the choice of down-sampling percentage may be refined by meta-machine learning on many different prediction problems.

One challenge in producing accurate predictions from time series models is that they may be sensitive to the choice of training and validation time windows. In some embodiments, the engine automatically evaluates this sensitivity. For example, the engine 110 may evaluate the sensitivity to time window choice for every modeling technique as it is executing. As another example, the engine 110 may evaluate this sensitivity after a model exceeds a certain threshold of predictive accuracy. A third option is to evaluate sensitivity of the top models based on their relative predictive accuracy.

A fourth option is to run the sensitivity analysis on demand when a user requests it. A sensitivity analysis may include fitting a model with sliding training and validation windows, then measuring how the model accuracy varies with the points included in the windows. For example, a graph could plot the model accuracy on the vertical axis and the starting observation of the training window on the horizontal axis.

Once the engine has completed fitting the time series models and presented them to the user (e.g., at step 446 of the method 400), the user may further explore the effect of different training data windows on model performance. The user interface may allow the user to pick a particular fitted model or group of fitted models, and adjust the training and validation windows so that they include any observations not in the holdout window. In cases where the engine has not used sub-windows for tuning hyper-parameters, the optimal hyper-parameters calculated during the original fitting of a model may be used when refitting the model with the new window. In cases where nested training and validation windows are available, the engine may automatically recalculate the optimal hyper-parameters on the reserved windows and/or allow the user the choice of whether to recalculate the optimal hyper-parameters or use the originally calculated ones.

After the user has reviewed the holdout results (e.g., at step 450 of the method 400), the user may refit any subset of the models using any combination of data from the training, validation, and holdout windows. Because data from the holdout window is typically the most recent data, including it in the fitting of a model may improve that model's accuracy in predicting future values. Therefore, before deploying a model to make new predictions, users may refit a model on training data whose last observation is the last observation of the holdout window. The choice of first observation to use in this re-fitting may depend on the size (e.g., optimal size) of the training window calculated during sensitivity analysis. The user may override the calculated start point based on his analysis of the sensitivity and/or domain knowledge of the prediction problem.

Universal Feature Importance

When working on a supervised machine learning problem, a key challenge is often measuring which features have the most predictive value for the target. Measuring such feature importance may be useful at two separate stages in predictive modeling: (1) understanding a prediction problem in general, and (2) understanding how specific fitted models produce prediction results.

For purpose (1), a metric of feature importance may inform the evaluation of the dataset (e.g., step 408 of the method 400), the presentation of the evaluation to the user (e.g., at step 410 of the method 400), how the user refines the data set (e.g., at step 412 of the method 400), and/or which modeling techniques to try or suggest trying (e.g., at steps 422 and 424). For purpose (2), a metric of feature importance may inform the automated development of blended models (e.g., at step 432 of the method 400) and assist the user in understanding the relative performance of alternative models (e.g., at step 446 of the method 400).

In practice, determining feature importance for the first purpose generally occurs within the context of a particular model or family of models (e.g., Random Forest). Of course, each model can have benefits and drawbacks as a device for measuring feature importance. Therefore, using several different types of models to calculate feature importance may deliver improved understanding. For example, Random Forests, Generalized Additive Models, and Support Vector Machines are fundamentally different types of models for machine learning and may produce different measures of the importance of the same feature for the same dataset. Such differences may provide deeper insight into the structure of the prediction problem and suggest avenues of further exploration. For purpose (2), feature importance is generally specific to the model(s) under consideration.

Some embodiments of techniques for calculating feature importance for an arbitrary model are now described.

Given a dataset (or any sample thereof) and a modeling technique, the exploration engine 110 may calculate the importance of any feature using universal partial dependence. First, the engine 110 obtains the accuracy metric for a predictive model fitted on the sample using the modeling technique. The engine 110 can either perform this fitting from scratch or use a previous fitting. Then, for a given feature, the engine 110 takes all its values across all observations, shuffles them, and reassigns them (e.g., randomly reassigns them) to the observations. This random shuffling may reduce (e.g., destroy) any predictive value for that feature. The engine may then rescore the model on the dataset with the shuffled feature values, producing a new value for the accuracy metric. (Optionally before rescoring the fitted model on the shuffled dataset, the engine may refit the model to the shuffled dataset.) The decrease in the accuracy of the model indicates how much predictive value was lost and thus the feature's importance to the model and/or within the scope of the modeling technique.

Using the above-described technique for calculating the importance of one feature for one model and/or modeling technique, the engine can iterate over features to determine the relative importance of features within a model and/or modeling technique, iterate over models and/or modeling techniques to determine the relative importance of a feature across models and/or modeling techniques, or both.

To satisfy purpose (1), the engine 110 may maintain a list of modeling techniques that generally produce illustrative results for feature importance. When evaluating a dataset, the engine 110 may automatically run all or some of these modeling techniques. The engine may choose which modeling techniques to run based on properties of the dataset. The user interface may display the feature importance values individually for each modeling technique used or comparatively across all modeling techniques used. The engine 110 may also allow the user to select an arbitrary modeling technique from the modeling technique library 130 to use for measuring feature importance.

In addition to assisting the user in understanding the prediction problem, the engine 110 may use the results from this application of feature importance to guide additional automated analysis. For example, for features that score highly in importance across the board, the engine may allocate more resources to exploring interactions of those features. For features that score poorly in importance across the board, the engine may drop these features from the dataset entirely. In cases where some features have high importance for some models or modeling techniques and low importance for other models or modeling techniques, the engine may direct a deeper search for predictive models, trying more modeling techniques and using more data earlier in the model space exploration process.

To satisfy purpose (2), the engine may calculate the feature importance values for fitted models automatically or on demand. If automatically, the engine 110 may either calculate the feature importance values for all models or for a fraction thereof. The fraction may be calculated in any suitable way. For example, the fraction may include the N top performing models, all models that meet a threshold of at least a certain level of performance for a certain performance metric, or all models whose performance metric is within a given fraction of the top model's performance. In some embodiments, the engine may take into account the available computing resources, adjusting the fraction to be larger or smaller in proportion to those resources.

In some embodiments, the user may request feature importance calculation on demand. In some cases, the user may want to see the importance of some or all the features for a given model. In other cases, the user may want to see the importance of some or all the features across different models.

Using the above-described techniques to provide feature importance values either for a prediction problem in general or for a particular model may have numerous benefits. For example:

(1) If a feature is uninformative in general or at least in all accurate models, collection of the data corresponding to that feature may be halted. In some cases there is a real cost to making a feature available, such as the labor of extracting it from its source location or even paying a vendor for the data.

(2) Differences in a user's expectations of feature importance and measured feature importance may warrant further investigation. It may turn out that there is an error in the dataset that accounts for the discrepancy, or it may turn out that the difference is real and provides new insight into the prediction problem.

(3) In some cases, it may be desirable to produce a model that uses as few features as possible to make predictions. In these cases, the user could re-run a specific modeling technique or the search among all the modeling techniques with only the N features of greatest importance or only the features having importance values that exceed a specified threshold.

(4) Knowing which features are important help may help the user improve predictive models by experimenting with different ways of transforming and combining the most important features.

Figure 9:
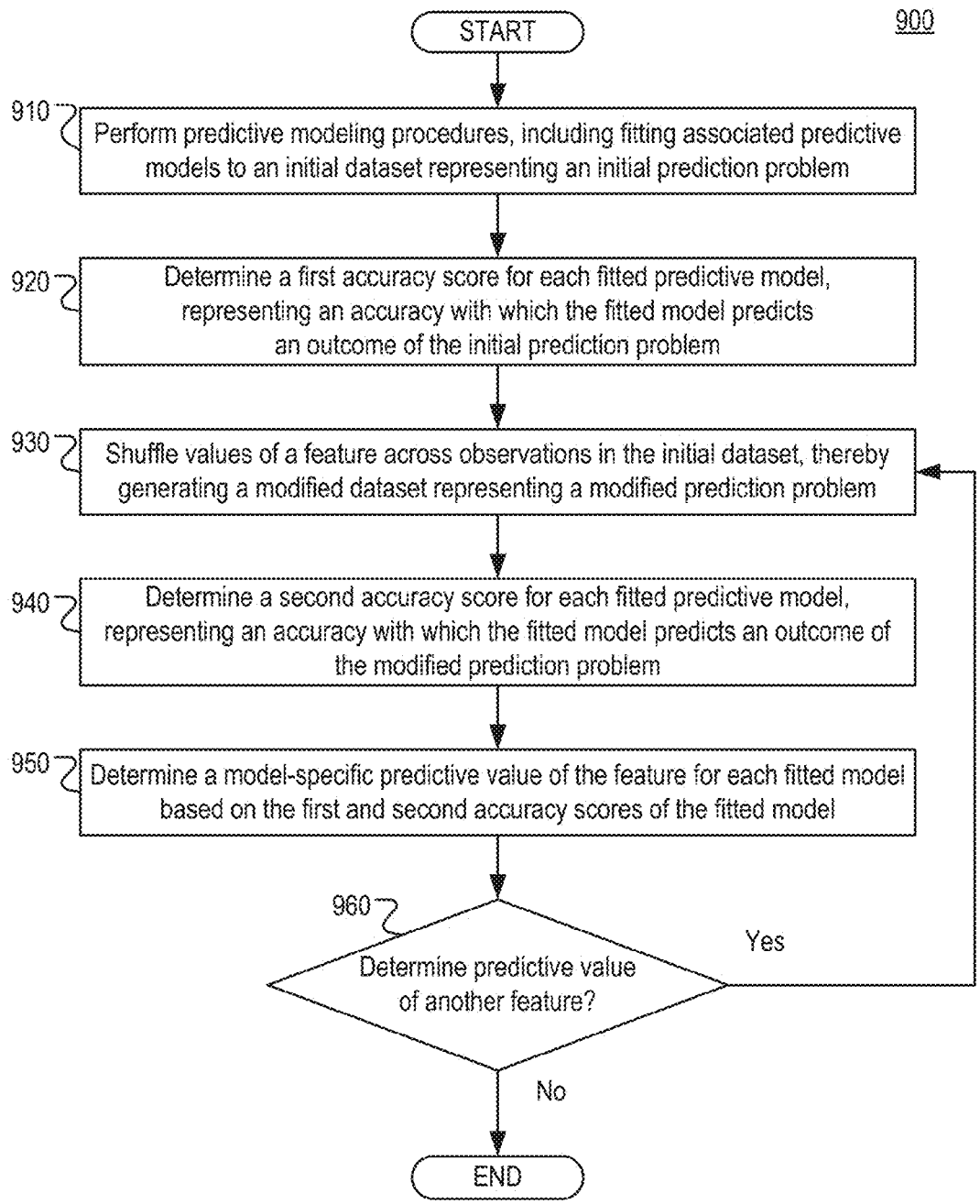
FIG. 9 is a flowchart of a method for determining the predictive value of a feature, in accordance with some embodiments.

Techniques for Determining the Predictive Value of One or More Features of a Dataset FIG. 9 shows a method 900 for determining the predictive value (e.g., "importance") of one or more features of an initial dataset representing an initial prediction problem. In some embodiments, the predictive modeling system 100 may perform the method 900 (or portions thereof) during an evaluation of the dataset (e.g., at step 408 of the method 400), and/or when processing the dataset (e.g., as described above with reference to the method 300). In some embodiments, the method 900 can be used to determine the predictive value of any dataset feature to any predictive model or predictive modeling technique.

In step 910, the system 100 performs a plurality of predictive modeling procedures. Each of the predictive modeling procedures is associated with a predictive model. Performing each modeling procedure includes fitting the associated predictive model to at least a portion of the initial dataset representing the initial prediction problem. The initial dataset includes prior observations, and each observation generally includes values of at least some of the features of the initial dataset.

In step 920, the system 100 determines a first accuracy score of each of the fitted predictive models. The first accuracy score of a fitted model represents the accuracy with which the fitted model predicts one or more outcomes of the initial prediction problem. Any suitable metric and/or technique for determining the accuracy of the model may be used, including, without limitation, testing the model on a holdout portion of the initial dataset.

In step 930, the system 100 "shuffles" the values of a particular feature F across the observations in the initial dataset, thereby generating a modified dataset representing a modified prediction problem. In some embodiments, the shuffling is performed by reassigning (e.g., randomly) the values of the feature F from their original observations to different observations. This shuffling operation may reduce (e.g., destroy) any predictive value for the feature F. Other techniques for reducing (e.g., destroying) the predictive value of a feature F in a dataset are possible, including, without limitation, removing the feature F from the dataset or assigning each observation the same value for feature F. In some embodiments, any technique that reduces the predictive value of the feature F below a threshold value may be used.

In step 940, the system 100 determines a second accuracy score of the fitted predictive model for the modified prediction problem. The second accuracy score represents an accuracy with which the fitted model predicts one or more outcomes of the modified prediction problem. Any suitable metric and/or technique for determining the accuracy of the model may be used, including, without limitation, testing the model on a holdout portion of the modified dataset. In some embodiments, the fitted models are refitted to the modified dataset prior to determining the second accuracy scores.

In step 950, for each of the predictive modeling procedures (or fitted models) the system 100 calculates the predictive value of the feature F. In some embodiments, the predictive value of the feature F for a modeling procedure or model is calculated based on the change in accuracy (e.g., based on the difference between the first and second accuracy scores for model). In some embodiments, a function is used to determine the predictive value of the feature for the modeling procedure or model based on the first and second accuracy scores, such that the predictive value generally increases as the difference between the first accuracy score and the second accuracy score increases. The predictive values determined in step 950 may be referred to herein as "model-specific predictive values", because the individual predictive values may be specific to particular modeling procedures or models.

In step 960, the system 100 determines whether to analyze the predictive value of another feature. In some embodiments, this determination is made based on user input (e.g., the system continues analyzing the predictive value of features until all features specified by the user have been analyzed). In some embodiments, the system analyzes all features in the dataset. In some embodiments, the system analyzes only a subset of the features in the dataset. Such features can be selected based on any suitable criteria. If the system determines in step 960 that there is an another feature to analyze, the system then repeats steps 930-950 for that feature.

In some embodiments, the method 900 includes an additional step (not shown) of selecting the predictive modeling procedures that are performed in step 910. The system 100 may select the modeling procedures, for example, from the library 130 of predictive modeling techniques. In some embodiments, the system 100 selects two or more modeling procedures from two or more different predictive modeling families. Examples of predictive modeling families can include linear regression techniques (e.g., generalized additive models), tree-based techniques (e.g., random forests), support vector machines, neural networks (e.g., multilayer perceptron), etc. For example, the system 100 may select a modeling procedure from the tree family (e.g., a random forest modeling procedure), another modeling procedure from the linear regression family (e.g., a generalized additive model), and a support vector machine modeling procedure.

The system 100 may perform any suitable task (e.g., predictive modeling task) using one or more of the model-specific predictive values (feature importance values) determined through the method 900, including, without limitation, (1) processing the dataset based on the model-specific predictive values, (2) presenting an evaluation of the dataset to the user, (3) choosing predictive models for blending based on the model-specific predictive values, (4) presenting the evaluated models and their associated model-specific predictive values to the user, (5) allocating resources during the process of evaluating the space of potential predictive modeling solutions for the prediction problem based on the model-specific predictive values, and (6) calculating a model-independent predictive value (feature importance value) of a feature based on the feature's model-specific predictive values. In some embodiments, after calculating model-independent feature importance values, the system 100 may perform any suitable task (e.g., tasks (1)-(5) as described in the previous sentence) using the model-independent feature importance values.

In some embodiments, as part of a predictive modeling procedure, during an evaluation of the dataset (e.g., at step 408 of the method 400) and/or when processing the dataset (e.g., as described above with reference to the method 300), the system 100 performs feature generation and/or feature engineering based on the model-specific predictive values. For example, the system 100 may prune "less important" features from the dataset. In this context, a feature may be classified as "less important" if the predictive value of the feature is less than a threshold value, if the feature has one of the M lowest predictive values among the features in the dataset, if the feature does not have one of the N highest predictive values among the features in the dataset, etc. As another example, the system may create derived features from "more important" features in the dataset. In this context, a feature may be classified as "more important" if the predictive value of the feature is greater than a threshold value, if the feature has one of the N highest predictive values among the features in the dataset, if the feature does not have one of the M lowest predictive values among the features in the dataset, etc. In some embodiments, the system 100 may calculate the predictive values of derived features using the method 900.

In some embodiments, the system 100 may present (e.g., display) an evaluation of the dataset to the user (e.g., at step 410 of the method 400), and the presented evaluation may include the predictive values of the dataset's features and/or information derived therefrom. For example, for one or more modeling procedures or models, the system 100 may (1) identify "more important" and/or "less important features", (2) display the predictive values of the features, (3) rank the features by their predictive values, and/or (4) recommend that collection of less important features be halted and/or that less important features be removed from the dataset. In response to presenting the evaluation of the dataset to the user, the system 100 may receive user input specifying refinements of the dataset (e.g., at step 412 of the method 400).

In some embodiments, the system 100 selects predictive models for blending based on the model-specific predictive values, and blends the selected models (e.g., at step 432 of the method 400). The system 100 may use any suitable technique to select the predictive models for blending. For example, the system 100 may select "complementary top models" for blending. In this context, "complementary top models" may include accurate models that achieve their high accuracies through different mechanisms. The system 100 may classify a model as a "top" model if the accuracy of the model is greater than a threshold accuracy, if the model has one of the N highest accuracy values among the fitted models, if the model does not have one of the M lowest accuracy values among the fitted models, etc. The system may classify two models as "complementary" models if (1) the most important features for the models (e.g., the features having the highest predictive values for the models) are different, or (2) a feature that is important to the first model is unimportant to the second model, and a feature that is unimportant to the first model is important to the second model. In this context, a feature may be "important" to a model if the feature has a high predictive value for the model (e.g., the highest predictive value, one of the highest N predictive values, a predictive value greater than a threshold value, etc.). In this context, a feature may be "unimportant" to a model if the feature has a low predictive value for the model (e.g., the lowest predictive value, one of the lowest N predictive values, a predictive value lower than a threshold value, etc.). In some embodiments, the system 100 may use the above-described classification techniques to select two or more complementary top models for blending.

In some cases, blending complementary top models may yield blended models with very high accuracy, relative to the component models. By contrast, blending non-complementary models may not yield blended models with significantly higher accuracy than the component models.

In some embodiments, the system 100 may present evaluated predictive models and their associated model-specific predictive values to the user to the user (e.g., at step 446 of the method 400). In some embodiments, the system 100 calculate and/or display the feature importance values only for a subset of the predictive models (e.g., the top models). Presenting the feature importance values to the user may assist the user in understanding the relative performance of the evaluated models. For example, based on the presented feature importance values, the user (or the system 100) may identify a top model M that is outperforming the other top models, and one or more features F that are important to the model M but not to the other top models. The user may conclude (or the system 100 may indicate) that, relative to the other top models, the model M is making better use of the information represented by the features F. Based on this discovery, parties interested in the outcomes forecasted by the model M may invest in systems for measuring or controlling the features F, which may improve the outcomes the model is forecasting.

In some embodiments, during the process of evaluating the space of potential predictive modeling solutions for the prediction problem (e.g., while performing the method 300), the system 100 may allocate resources for evaluation of modeling procedures based on the predictive values of the features in the dataset representing the prediction problem. For example, the system 100 may selecting or suggest predictive modeling procedures to evaluate (e.g., at step 310 of the method 300, or at step 424 of the method 400). As described above, the system 100 may select or suggest predictive modeling procedures that are predicted to be suitable or highly suitable for a dataset. Some techniques for determining the suitability of a modeling procedure for a dataset having specified characteristics are described above. When determining suitabilities of predictive modeling procedures for a prediction problem based on characteristics of the prediction problem, the system 100 may treat the characteristics of the more important features of the dataset as the characteristics of the prediction problem. In this way, the suitability scores generated by the system 100 may be tailored to the more important features of the dataset. Because the system 100 allocates resources based on suitability scores, tailoring the suitability scores to the more important features of the dataset may result in resources being allocated to the evaluation of predictive modeling procedures based in part on feature importance.

In addition or in the alternative, the system 100 may allocate more resources to feature generation tasks with the more important features of the dataset (e.g., during an evaluation of the dataset and/or when processing the dataset, as described above with reference to the method 300 or the step 408 of the method 400), and/or allocate more resources to blending of complementary top models (e.g., at step 432 of the method 400).

In some embodiments, the system 100 may calculate model-independent predictive value of a feature F based on the feature's model-specific predictive values. The system 100 may calculate the model-independent predictive value of a feature using any suitable techniques, including, without limitation, (1) calculating a statistical measure of the model-specific predictive values (e.g., the mean, median, standard deviation, etc.), or (2) determining a combination of the model-specific predictive values. In the latter case, the combination may be a weighted combination. In the weighted combination, the model-specific feature values for more accurate models may be weighted more heavily than the model-specific feature values for less accurate models. In some embodiments, the model-specific feature values for the least accurate modeling procedures may be excluded from the calculations and/or combinations described in this paragraph.

Second-Order Models

As discussed above (e.g., in the Section titled "Model Deployment Engine"), it may be desirable to create a model-of-a-model ("second-order model") using a suitable second-order modeling technique (e.g., RuleFit) to simplify the task of producing prediction code and/or prevent disclosure of proprietary details of the modeling techniques used to create the model. Moreover, people may be able to interpret a second-order model more easily than the original model; the second-order model may provide insight into an otherwise "black box" model.

However, there is a concern that second-order models may be systematically less accurate for predictions than the source model. Some embodiments of techniques for reducing (e.g., minimizing) any loss of accuracy associated with moving from a source model to a second-order model (and, in some cases, for generating second-order models with greater accuracy than their source models) are described below.

In some embodiments, after the user has been presented fitted models (e.g., at step 446 of the method 400) and/or results of the holdout test for the top models (e.g., at step 450 of the method 400), the user may wish to (a) interpret a model to understand how it uses features to generate accurate predictions and/or (b) deploy the model using the deployment engine 140. Certain modeling techniques may use opaque and/or complex methods for building models, thereby making the models harder to understand and increasing the difficulty of producing prediction code, at least in some cases. Preventing the disclosure of proprietary model building techniques may further compound the challenges of making the models understandable and producing prediction code for the models.

In some embodiments, the predictive modeling system 100 addresses these issues by building a second-order model of the source model. In some embodiments, the predictive modeling system 100 builds the second-order models using one or more modeling techniques (e.g., RuleFit, Generalized Additive Models, etc.) that generally produce models that are relatively easy to interpret and for which prediction code can be generated relatively easily. Such techniques are referred to herein as "second-order modeling techniques". After the engine 110 produces a fitted "first-order" model (e.g., a first-order model that the user wants to better understand, a first-order model for which the user wants to produce prediction code, and/or a first-order model that has proprietary features), the system 100 can create a second-order model of the first-order model using the second-order modeling technique.

For each feature in the first-order model, there is a corresponding set of feature values from the original dataset, or derived from the original dataset. The second-order modeling technique may use the same features as the first-order model, and may therefore use the original values of such features, or a subset thereof, for the second-order modeling technique's training and test data. In some embodiments, instead of using the actual values of the target from the dataset, the second-order modeling technique uses the predicted values of the target from the first-order model.

In some cases, the second-order modeling technique may use alternative or supplemental training and/or test data. Such alternatives may include other real world data from either the same or different data sources, real world data combined with machine-generated data (e.g., for the purpose of covering a broader range of possibilities than present in the real world sample) (e.g., via interpolation and extrapolation), or data completely generated by a machine-based stochastic model. In some embodiments, the value of the target variable used for training the second-order model is the predicted value from the first-order model.

One concern is that any errors in the first-order model may be compounded or magnified when building a second-order model, thereby systematically reducing the accuracy of second-order models. First, the inventors have recognized and appreciated that there is a question of whether this is true empirically. Second, if it is true in some cases, the inventors have recognized and appreciated that using a more accurate first-order model is likely to reduce the loss of accuracy. For example, because blended models (as described, for example, toward the end of the Section titled "Modeling Space Exploration Engine") are sometimes more accurate than any single model, fitting a second-order model to a blend of first-order models may reduce any loss of accuracy associated with second-order modeling.

The inventors have empirically determined that the concerns about the accuracy of second-order models are largely misplaced. Tests of the system on 381 datasets resulting in 1195 classification and 1849 regression first-order models were performed. For the tested classification models, 43% of second-order models were less accurate than the corresponding first-order models, but no more than 10% worse according to the log loss measure of accuracy. Thirty percent of the second-order models were actually more accurate than the first-order models. In only 27% of the cases was the second-order model more than 10% less accurate than the first-order model. Approximately one-third of these cases (roughly 9% of the total population) occurred when the dataset was very small. Another one-third of these cases (again, roughly 9% of the total population) occurred when the first-order model was very accurate at less than 0.1 log loss and the second order model was still also very accurate at less than 0.1 log loss. Thus, in over 90% of the cases with an adequately large data set, the second-order model was either within 10% of the first-order model or the second-order models was very accurate by absolute standards. In 41% of the cases, the best second-order model was derived from a blend of first-order models.

For the tested regression models, 39% of second-order models were less accurate than the corresponding first-order models, but no more than 10% worse according to the residual mean squared error measure of accuracy. Forty-seven percent of the second-order models were actually more accurate than the first-order models. In only 14% of the cases was the second-order model more than 10% less accurate than the first-order model. Approximately 10% of these cases (roughly 1.5% of the total population) occurred when the dataset was very small. In 35% of all cases, the best second-order model was derived from a blend of first-order models.

Based on this empirical data, the inventors have recognized and appreciated that second-order models are generally either relatively accurate or absolutely accurate if the original dataset is adequately large. In many cases, second-order models are actually more accurate than first-order models. Finally, in more than one third of all classification and regression problems tested, the most accurate second-order model was derived from a blend of first order models.

The inventors have recognized and appreciated that second-order models can be beneficial (a) to understand complicated first-order models, (b) to simplify the task of generating prediction code for a predictive model, and (c) to protect proprietary model-building techniques. Blends of first-order models improve these benefits in many cases. While blended models produce the best prediction results much of the time, they are also generally more complicated, because they combine the complexity of all components of all the models included in the blend. Moreover, generating prediction code for a blended model generally combines the challenges of generating prediction code for all component models included in the blend as well. On top of these component challenges, blended models are generally slower to produce predictions (and/or require more computational resources to produce predictions) because all of the blended models are generally computed to generate each prediction. Second-order models generally reduce this time (and/or use of computational resources) to that of computing a single model. Also, a blended model contains the proprietary features of each component model. Thus, secondary models and blended models operate in a highly complementary fashion.

Moreover, because the system 100 can automatically separate datasets into training, test, and holdout partitions, the system can easily determine whether any particular second-order model performs adequately in comparison to first-order models.

Further Description of Some Embodiments

Although examples provided herein may have described modules as residing on separate computers or operations as being performed by separate computers, it should be appreciated that the functionality of these components can be implemented on a single computer, or on any larger number of computers in a distributed fashion.

The above-described embodiments may be implemented in any of numerous ways. For example, the embodiments may be implemented using hardware, software or a combination thereof. When implemented in software, the software code can be executed on any suitable processor or collection of processors, whether provided in a single computer or distributed among multiple computers. Further, it should be appreciated that a computer may be embodied in any of a number of forms, such as a rack-mounted computer, a desktop computer, a laptop computer, or a tablet computer. Additionally, a computer may be embodied in a device not generally regarded as a computer but with suitable processing capabilities, including a Personal Digital Assistant (PDA), a smart phone or any other suitable portable or fixed electronic device.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, some embodiments may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. The computer readable medium or media may be non-transitory. The computer readable medium or media can be transportable, such that the program or programs stored thereon can be loaded onto one or more different computers or other processors to implement various aspects of predictive modeling as discussed above. The terms "program" or "software" are used herein in a generic sense to refer to any type of computer code or set of computer-executable instructions that can be employed to program a computer or other processor to implement various aspects described in the present disclosure. Additionally, it should be appreciated that according to one aspect of this disclosure, one or more computer programs that when executed perform predictive modeling methods need not reside on a single computer or processor, but may be distributed in a modular fashion amongst a number of different computers or processors to implement various aspects of predictive modeling.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish a relationship between data elements.

Also, predictive modeling techniques may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

In some embodiments the method(s) may be implemented as computer instructions stored in portions of a computer's random access memory to provide control logic that affects the processes described above. In such an embodiment, the program may be written in any one of a number of high-level languages, such as FORTRAN, PASCAL, C, C++, C#, Java, javascript, Tcl, or BASIC. Further, the program can be written in a script, macro, or functionality embedded in commercially available software, such as EXCEL or VISUAL BASIC. Additionally, the software may be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

Various aspects of the present disclosure may be used alone, in combination, or in a variety of arrangements not specifically described in the foregoing, and the invention is therefore not limited in its application to the details and arrangement of components set forth in the foregoing description or illustrated in the drawings. For example, aspects described in one embodiment may be combined in any manner with aspects described in other embodiments.

Terminology

The phraseology and terminology used herein is for the purpose of description and should not be regarded as limiting.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method for building a predictive model, comprising:
    determining a multi-model predictive value of a feature of an initial dataset representing a prediction problem, wherein the initial dataset includes a plurality of observations and each observation includes respective values for a plurality of features, including:
        (a) performing one or more predictive modeling procedures, wherein each of the predictive modeling procedures is associated with a different type of predictive model, wherein performing each modeling procedure comprises fitting the associated predictive model to the initial dataset;
        (b) reducing the multi-model predictive value of the feature by shuffling values of the feature across respective observations included in the initial dataset, thereby generating a modified dataset;
        (c) for each of the fitted predictive models:
            (c1) determining a first accuracy score representing an accuracy with which the fitted model generates predictions for data in the initial dataset;
            (c2) determining a second accuracy score representing an accuracy with which the fitted model generates predictions for data in the modified dataset in which the multi-model predictive value of the feature has been reduced; and
            (c3) determining a model-specific predictive value of the feature based on the first and second accuracy scores of the fitted model; and
        (d) determining, based on the model-specific predictive values of the feature, that the multi-model predictive value of the feature is low;
    performing feature engineering on the initial dataset based on the multi-model predictive value of the feature, including pruning the feature having the low multi-model predictive value from the initial dataset, thereby generating a pruned dataset; and
    building a predictive model for the prediction problem, including: performing a plurality of predictive modeling procedures on the pruned dataset, selecting a fitted predictive model generated by the plurality of predictive modeling procedures, and deploying the selected predictive model to predict outcomes of the prediction problem without using the pruned feature.

2. The method of claim 1, further comprising:
    prior to performing the one or more predictive modeling procedures, selecting the one or more predictive modeling procedures based on characteristics of the initial dataset, characteristics of the prediction problem, and/or characteristics of the feature.

3. The method of claim 1, wherein the one or more predictive modeling procedures comprise two or more modeling procedures selected from the group consisting of a random forest modeling procedure, a generalized additive modeling procedure, and a support vector machine modeling procedure.

4. The method of claim 1, wherein the one or more predictive modeling procedures comprise a first modeling procedure selected from a first family of modeling procedures and a second modeling procedure selected from a second family of modeling procedures.

5. The method of claim 1, further comprising:
    prior to determining the second accuracy scores of the one or more predictive models, refitting the one or more predictive models to the modified dataset.

6. The method of claim 1, wherein the determined model-specific predictive value of the feature for a particular fitted model increases as the difference between the first accuracy score and the second accuracy score of the particular fitted model increases.

7. The method of claim 1, wherein the determined model-specific predictive value of the feature for a particular fitted model comprises a percentage difference between the first accuracy score and the second accuracy score of the particular fitted model, relative to the first accuracy score of the particular fitted model.

8. The method of claim 1, further comprising determining a model-independent predictive value of the feature.

9. The method of claim 8, wherein determining the model-independent predictive value of the feature comprises calculating a statistical measure of a center and/or a spread of a plurality of model-specific predictive values of the feature.

10. The method of claim 9, wherein determining the model-independent predictive value of the feature comprises calculating the statistical measure of the center of the plurality of model-specific predictive values, and wherein the statistical measure of the center is selected from the group consisting of a mean, a median, and a mode of the plurality of model-specific predictive values.

11. The method of claim 9, wherein determining the model-independent predictive value of the feature comprises calculating the statistical measure of the spread of the plurality of model-specific predictive values, and wherein the statistical measure of the spread is selected from the group consisting of a range, a variance, and a standard deviation of the plurality of model-specific predictive values.

12. The method of claim 8, wherein determining the model-independent predictive value of the feature comprises calculating a combination of the plurality of model-specific predictive values of the feature.

13. The method of claim 12, wherein calculating a combination of the plurality of model-specific predictive values comprises calculating a weighted combination of the plurality of model-specific predictive values.

14. The method of claim 13, wherein calculating the weighted combination of the plurality of model-specific predictive values comprises assigning respective weights to the plurality of model-specific predictive values, wherein the weight assigned to a particular model-specific predictive value corresponding to a particular fitted predictive model increases as the first accuracy score of the fitted predictive model increases.

15. The method of claim 1, wherein the feature is a first feature, and wherein the method further comprises:
determining a multi-model predictive value of a second feature of the initial dataset representing the prediction problem, including:
(bb) reducing the multi-model predictive value of the second feature by shuffling values of the second feature across respective observations included in the initial dataset, thereby generating a second modified dataset;
(cc) for each of the fitted predictive models:
(cc2) determining a third accuracy score representing an accuracy with which the fitted model generates predictions for data in the second modified dataset in which the multi-model predictive value of the second feature has been reduced; and
(cc3) determining a model-specific predictive value of the second feature based on the first and second accuracy scores of the fitted model; and
(dd) determining, based on the model-specific predictive values of the second feature, a multi-model predictive value of the feature.

16. The method of claim 1, wherein the feature is a first feature, wherein the pruned dataset includes a plurality of second features, and wherein the method further comprises determining model-specific predictive values of the second features of the pruned dataset by performing steps (b), (c2), and (c3) for each of the second features.

17. The method of claim 16, further comprising displaying, via a graphical user interface, graphical content identifying the second features of the pruned dataset and the model-specific predictive values of the second features.

18. The method of claim 16, wherein the one or more predictive modeling procedures are first modeling procedures including a particular modeling procedure associated with a particular predictive model, wherein the model-specific predictive values of the second features include particular model-specific predictive values of the second features that are specific to the particular predictive model, and wherein the plurality of predictive modeling procedures includes the particular modeling procedure associated with the particular predictive model.

19. The method of claim 18, wherein performing the particular predictive modeling procedure comprises performing feature engineering on the pruned dataset based on the particular model-specific predictive values of the second features.

20. The method of claim 19, wherein performing feature engineering comprises removing a particular second feature from the pruned dataset based on the particular second feature having a low model-specific predictive value.

21. The method of claim 20, further comprising determining that the model-specific predictive value of the particular second feature is low based on the model-specific predictive value of the particular second feature being lower than a threshold value and/or based on the model-specific predictive value of the particular second feature being in a specified percentile of the particular model-specific predictive values for the second features of the pruned dataset.

22. The method of claim 19, wherein the pruned dataset is a first pruned dataset, and wherein performing feature engineering comprises:
generating a derived feature based on two or more particular second features of the first pruned dataset having high model-specific predictive values; and
adding the derived feature to the first pruned dataset, thereby generating a second pruned dataset.

23. The method of claim 22, further comprising determining that the model-specific predictive values of the particular second features are high based on the model-specific predictive values of the particular second features being higher than a threshold value and/or based on the model-specific predictive values of the particular second features being in a specified percentile of the particular model-specific predictive values for the second features of the first pruned dataset.

24. The method of claim 22, wherein performing the particular predictive modeling procedure further comprises fitting the particular predictive model to the second pruned dataset, and wherein the method further comprises:
determining a first accuracy score of the fitted particular predictive model representing an accuracy with which the fitted particular model generates predictions for data in the second pruned dataset;
shuffling values of a particular feature of the second pruned dataset across respective observations included in the second pruned dataset, thereby generating a second modified dataset;
determining a second accuracy score of the fitted particular predictive model representing an accuracy with which the fitted particular model generates predictions for data in the second modified dataset; and determining a model-specific predictive value of the particular feature for the fitted particular model based on the first and second accuracy scores of the fitted particular model.

25. The method of claim 18, further comprising, prior to performing the plurality of modeling procedures:
selecting the plurality of modeling procedures based on suitabilities of the selected modeling procedures for the prediction problem,
wherein a suitability of the particular predictive modeling procedure for the prediction problem is determined based, at least in part, on characteristics of one or more particular features of the pruned dataset having high model-specific predictive values for the particular predictive modeling procedure.

26. The method of claim 25, further comprising:
transmitting instructions to a plurality of processing nodes, the instructions comprising a resource allocation schedule allocating resources of the processing nodes for execution of the plurality of modeling procedures, the resource allocation schedule being based, at least in part, on the suitabilities of the plurality of modeling procedures for the prediction problem; and
receiving results of the execution of the plurality of modeling procedures by the plurality of processing nodes in accordance with the resource allocation schedule, wherein the results include predictive models generated by the plurality of modeling procedures, and/or scores of the generated models for data associated with the prediction problem, wherein the selected predictive model is selected from the generated models based, at least in part, on the score of the selected predictive model.

27. The method of claim 25, further comprising:
generating a blended predictive model by combining two or more of the generated predictive models; and
evaluating the blended predictive model.

28. The method of claim 1, wherein determining that the multi-model predictive value of the feature is low comprises:
determining the multi-model predictive value of the feature based on the model-specific predictive values of the feature; and
determining that the multi-model predictive value of the feature is less than a threshold predictive value.

29. A predictive modeling apparatus comprising:
a memory configured to store processor-executable instructions; and
a processor configured to execute the processor-executable instructions, wherein executing the processor-executable instructions causes the apparatus to perform steps including:
determining a multi-model predictive value of a feature of an initial dataset representing a prediction problem, wherein the initial dataset includes a plurality of observations and each observation includes respective values for a plurality of features, including:
(a) performing one or more predictive modeling procedures, wherein each of the predictive modeling procedures is associated with a different type of predictive model, wherein performing each modeling procedure comprises fitting the associated predictive model to the initial dataset;
(b) reducing the multi-model predictive value of the feature by shuffling values of the feature across respective observations included in the initial dataset, thereby generating a modified dataset;
(c) for each of the fitted predictive models:
(c1) determining a first accuracy score representing an accuracy with which the fitted model generates predictions for data in the initial dataset;
(c2) determining a second accuracy score representing an accuracy with which the fitted model generates predictions for data in the modified dataset in which the multi-model predictive value of the feature has been reduced; and
(c3) determining a model-specific predictive value of the feature based on the first and second accuracy scores of the fitted model; and
(d) determining, based on the model-specific predictive values of the feature, that the multi-model predictive value of the feature is low;
performing feature engineering on the initial dataset based on the multi-model predictive value of the feature, including pruning the feature having the low multi-model predictive value from the initial dataset, thereby generating a pruned dataset; and
building a predictive model for the prediction problem, including: performing a plurality of predictive modeling procedures on the pruned dataset, selecting a fitted predictive model generated by the plurality of predictive modeling procedures, and deploying the selected predictive model to predict outcomes of the prediction problem without using the pruned feature.

30. An article of manufacture having computer-readable instructions stored thereon that, when executed by a processor, cause the processor to perform operations for building a predictive model, including:
determining a multi-model predictive value of a feature of an initial dataset representing a prediction problem, wherein the initial dataset includes a plurality of observations and each observation includes respective values for a plurality of features, including:
(a) performing one or more predictive modeling procedures, wherein each of the predictive modeling procedures is associated with a different type of predictive model, wherein performing each modeling procedure comprises fitting the associated predictive model to the initial dataset;
(b) reducing the multi-model predictive value of the feature by shuffling values of the feature across respective observations included in the initial dataset, thereby generating a modified dataset;
(c) for each of the fitted predictive models:
(c1) determining a first accuracy score representing an accuracy with which the fitted model generates predictions for data in the initial dataset;
(c2) determining a second accuracy score representing an accuracy with which the fitted model generates predictions for data in the modified dataset in which the multi-model predictive value of the feature has been reduced; and
(c3) determining a model-specific predictive value of the feature based on the first and second accuracy scores of the fitted model; and
(d) determining, based on the model-specific predictive values of the feature, that the multi-model predictive value of the feature is low;
performing feature engineering on the initial dataset based on the multi-model predictive value of the feature, including pruning the feature having the low multi-model predictive value from the initial dataset, thereby generating a pruned dataset; and building a predictive model for the prediction problem, including: performing a plurality of predictive modeling procedures on the pruned dataset, selecting a fitted predictive model generated by the plurality of predictive modeling procedures, and deploying the selected predictive model to predict outcomes of the prediction problem without using the pruned feature.

* * * * *